(12) United States Patent
Goodwin

(10) Patent No.: US 10,718,228 B2
(45) Date of Patent: Jul. 21, 2020

(54) RING TURBINE ARRANGEMENTS FOR ELECTRICITY GENERATION AND OTHER APPLICATIONS

(71) Applicant: Robert Lovejoy Goodwin, Mercer Island, WA (US)

(72) Inventor: Robert Lovejoy Goodwin, Mercer Island, WA (US)

( * ) Notice: Subject to any disclaimer, the term of this patent is extended or adjusted under 35 U.S.C. 154(b) by 0 days.

(21) Appl. No.: 15/428,162

(22) Filed: Feb. 9, 2017

(65) Prior Publication Data

US 2018/0058244 A1 Mar. 1, 2018

Related U.S. Application Data

(60) Provisional application No. 62/382,242, filed on Aug. 31, 2016.

(51) Int. Cl.
*F01D 15/10* (2006.01)
*F01D 15/08* (2006.01)
(Continued)

(52) U.S. Cl.
CPC ............ *F01D 15/10* (2013.01); *F01D 1/023* (2013.01); *F01D 1/34* (2013.01); *F01D 5/142* (2013.01); *F01D 13/02* (2013.01); *F01D 15/08* (2013.01); *F01D 17/08* (2013.01); *F01D 17/10* (2013.01); *F01D 17/24* (2013.01); *F01D 23/00* (2013.01); *F01K 11/02* (2013.01); *F16T 1/00* (2013.01); *H02K 7/1823* (2013.01); *H02K 44/20* (2013.01); *H02K 53/00* (2013.01); *F01K 3/002* (2013.01); *F05B 2260/302* (2013.01)

(58) Field of Classification Search
CPC . F01D 15/10; F01D 23/00; F01D 1/34; F01D 17/24; F01D 17/10; F01D 5/142; F01D 13/02; F01D 17/08; F01D 15/08; F01D 1/023; F16T 1/00; F01K 11/02; F01K 3/002; H02K 44/20; H02K 7/1823; F05B 2260/302
USPC .................................................. 60/670–682
See application file for complete search history.

(56) References Cited

U.S. PATENT DOCUMENTS 2,149,369 A * 3/1939 Sinclair .................. F16D 33/02
 180/6.2
2,351,516 A * 6/1944 Jandasek ................. F16H 61/56
 415/130
(Continued)

*Primary Examiner* — Hoang M Nguyen
(74) *Attorney, Agent, or Firm* — Procopio, Cory, Hargreaves & Savitch LLP

(57) ABSTRACT

System for electrical energy generation from steam comprising at least one stage, each stage including: a steam-driven rotating toroidal ring; a housing comprising a toroidal cavity for containing the rotating toroidal ring, the housing further comprising at least one steam inlet, the housing further comprising a plurality of steam outlets for removing pressurized steam from the channels for at least a second portion of rotation of the rotating toroidal ring within the toroidal cavity; at least one bearing arrangement comprised by or attached to the housing within the toroidal cavity; and at least one pair of electrical coils, each electrical coil located on the outer surface of the housing at locations diagonally opposite from the other coil of each pair across the axis of the minor radius of the toroidal cavity and within the specific region where a time-varying magnetic field will occur as the rotating toroidal ring rotates.

67 Claims, 43 Drawing Sheets

Schematic representation of Ring Turbine Flows

(51) Int. Cl.

| | | |
|---|---|---|
| *F01K 11/02* | (2006.01) | |
| *F01D 13/02* | (2006.01) | |
| *F01D 1/02* | (2006.01) | |
| *F01D 5/14* | (2006.01) | |
| *F01D 17/08* | (2006.01) | |
| *F01D 17/10* | (2006.01) | |
| *F01D 17/24* | (2006.01) | |
| *H02K 44/20* | (2006.01) | |
| *H02K 7/18* | (2006.01) | |
| *F01D 23/00* | (2006.01) | |
| *F16T 1/00* | (2006.01) | |
| *F01D 1/34* | (2006.01) | |
| *H02K 53/00* | (2006.01) | |
| *F01K 3/00* | (2006.01) | |

(56) References Cited

U.S. PATENT DOCUMENTS

| | | | |
|---|---|---|---|
| 6,273,673 B1 * | 8/2001 | Wootten | F01D 5/00 |
| | | | 415/73 |
| 2009/0060735 A1 * | 3/2009 | Ganesh | F01D 5/063 |
| | | | 415/220 |
| 2016/0138469 A1 * | 5/2016 | Bergen | F01D 1/36 |
| | | | 60/776 |

* cited by examiner

|  | Ring Turbine | Classic Turbomachinery | Tesla Turbine |
|---|---|---|---|
| Efficiency (Heat to electricity) | Up to 90% | <40% (see fig D) | Not discussed |
| Steam Collision Velocity | < Mach .1 | > Mach .2 | Not discussed |
| Rotor blades | Ring with channels | Fan | Not discussed |
| Steam delivery | Radial | Axial | Radial |
| Useful Steam Enthalpy | X>.1 | X>.8 | Not discussed |
| Stage Count | 10+ | 1-3 | Not discussed |
| Pressure Compounding | Each stage produces similar work | Successive stages produce declining work. | Not discussed |
| Stage Pressures | .1 BAR to 10+ BAR | 10+ BAR | Not discussed |
| Steam Temperature | Superheating unnecessary | Superheating needed for efficiency. | Not discussed |
| Material tolerance and strength | 3D printable parts | High tolerance fan blades with high strength materials. | Not discussed |
| Heat recycling | Heat above 40C can be recycled into electricity through the stator | Heat is dissipated to atmosphere | Not discussed |

FIG. 8

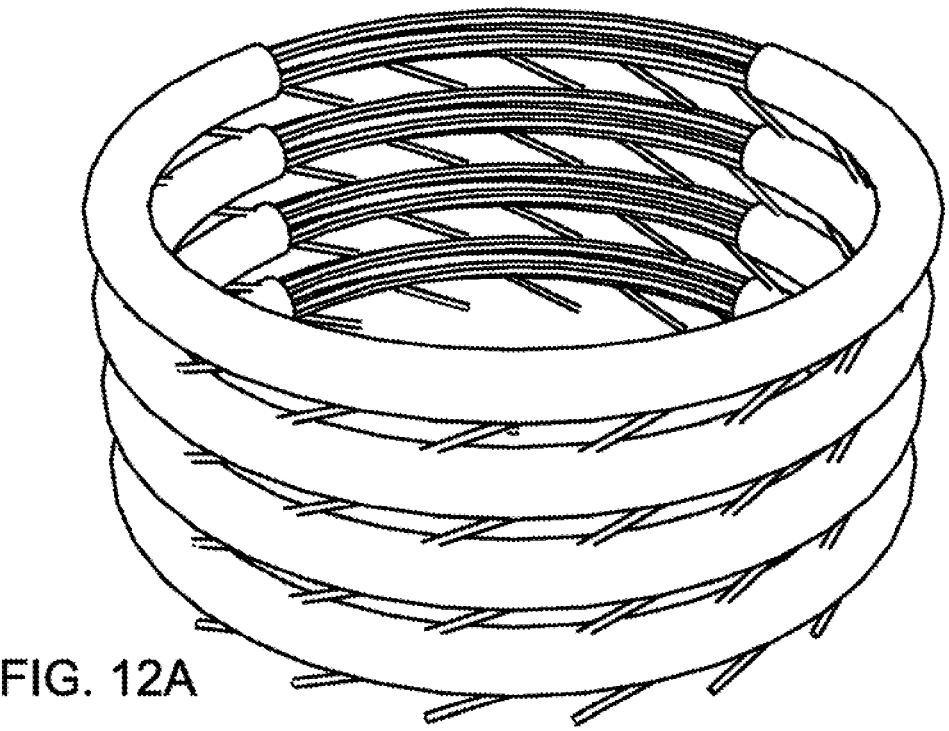
FIG. 12A
FIG. 12B
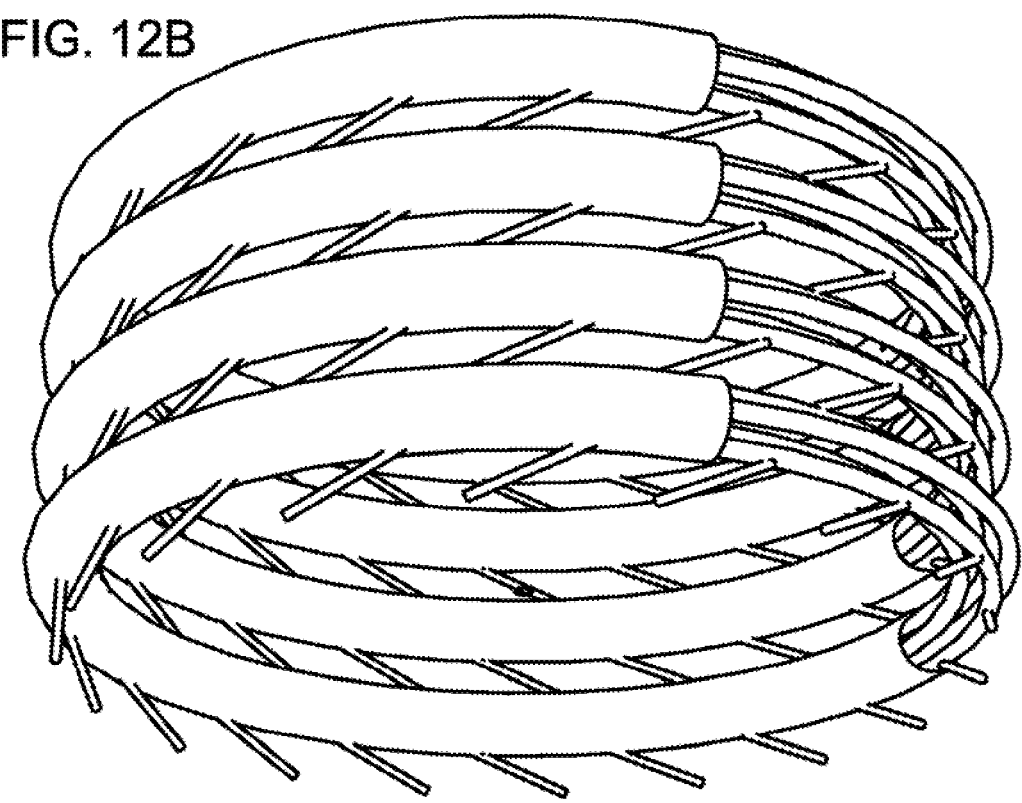

X

Y

Z

PITCH

ROLL

YAW

Pollutant Separation

| Element | g/GJ | Melting Point/Boiling | Extraction |
|---|---|---|---|
| Nitrogen | 28,000,000 | /-196 | Dissipate to environment |
| Oxygen | 7,200,000 | /-183C | Dissipate to environment |
| Sulfur Dioxide | 1300 | -72C/-10C | Exothermic chemical reaction with iron powder, or... $SO_2 + 2\,NaOH \rightarrow Na_2SO_3 + H_2O$ $SO_2 + Cl_2 \rightarrow SO_2Cl_2$ $SO_2 + 2\,H_2S \rightarrow 3\,S + 2\,H_2O$ $2\,SO_2 + 2\,H_2O + O_2 \rightarrow 2\,H_2SO_4$ |
| Nitrogen Oxides NO2 | 260 | -11C/21C | Urea reaction (Applied Catalysis B: Environmental Reaction of NO with urea supported on activated carbons) |
| Carbon Dioxide | 100,000 | -78C/-57C | Exothermic chemical reaction with Li3 at 360C Journal of Physical Chemistry A - 2011 Yun Hang Hu et al |
| Water | ? | 0C/100C | Dissipate to environment |

| Temperature | |
|---|---|
| >21C | Remove water and particulates. |
| >-11C | Remove liquid NO2 |
| >-72C | Remove CO2 and Sulfure Dioxide |
| remainder | Air |

FIG. 60

RING TURBINE ARRANGEMENTS FOR ELECTRICITY GENERATION AND OTHER APPLICATIONS

CROSS-REFERENCE TO RELATED PATENT APPLICATIONS

Pursuant to 35 U.S.C. 119(e), this application claims the benefit of priority from U.S. Provisional Application Ser. No. 62/382,242, filed Aug. 31, 2016, the entire contents of which are incorporated herein by reference.

FIELD OF THE INVENTION

The present invention pertains to turbines for applications such as electrical energy generation and power conversion, and more specifically to steam-driven shaft-less rotating ring turbine arrangements for electrical power generation and other applications.

BACKGROUND OF THE INVENTION

In the contemporary electrical energy economy, a component of inefficiency in energy consumption comes from "Rejected Energy." Most rejected energy allegedly comes largely from two sources: transportation use of petroleum, and losses in centralized electricity generation and transmission. As hybridized and fully-electric transportation vehicles begin to migrate from vehicle-internal burning of petroleum-fuel to storage of at least some fraction of centralized-generated electricity, segments of the transportation use of petroleum sector shift to the centralized-generated electricity sector.

FIG. 1, adapted from the Lawrence Livermore National Laboratory report available at https://flowcharts.llnl.gov/content/energy/energy_archive/energy_flow_2012/2012newUSEnergy.pdf, depicts representative aspects of contemporary energy usage in the United States. From the fuels and source delineated on the left side the diagram, at least in 2012 the combination of Natural Gas, Coal, Bio-mass, and Geothermal, and Solar used for electrical generation total to 38.1% of overall energy fuel/conversion usage (38.1%) and all but a portion of Solar (overall being <0.235%) of this is directed to the powering of steam turbines for centralized electricity generation. Thus, a tremendous if not dominant opportunity to improve the efficiency of centralized electricity generation (and decentralized replacements/supplements to centralized electricity generation) could be obtained by sufficiently improving the efficiency of steam-turbine methods used for converting heat to electricity.

Thus, there is an important need for improving the efficiency of steam-driven electricity generation at centralized and medium-scale decentralized electricity generation plants.

The present invention is directed to improved-efficiency of steam-driven electricity generation at centralized and medium-scale decentralized electricity generation plants.

The present invention comprises multiple stages of shaft-less ring-shaped turbines, each ring turbine serving as a steam-driven magnetized rotor of an AC electrical generator and rotating without synchronization.

FIG. 2 depicts an example novel ring turbine rotor within a (partially cut-away) enclosing stator used to confine (and in some embodiments direct) the flow of steam. This example implementation depicted comprises spiral steam channels winding over the rotor surface as shown, although other steam channel and steam routing structures are possible, anticipated, accommodated, and provided for in the invention. Such a ring turbine rotor arrangement can, for example, be replicated as a stage in a multi-stage implementations provided for by the invention, including with varying scale from stage to stage to more optimally exploit steam energy capture as the multi-stage steam path varies from the effects of preceding stages. The novel shaft-less ring turbine can operate with much wetter steam resulting from its geometry and associated abilities to operate at lower steam velocity than traditional turbines require.

FIG. 3 depicts two perspective views of an example multistage embodiment of the present invention, illustrating example relative stage diameters varying from stage to stage as per steam energy capture design aspects of the invention.

By way of comparison, FIG. 4 depicts a representation of a traditional boiler-fed steam driven turbine arrangement comprising a heat radiator for extruding waste heat and a return pump.

In contrast, FIG. 5 depicts an adaptation of the boiler arrangement of FIG. 4 in accordance with some aspects of the present invention wherein the heat radiator and extrusion of waste heat are omitted. In some embodiments of the invention it can be advantageous to include a radiator after the turbine or turbine sequence, but such a radiator can be smaller than it would be in a traditional turbine system.

In a broader system view, FIG. 6 depicts an example schematic representation of steam, air/exhaust, water, heat, electrical, and boiler-heating fuel or thermal energy flows in an example embodiment of the present invention. It is noted, however, that the present invention typically need not involve the pressurized boiler design, and further can be invariant to the underlying heat source. Less efficient variations are possible that include a radiator to dispose of waste heat as provided for by the invention.

The boiler-heating fuel or thermal energy source can be a fossil fuel, bio-mass fuel, thermo-nuclear (fusion, fission, or other), geo-thermal capture, solar energy capture, etc. The resulting multiple-stage shaft-less ring turbine system is inherently more efficient that traditional turbine-driven electricity generation for several reasons including:

a. The novel shaft-less ring turbine can operate with much wetter steam due to its geometry and lower steam velocity.
b. Using a vacuum pump, some ring stages in the turbine can operate at vacuum pressure. Steam that is too wet to use in a ring can be converted to water by raising the pressure back to atmospheric pressure instead of cooling the steam with a radiator.
c. Waste heat can be recycled for further conversion to electricity rather than being rejected into the atmosphere.

The omission of a shaft allows the steam path to be far more constrained and alternate energy-capture geometries to be used. For example, in a representative implementation of some embodiments, a ring turbine of a stage is arranged so that steam passes through inlet nozzles, pumps or injectors into narrow channels on the surface of the ring turbine into the gap between the ring turbine (rotor) and its enveloping housing (stator). If a shaft existed, then fins, spokes or blades must extend from a center, this entire region could not be sealed from the steam movement.

Additionally, the resulting arrangement can be arranged to provide tightly constrained paths that permit intimate-co-design to optimize across physical laws of motion, electromagnetism, thermodynamics, and steam behavior in a way that energy transfers efficiently and predictably from heat to steam to kinetic energy to magnetic energy to electrical energy.

In an example embodiment, each ring-shaped rotor is rotationally-suspended within an enveloping toroidal stator chamber comprising an interior toroidal cavity to accommodate the ring-shaped rotor, with room for a gap between the exterior surface of the rotor and interior surface of toroidal cavity within the toroidal stator. Thus, each ring-shaped rotor is a toroid without an attached or otherwise associated rotation shaft employed by conventional turbines.

In an example embodiment, pairs or other pluralities of associated electrical coils can be mounted on each stator, and these electrical coils can be used to convert energy from the moving magnetic field sources into electricity. Additionally, electrically-created heat from Ohmic losses in the electrical coils can readily put back into the system.

In some embodiments, the electrical coils can be used to control aspects of the rotors rotation and rotational stability.

In an example embodiment, AC currents are independently generated by each pair or other pluralities of associated electrical coils, and can be arranged to be single-phase or phase-locked multi-phase at a frequency determined by the rotation speed of the associated ring.

In an example embodiment, power electronics can be used to convert AC currents generated by each stage into forms of DC or AC power suitable for use in standard, evolving, or future electrical power distribution.

In an example embodiment, the present invention would comprise a plurality of stages, each successive stage internally operating at consecutively lower operating steam pressures with wetter steam.

In an example embodiment, steam is passed from one stage to the next with steam nozzles, pumps or injectors, which both regulate the pressure between the stages, but also provide an angularly-directed flow of steam through the stator tubes at a moderate velocity to power the rotors without damaging them. Traditional turbine blade damage can potentially occur because of the high velocity of water droplets within the steam. The force-receiving blades comprised by the rotors can be arranged to move perpendicularly to the water droplets, while the rings are moving in the same direction as the steam, further lowering collision energy.

A traditional turbine must cool 'waste' or 'rejected' energy within the steam with a radiator before recycling it back into the boiler as water. This can also be the case in some embodiments of the present invention by design choice, although importantly in such circumstances the amount of waste steam is advantageously far lower.

SUMMARY OF THE INVENTION

In an aspect of the invention, a system is created for electrical energy generation from steam, the system comprising:

At least one steam-driven rotating toroidal ring, the toroidal ring comprising a major-radius and a minor-radius, the rotating toroidal ring for rotation within a plane coinciding with the major-radius of the rotating toroidal ring and comprising a least one steam channel or blade for translating force components of steam pressure into rotational motion, the rotating toroidal ring further comprising at least one magnetic field source arranged to create a time-varying magnetic field occurring in at least one specific region adjacent to the rotating toroidal ring as the rotating toroidal ring rotates;

At least one housing comprising a toroidal cavity for containing the rotating toroidal ring, the toroidal cavity comprising a major-radius and a minor-radius, the major-radius of the toroidal cavity accordingly slightly larger than the major-radius of the rotating toroidal ring and the minor-radius of the toroidal cavity slightly larger than the minor-radius of the rotating toroidal ring so that the rotating toroidal ring is free from contact with the housing and can freely rotate within the housing, the housing further comprising a plurality of steam nozzles, pumps or injectors pointing into the toroidal cavity for directing pressurized steam into the channels for at least a first portion of rotation of the rotating toroidal ring, the housing further comprising a plurality of steam outlets for removing pressurized steam from the channels for at least a second portion of rotation of the rotating toroidal ring within the toroidal cavity;

At least one bearing arrangement comprised by or attached to the housing within the toroidal cavity, the bearing arrangement for supporting the rotating toroidal ring within the toroidal cavity of the housing, and At least one pair of electrical coils, each electrical coil located on the outer surface of the housing at locations diagonally opposite one another across the axis of the minor radius of the toroidal cavity and within the specific region where a time-varying magnetic field will occur as the rotating toroidal ring rotates, each pair of electrical coils oriented so that variations in the magnetic field produced by rotational motion of the magnetic field source comprised by the rotating toroidal ring, Wherein the rotating toroidal ring lies within the toroidal cavity of the housing in a manor where it can freely rotate when driven by steam pressure as supported by the at least one bearing arrangement;

Wherein the rotating toroidal ring serves as a rotor and the housing serves as the stator housing of an electrical generator, and Wherein steam entering the toroidal cavity through the inlets and exiting through the steam outlets forces the rotating toroidal ring rotor to rotate within the stator housing, thus creating a time-varying magnetic field that creates an AC current generated within the at least one pair of electrical coils, thus forming a steam-powered electrical AC current generator.

In another aspect of the invention, power electronics can be used to convert the AC currents generated by each stage into AC power suitable for use in standard electrical power distribution.

In another aspect of the invention, the at least one bearing arrangement comprises rotating balls.

In another aspect of the invention, the at least one bearing arrangement moveably-contacts a supporting fin attached to the rotating toroidal ring.

In another aspect of the invention, the at least one bearing arrangement comprises a magnetic bearing.

In another aspect of the invention, the at least one bearing arrangement comprises a steam bearing.

In another aspect of the invention, pumps or injectors are used in the arrangement to provide the additional pressure range to at least one of the ring stages.

In another aspect of the invention, each stage has a natural temperature, based on the pressure within a cavity comprised by that stage.

In another aspect of the invention, the temperature of a stage operating is equal to the boiling temperature of water at the stage pressure.

In another aspect of the invention, the housing of each stage is arranged to transmit heat from the steam within the stator, into the pressurize feedwater that enters the boiler.

In another aspect of the invention, heat from bearing friction is cooled with thermal coupling with at least one stage housing, with the heat being transferred to steam enthalpy within that at least one stage.

In another aspect of the invention, IR heat generated in electrical coils is cooled with thermal coupling with at least one stage housing, with the heat being transferred to steam enthalpy within that at least one stage.

In another aspect of the invention, exhaust heat from the boiler is cooled with thermal coupling into the pressurized feedwater that enters the boiler.

In another aspect of the invention, at least one injector pump and radiator is used to generate cavities with arbitrary temperature and pressure that is powered by a high-pressure steam source.

In another aspect of the invention, at least one low temperature region within a volume enclosed by a plurality of stages is used to extract at least one pollutant created from boiler heating.

In another aspect of the invention, at least one nozzle is used in the above arrangement to extract at least one pollutant created from boiler heating.

In another aspect of the invention, at least one other region within a volume enclosed by a plurality of stages, that region comprising high pressure, is used to induce at least one pollutant created from boiler heating into at least one heat-producing chemical reaction.

In another aspect of the invention, at least one nozzle is used in the above arrangement to induce at least one pollutant into at least one heat-producing chemical reaction.

In another aspect of the invention, at least one other region within a volume enclosed by a plurality of stages, that region comprising high temperature, is used to induce at least one pollutant created from boiler heating into at least one heat-producing chemical reaction.

In another aspect of the invention, at least one nozzle is used in the above arrangement to induce at least one pollutant created from boiler heating into heat-producing chemical reaction.

In another aspect of the invention, at least one pollutant created from boiler heating is extracted from exhaust created from boiler heating.

In another aspect of the invention, at least one pollutant created from boiler heating is exposed to a heat-producing chemical reaction.

In another aspect of the invention, heat produced from the heat-producing chemical reaction is absorbed into at least one stage.

In another aspect of the invention, heat produced from the heat-producing chemical reaction is absorbed into the housing of the at least one stage.

In another aspect of the invention, at least one pollutant created from boiler heating is transformed in a manner that releases heat.

In another aspect of the invention, at least one pollutant created from boiler heating is transformed in a manner that produces at least one solid waste product.

In another aspect of the invention, the at last one solid waste product that can be produced in the above arrangement can be easily disposed of.

In another aspect of the invention, nearly all pollutants created from boiler heating are transformed into heat that can be reused by the system and/or waste products which can be easily disposed of, resulting in Zero Emission Electricity Production (ZEEP).

BRIEF DESCRIPTION OF THE DRAWINGS

FIG. 8 provides a table providing example points of comparison between the present ring-turbine-based invention, classical turbo-machinery, and aspect of the classical Tesla turbine.

FIGS. 12A and 12B depict two example steam flows as would be confined on the outside by the enveloping stationary housing (a short section of which is shown in FIG. 11) and bounded by the steam-passage drive channels.

FIG. 53 depicts a second electrically-conductive layer positioned atop the first electrically-conductive layer of FIG. 34.

FIG. 60 provides a table providing example pollutant separation parameters.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Motivation for Invention

Figure 1:
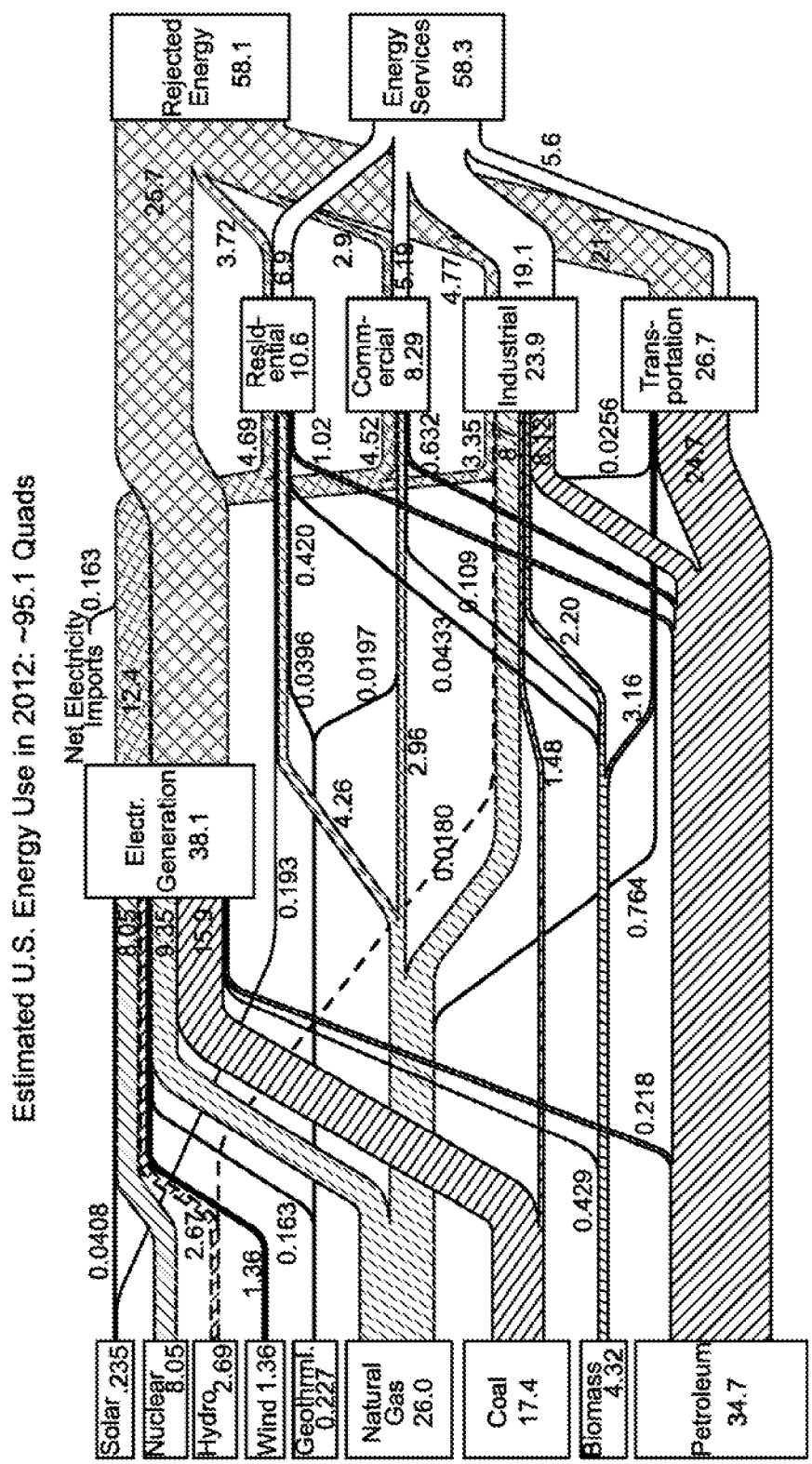
FIG. 1, adapted from the Lawrence Livermore National Laboratory report available at https://flowcharts.llnl.gov/content/energy/energy_archive/energy_flow_2012/2012newUSEnergy.pdf, depicts representative aspects of contemporary energy usage in the United States.
Figure 2:
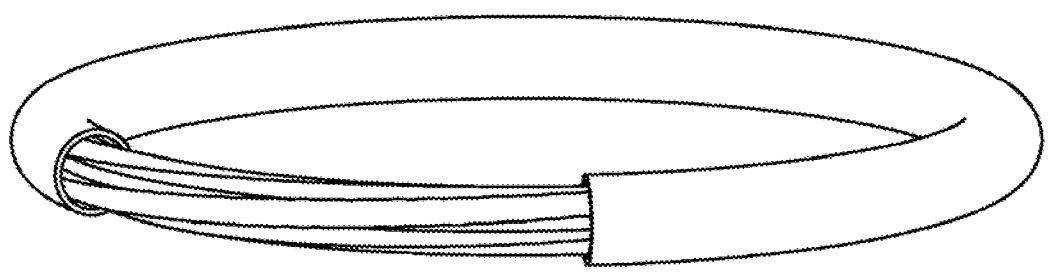
FIG. 2 depicts an example ring turbine rotor within a (partially cut-away) enclosing stator used to confine (and in some embodiments direct) the flow of steam. Such an arrangement can be replicated as a stage in a multi-stage implementations provided for by the invention.
Figure 3A:
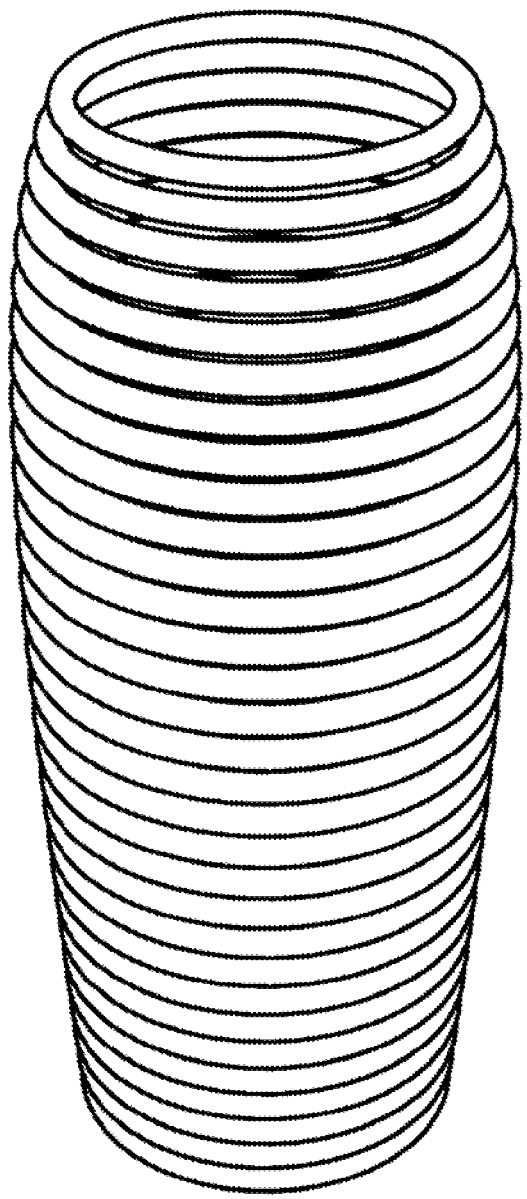
FIGS. 3A and 3B depict two views of a multistage embodiment of the present invention, showing example relative stage diameters.
Figure 3B:
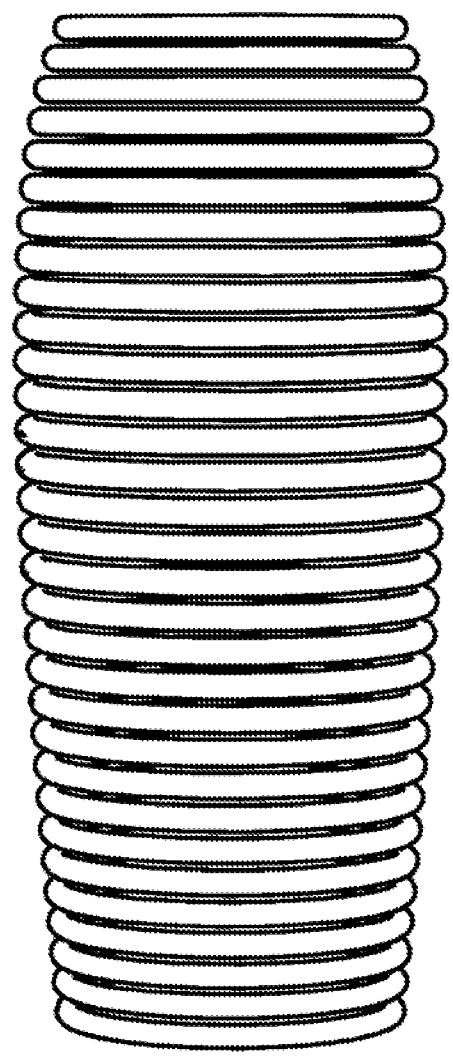
Figure 4:
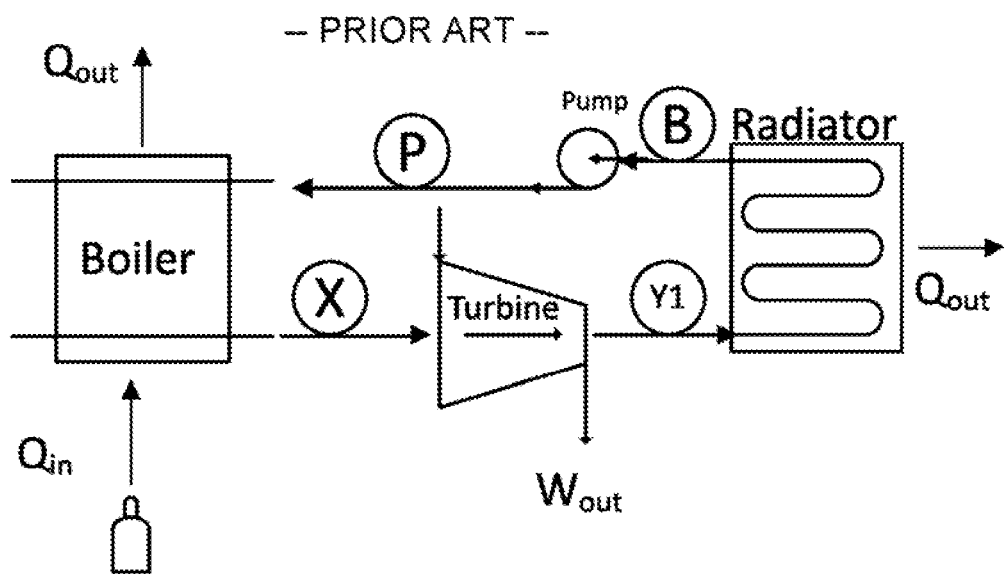
FIG. 4 depicts a representation of a traditional boiler-fed steam driven turbine arrangement comprising a heat radiator for extruding waste heat and a return pump.
Figure 5:
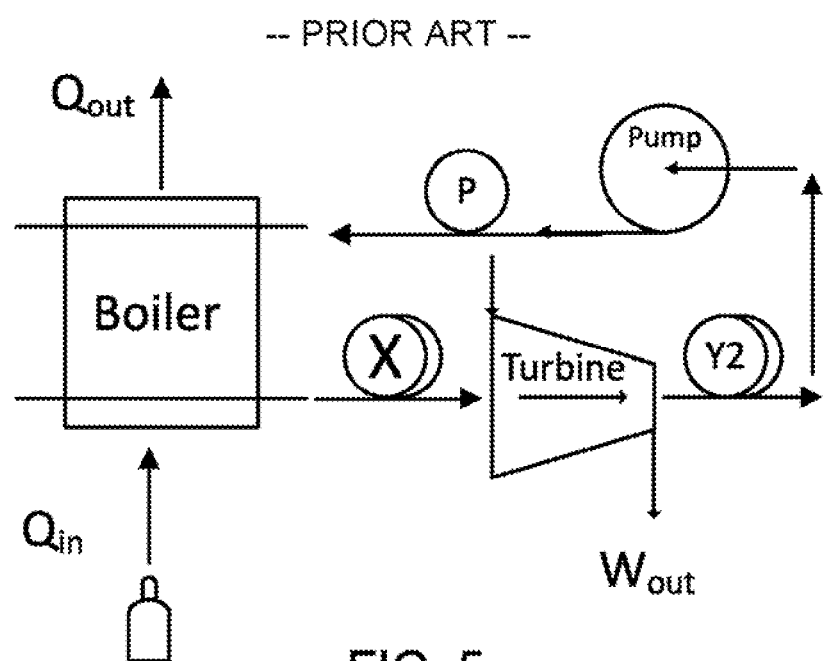
FIG. 5 depicts an adaptation of the boiler arrangement of FIG. 4 in accordance with some aspects of the present invention wherein the heat radiator and extrusion of waste heat are omitted.
Figure 7:
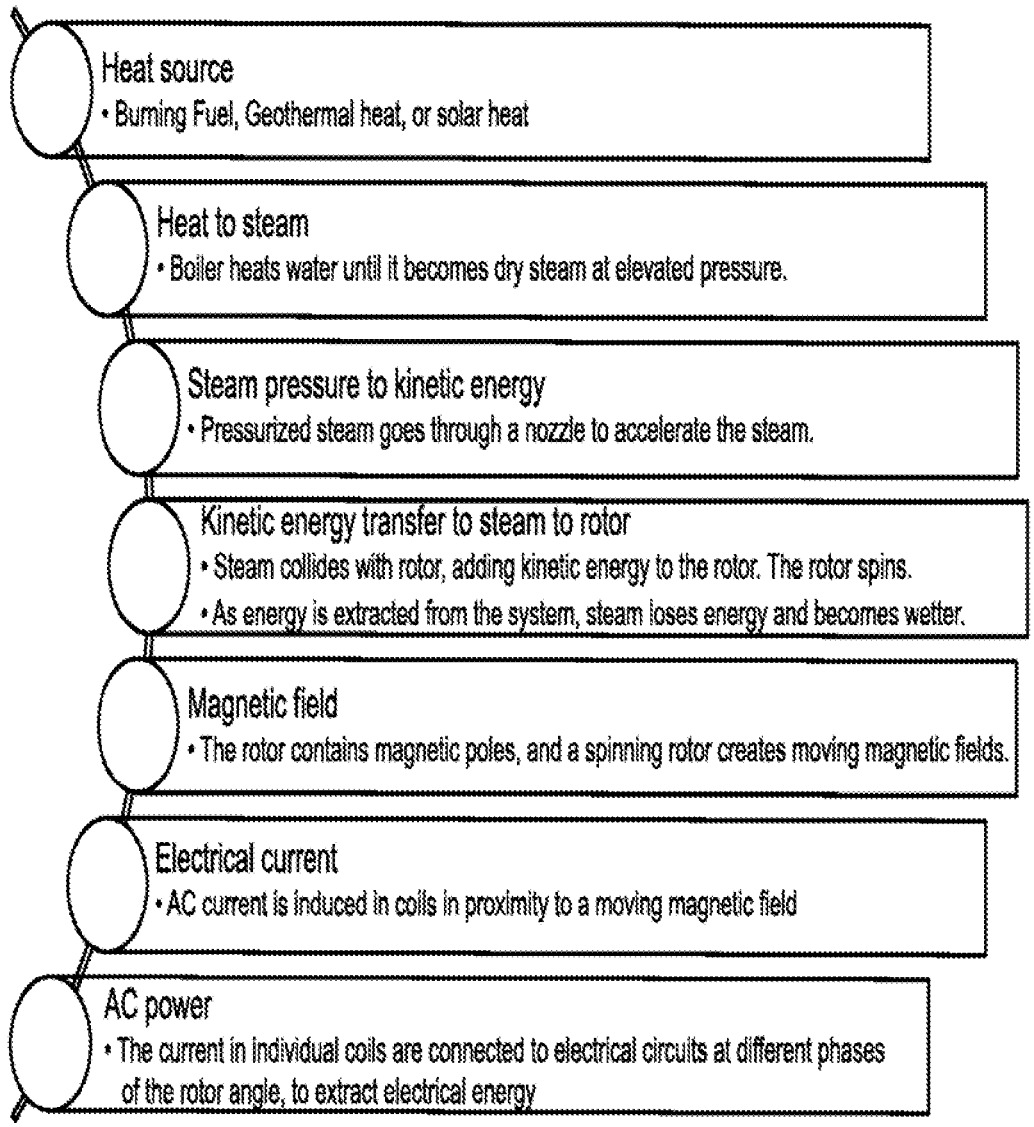
FIG. 7 depicts the stages of energy transfer in a turbine system.

Summarizing the opening discourse above, FIG. 7 depicts the stages of energy transfer in a turbine system. As seen in FIG. 1, present-day electrical generation is less than 33% efficient, and energy losses in electrical generation exceed energy losses for all other uses of energy combined. A novel "Ring Turbine" system is presented which is directed to dramatically improving energy efficiency.

A comparison of key features between the novel ring turbine of the present invention and classical turbines is shown in FIG. 8. The Tesla Turbine, and other radial turbines share some attributes with the Ring turbine, but are not widely used for electrical generation, and so are not discussed. The primary engineering difference between the systems is that the ring turbine uses a greater fraction of the enthalpy of steam—which is the energy that drives the turbine blades—than has been seen before. There are a series of novel innovations presented that make this possible.

An important innovation is to lower the velocity of steam relative to the rotor blades. Steam that attacks the blades radially gain an advantage because the steam and blades are traveling in the same direction, so the relative speed will be slower. Steam that attacks the fan blades head-on will always see collision velocities equal to or above the speed of the steam.

Fan blade damage is a concern for traditional rotors because of the speed of the steam, and the delicate geometries of the fan design. Lowering the relative steam velocity by half, decreases the destructive force of the steam by one fourth, but also decreases the amount of energy available for harvesting by a factor of four. To compensate for this more stages are used.

Ring turbines with many stages do not need such highly optimized geometries for each stage, as unused energy can still be processed in later stages. Blade damage will not occur with dry steam (steam dryness factor $\chi=1$) because there are no water droplets in dry steam, and water droplets have 1000 times higher density than steam. As steam becomes wetter, water droplets of sufficient size will collide with the rotor at high velocities.

Superheating steam provides an extra 10-20% of enthalpy for most turbine systems today, but still 50-70% of the total enthalpy is wasted, because the turbine is subject to the second law of thermodynamics: that the entropy of the steam must increase. Perfect turbines, which would be isentropic, still cannot consume the amount of enthalpy in pressurized dry steam. Superheating increases the amount of harvested enthalpy, but does not reduce the amount of wasted enthalpy.

Pressure compounding is a term of art for having multiple turbine stages operating under the same source of steam, with subsequent stages using lower energy steam after passing through an earlier stage. Because of the nature of fan blades used in traditional turbines, the steam path must be sealed inside a large cowling that holds each of the turbines, which also avoids dissipation of the steam after the first turbine. Traditionally, pressure compounding has rapidly diminishing returns, as subsequent stages can do substantially less work than the previous stage. Ring turbine stages also can provide diminishing returns in subsequent stages, however the constrained steam path allows for many stages to be effective.

The ring turbine needs a substantially smaller cowling, due to the shape of the rotor and allowing for a highly-constrained steam path. In an example embodiment, nozzles, pumps or injectors can be placed between stages to allow for a constant velocity of steam through many stages while enthalpy is steadily removed from the steam.

Heat is removed from the ring stages to utilize more of the steam enthalpy. This heat is recycled back into the feedwater before it enters the boiler. Each of the many stages operate at different temperatures, so the feedwater is heated first with the cooler temperatures, and then successively with the other stages.

Steam traps can be used at each stage in some embodiments, that allow liquid water to be separated from the steam as the enthalpy declines (making the steam wetter). Removing the water reduces the mass that drives the later ring stages; however, it also returns hotter water to the feed water, reducing the amount of energy consumed in the boiler.

Use of Shaft-Less Magnetic Ring as Both Steam Turbine and Generator Rotor

The novel ring turbine system of the present invention can comprise one or more rings, where each ring is composed of a stator in the shape of a hollow toroid (or ring) with a ring-shaped rotor that rotates within in the stator.

The rotor can be, for example, of a toroidal shape, and for example comprise one or more steam energy capturing channels fabricated into or built on top of on the rotor surface. Alternatively, the rotor can comprise blades embedded within cavities the rotor or otherwise attached to the rotor—such blades can be configured to serve a similar function as a fan blade on a conventional turbine in that they would capture kinetic energy from steam passing through the ring and transfers this kinetic energy into rotational motion of the rotor that can, for example, be used to electromagnetically generate electricity.

Figure 9:
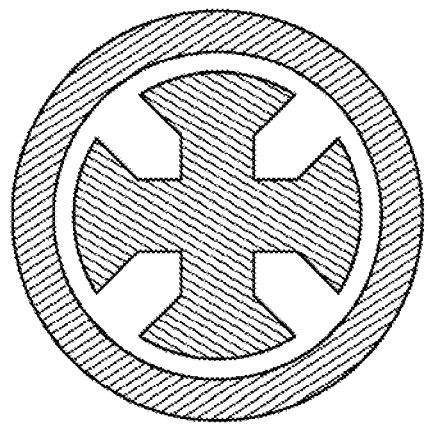
FIG. 9 depicts an example cross-sectional view of an example turbine ring as can be employed in embodiments of the invention, comprising here an example of four steam-passage drive channels, each channel comprising an example specified cross-sectional geometry.

FIG. 9 depicts an example cross-sectional view of an example turbine ring as can be employed in embodiments of the invention, comprising here an example of four steam-passage drive channels, each channel comprising an example specified cross-sectional geometry.

Figure 10:
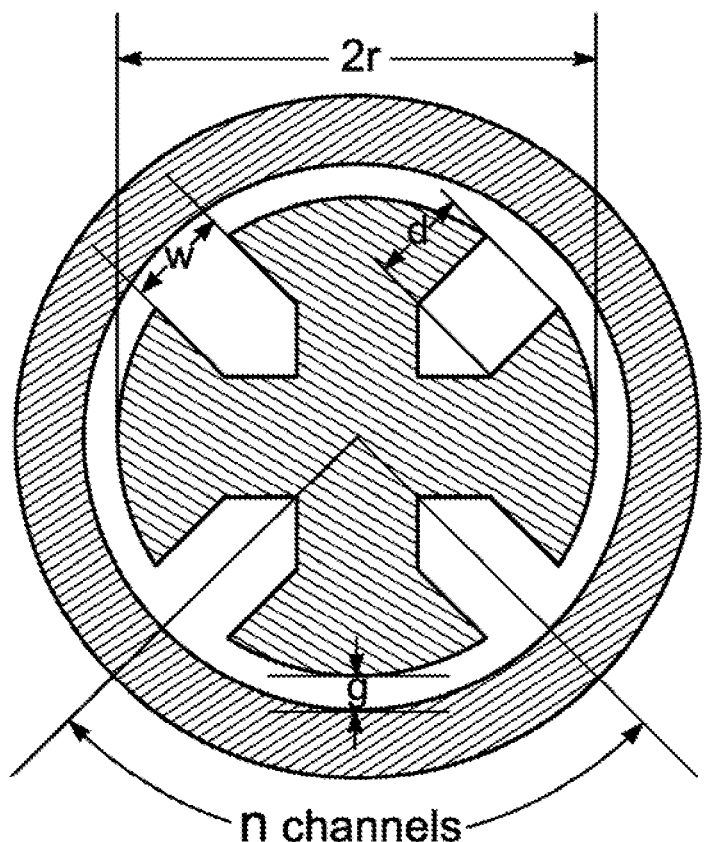
FIG. 10 depicts dimension-notation symbols associated with the example cross-sectional view depicted in FIG. 9, contemplating four or other ("n") steam-passage drive channels. Other cross-sectional geometries could have other dimension-notation symbols.

FIG. 10 depicts dimension-notation symbols associated with the example cross-sectional view depicted in FIG. 9, contemplating four or another number ("n") steam-passage drive channels. Other cross-sectional geometries could have other dimension-notation symbols.

Figure 11:
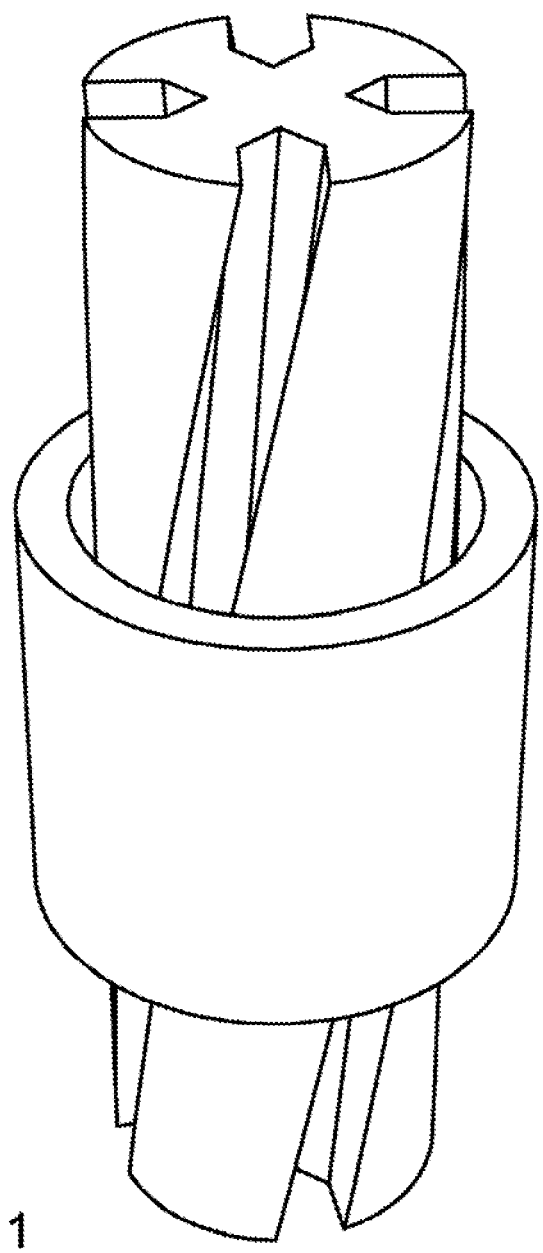
FIG. 11 depicts a short angular segment of an example turbine rotating ring, serving as a rotating machine rotor, as it would be oriented within a shortened (for visual clarity) segment of an associated enveloping stationary housing, serving as a rotating machine stator. Steam flows through the channels are confined by the interior surface of enveloping stationary housing. Electrical coils can be arranged around the exterior surface of the stationary housing for creating electrical current and/or functions involved in localizing or stabilizing rotation of the ring.

FIG. 11 depicts a short angular segment of an example turbine rotating ring, serving as a rotating machine rotor, as it would be oriented within a shortened (for visual clarity) segment of an associated enveloping stationary housing, serving as a rotating machine stator. Steam flows through the channels are confined by the interior surface of enveloping stationary housing.

The rotor can be fabricated from, or partially made, of magnetic material, for example a permanent magnet, a ferromagnetic material, or arrangement for-self excitation. Electrical coils can be arranged around the exterior surface of the stationary housing for creating electrical current and/or functions involved in localizing or stabilizing rotation of the ring.

It is noted that rare earth permanent magnets comprising Alnico material are capable of functioning well above the critical temperature of steam.

Typically spinning magnetic devices such as generators or motors employ a shaft between the blades that capture kinetic energy and the magnets that are used to transform this kinetic energy in magnetic energy and then electrical energy. In this configuration, the 'blades' and magnet are integrated into a single geometry.

The regions where there is moving steam are narrow and constrained paths, that allow for highly determined behavior that allows for design choices that allow for continuous recovery of energy through many stages.

Figure 13:
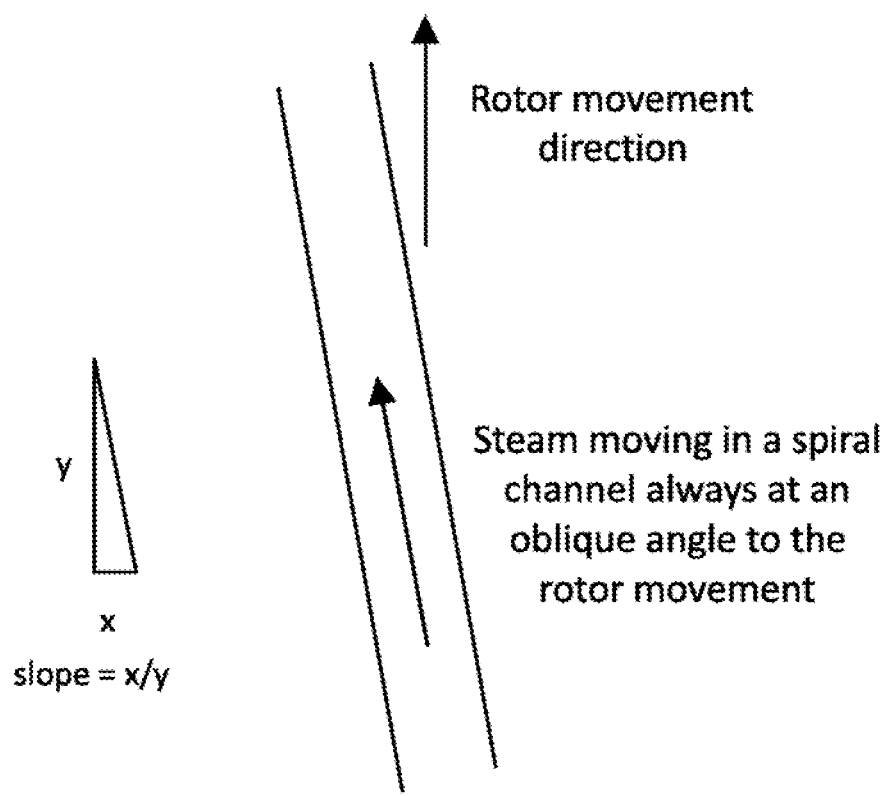
FIG. 13 depicts steam passage through an example wrapping-spiral drive-channel on the side of an example rotor ring.

FIGS. 12A and 12B depict two views of example steam flows as would be confined on the outside by the enveloping stationary housing (a short section of which is shown in FIG. 11) and bounded by the steam-passage drive channels. FIG. 13 depicts steam passage through an example wrapping-spiral drive-channel on the side of an example rotor ring.

In an example embodiment, steam enters the stator of a stage through nozzles that accelerate the steam to design velocity, and this kinetic energy is transferred to kinetic energy in the rotor.

In another example embodiment, steam travels between all stages without the benefit of nozzles, but the steam velocity remains high because the closed steam path must maintain a constant mass flow rate throughout.

Figure 14:
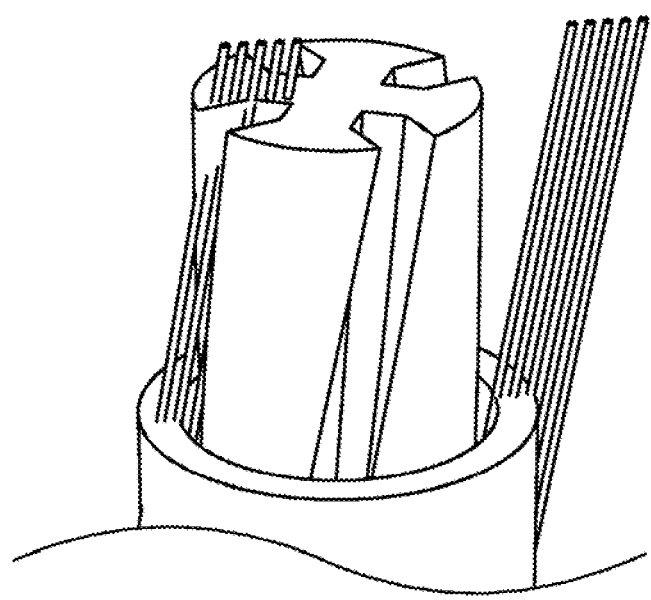
FIG. 14 depicts an example representative steam flow paths (represented in the figure by rods), introduced (lower left) through passages (not shown) in the stator (outer cylinder) by drive nozzles, pumps or injectors (not explicitly depicted, but located upper and middle left) into the steam-drive channels, flowing through the channels to an outlet location, and exiting through passages (not shown) in the stator to the exterior of the stator (upper right).

FIG. 14 depicts an example representative steam flow paths (represented in the figure by rods), introduced (lower left) through passages (not shown) in the stator (outer cylinder) by drive nozzles, pumps or injectors (not explicitly depicted, but located upper and middle left) into the steam-drive channels, flowing through the channels to an outlet location, and exiting through passages (not shown) in the stator to the exterior of the stator (upper right).

Figure 15:
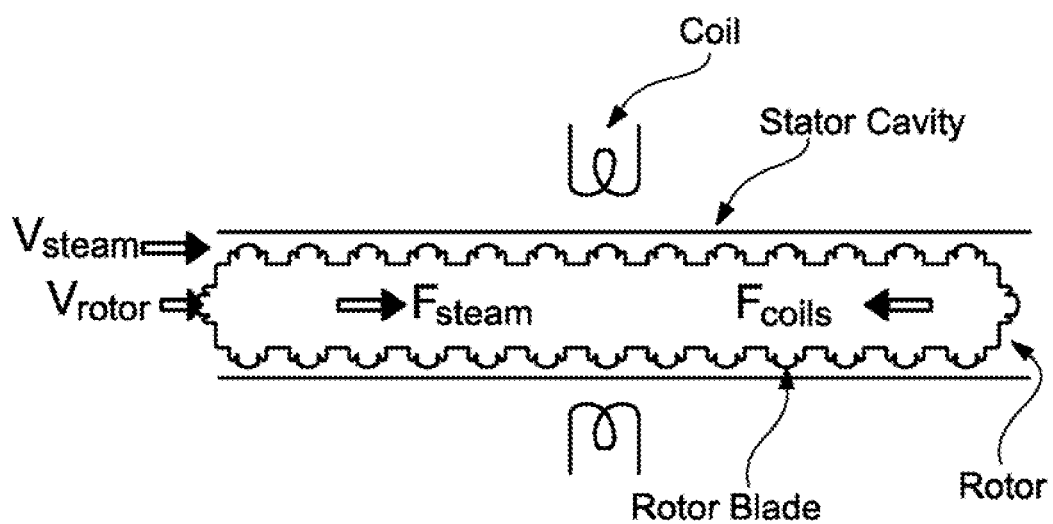
FIG. 15 depicts a balance of forces created in one direction by relatively faster steam speed pushing against a relatively slower ring rotor rotation velocity, these leading to a rotational driving force imparted to the ring rotor, and in the opposite direction contra-forces induced on the rotating magnet of the rotor by currents in associated stator coils.

FIG. 15 depicts a balance of forces created in (a) one direction by relatively faster steam speed pushing against a relatively slower ring rotor rotation velocity, these leading to a rotational driving force imparted to the ring rotor, and (b) in the opposite direction contra-forces induced on the rotating magnet of the rotor by currents in associated stator coils. In one aspect of the invention, currents in associated stator coils can be controlled to provide motion or other regulatory functions on the motion and position of the rotor.

For sufficiently small orifices, the nozzle velocity is primarily dependent on the pressure ratio between the output and input pressures. Ratios above 0.900 produce steam velocities at a fraction of the speed of sound which is necessary to protect the rotor from wet steam damage.

The novel ring turbine arrangement is advantageous because more of the enthalpy of steam can be converted into electrical energy, resulting in much greater overall efficiency, and less rejected heat escaping from the system. In traditional turbines waste heat is expelled into the atmosphere from a radiator used to cool steam to water state prior to entering the boiler. As steam enthalpy is harvested, the steam becomes wetter.

There is a range of pressures and temperatures where steam and water droplets can coexist, and this region is called "wet steam". As energy is added to wet steam it becomes dryer until there are no longer any water droplets. Adding additional energy to dry steam (superheating) increases the temperature of the steam, whereas the temperature of wet steam is always at the boiling temperature of water. The 'dryness' of steam is called the 'steam fraction', and is often mathematically denoted as x.

Water droplets in traditional turbines crash into turbine blades at very high speeds, and finely crafted turbine blades are easily damaged with water droplets. Thus, traditional turbines tend to only harvest energy from superheated steam, or steam that is mostly dry ($\chi > 0.8$).

The ring turbine can operate with wetter steam. If no steam traps are used between stages, the steam will continue to get wetter at each stage, until a lower bound is reached, after which the remaining steam enthalpy must be rejected. When steam traps are used, the steam passing through the turbine will always have ($\chi > 0.8$), and the lower bound is removed.

The ring turbine operates with slower steam than traditional turbines. Ring turbines also differ from many turbine configurations in that the rotor that is traveling in the same direction as the steam, rather than perpendicularly to it. Thus, ring turbines can have much lower destructive force on the rotor. By maintaining milder collisions between the steam and the rotor allow the turbine to operate at far lower values of x, perhaps as low as 0.1 or below. A ring turbine can operate with far greater efficiency, and potentially have extremely low levels of rejected energy.

When a turbine has finished harvesting energy from the steam, a radiator or evaporator pond is often used to remove and reject energy until there is no steam remaining, and only water. A radiator will condition the steam with $\chi > 0$ that leaves the turbine, until the steam becomes water ($\chi = 0$). $\chi_{min}$ reflects the lowest dryness factor a specific turbine embodiment uses. Lowering $\chi_{min}$ is one way to increase system efficiency when steam traps are not employed.

Superheating steam can generally increase the efficiency of a turbine system by using enthalpy that exists in steam that is heated beyond the point where $\chi = 1$.

Use of Counterintuitive Attributes of the Steam Cycle

Figure 16:
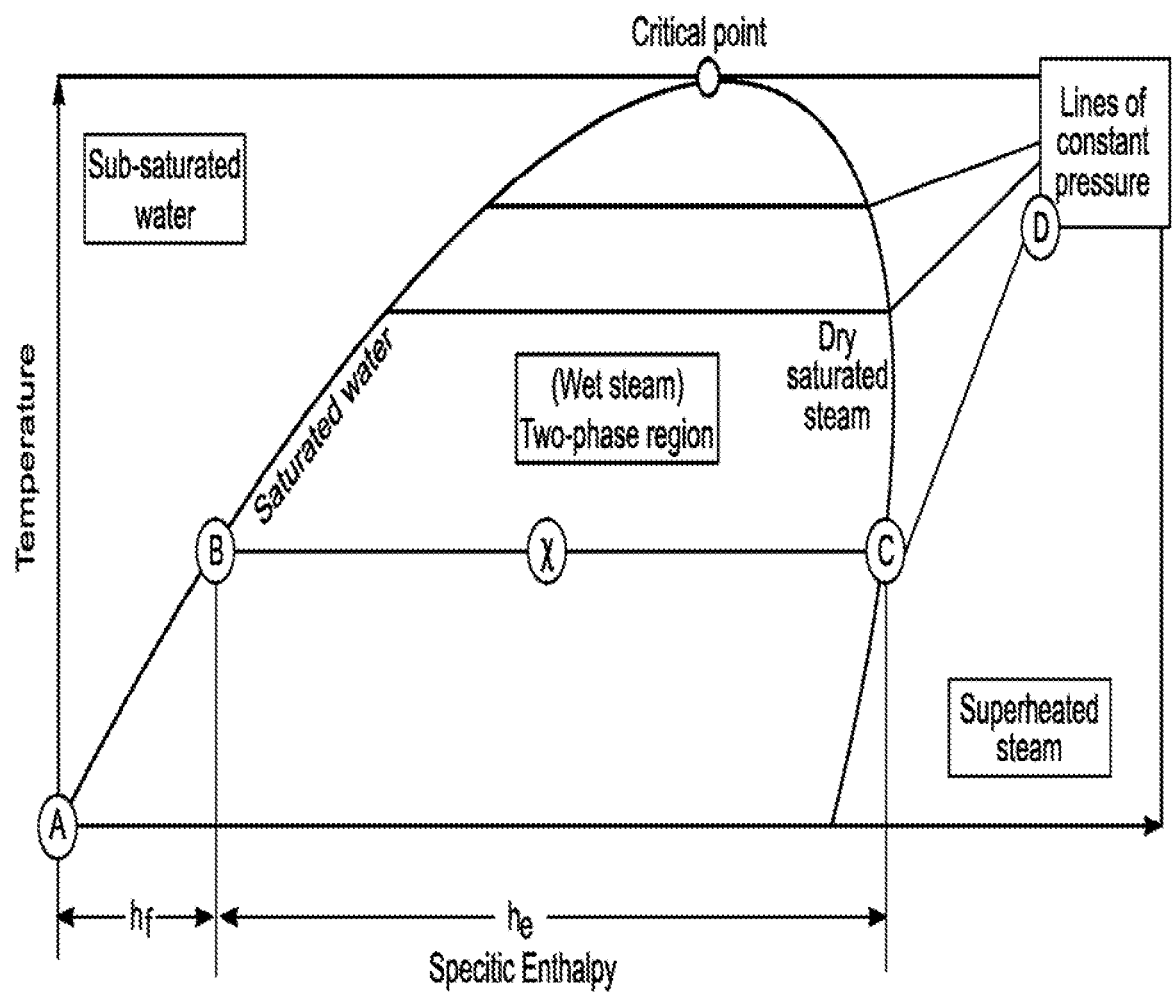
FIG. 16 depicts relationships between pressure and (specific) enthalpy and associated composition of steam and water (sub-saturated water, saturated water, wet steam, dry steam, and superheated steam) in various pressure regimes.

FIG. 16 depicts well-known relationships between pressure and (specific) enthalpy and associated composition of steam and water (sub-saturated water, saturated water, wet steam, dry steam, and superheated steam) in various pressure regimes.

One skilled in the art of turbine design will appreciate that well understood characteristics the "steam cycle" (enthalpy/pressure path of steam as it passes through the boiler, turbine, radiator, and pump) are utilized by the current invention in a novel manner.

Figure 17:
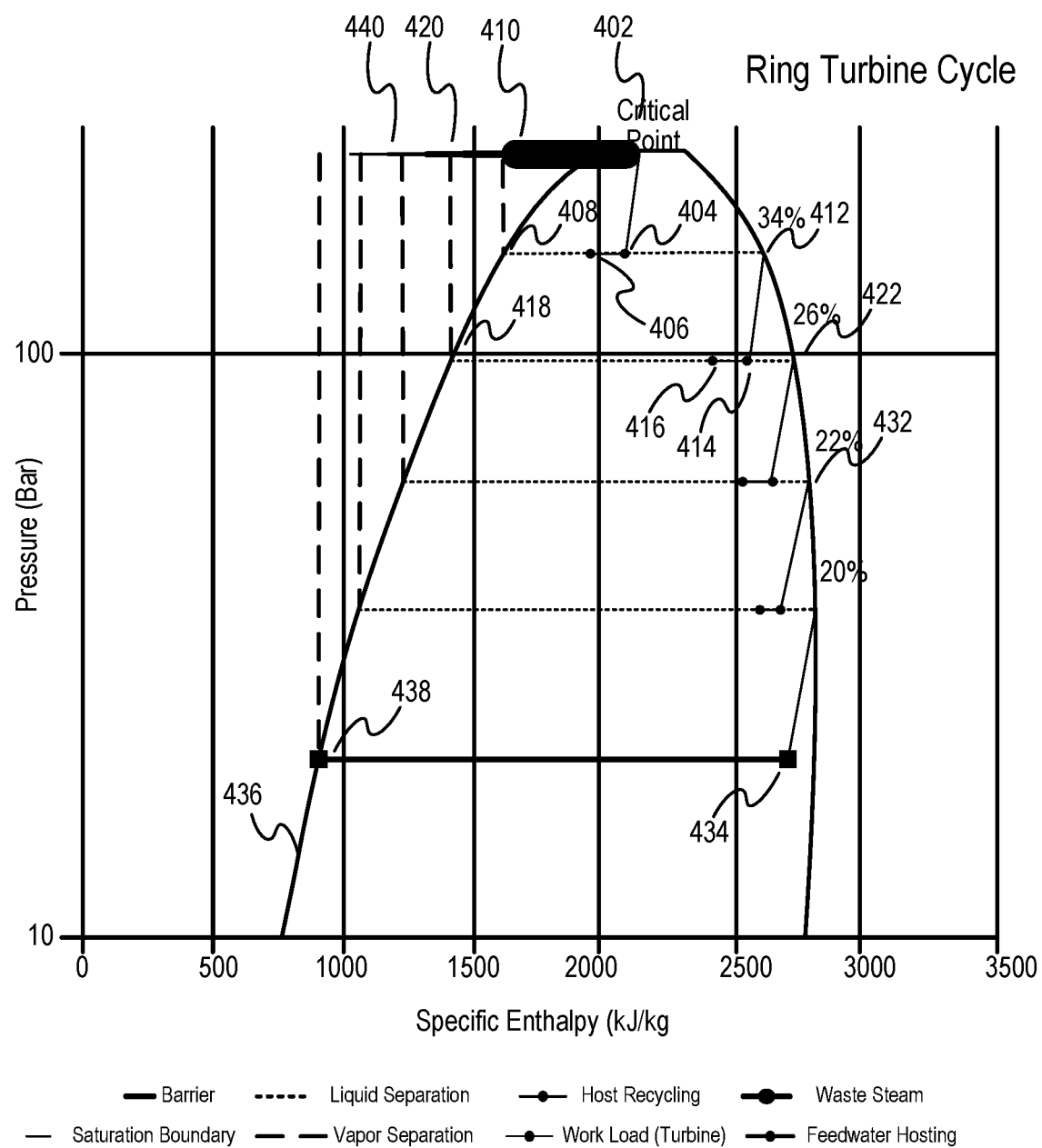
FIG. 17 depicts a simplified example numerical simulation of a steam thermodynamic cycle of as can be used by the present invention in terms of the relationships between pressure and enthalpy in various pressure regimes depicted in FIG. 16.

FIG. 17 depicts an example conceptual steam thermodynamic cycle of as can be used by the present invention in terms of the relationships between pressure and enthalpy in various pressure regimes depicted in FIG. 16. In this example, five ring stages are shown, with each of their respective thermodynamic path. The saturation line (436) shows the boundary between water and wet steam on the left, and between wet steam and superheated steam on the right.

The boiler heats up pressurized water from (410) to (402), which delivers steam to the turbine. In this example, the boiler delivers steam at the critical point of water, to maximize the amount of enthalpy that can be harvested. Other starting points have different trade-offs. If a lower pressure starting point is used, or if the path crosses the saturation boundary at a higher enthalpy, it becomes more difficult to harvest the available enthalpy. Supercritical starting points are possible, and may provide additional efficiency.

Steam enters the first ring stage at (402), and leaves the first stage at (408). The turbine action both reduces the pressure of the steam and harvests some enthalpy from the steam (which is converted to electrical power). The path shown has 90% entropic efficiency, which means the turbine could harvest 90% of the enthalpy relative to an ideal turbine which does not increase the entropy of the steam.

Heat recycling occurs from between points (404) and (406). The temperature of steam at point 406 is slightly below the critical temperature of steam (374C). The stator that houses the steam should also heat up to the same temperature by being exposed to the steam. Pressurized feedwater (440) to (420) is colder than the stator, and the feedwater is routed through pipes with thermal coupling with the stator. With sufficient thermal gradient, and sufficient thermal coupling, energy will leave the steam between (404) and (406), and the same amount of energy will be added to the pressurized feedwater between (420) and (410).

At point (410) the steam is separated into water and dry steam via the use of a steam trap. Venturi steam traps have no moving parts, so are preferable for reliability, however they require the water exit at a lower pressure—which is not shown on the chart. Also, steam traps are imperfect, and some steam will escape with the water, and some water will remain with the steam, but in small amounts neither undermines the mechanism being explained. The diagram assumes ideal steam traps, From point (406), the separated water goes to point (408), and the separated steam goes to point (412). The total mass and enthalpy of the steam remains constant, and the pressure and temperature of the separated water and steam are similar. The water is pumped from (408) to (410) to and mixed with the pressurized feedwater. Feedwater from the first stage is not heated via heat recycling, because this feedwater is (nearly) as hot is the steam between points (404) and (406). This water can be mixed with other feedwater and sent directly into the boiler.

Separated steam from point (406) travels to point (412). Because the critical point (402) aligns with the midpoint between the saturation line (436), the steam at point (404) is about 50% wet, and at point (406) is even wetter. After separation, only 34% of the mass of the steam remains, and this steam enters the second turbine stage from points (412) to (414). Heat is removed for recycling from (414) to (416), and the water is separated to point (418) and pumped to point (420). The temperature at point (420) is now lower than the temperature of the steam from points (404) to (406), which allows energy to transfer from the steam on the output of the first turbine stage, and be transferred to the pressurized feedwater from the second (and later) stages.

Steam at point (416) is mostly dry, so the amount of feedwater released is lower than the first stage. The separated steam at point (422) now has 26% of the mass of the source steam, with the balance having been returned as feedwater to the boiler. The last stage stages (432) operate with 22% and 20% of the steam mass respectively, and each operate at lower pressures and temperatures. The last stage ends at point (434).

Waste heat is radiated to the atmosphere between points (434) and (438). The enthalpy between these two points is wasted. The water is pumped up and mixed with the pressurized feedwater. Because the last stage produces the coldest feedwater, this water will be heated by receiving energy from every turbine stage from coldest to hottest.

The pressurized feedwater path from (440) to (420) to (410) is a mixture of pumped waste water from each of the stages, with the water heated by thermal coupling with the stators. The amount of feedwater increases with each mixing. When the final feedwater is delivered from (408), 100% of the steam mass has been reassembled before entering the boiler. If the thermal coupling was poor between the turbines and pressurized feedwater, then the water entering the boiler (410) would be cooler and have lower enthalpy, which would mean the boiler would need to provide more energy for the same amount of power output.

It is customary in traditional turbines to preheat the feedwater using the hot exhaust from the boiler. Although not shown, this would occur at point (410) after all other heat recycling had been completed (because the exhaust is hotter than the feedwater).

Energy enters the system in the boiler. 100% of the steam mass is heated from (410) to (402). The total energy put into the system is the mass of the steam, times the enthalpy change between (410) and (402). Energy leaves the system in the turbines as electrical energy. 100% of the steam provides harvestable enthalpy between points (402) and (404), and 34% of the steam provides harvestable energy between (412) and (414), etc.

Energy also leaves the system as waste steam where 20% of the steam loses all the enthalpy between (434) and (438). Because of conservation of energy:

$$Q_{boiler} = W_{out} + Q_{waste}, \text{ and efficiency} = \frac{W_{out}}{Q_{boiler}}$$

$$m_{402}(h_{402} - h_{410}) = W_{out} + m_{434}(h_{434} - h_{438})$$

$$\text{effiency} = \frac{(h_{402} - h_{410}) - \frac{m_{434}}{m_{402}}(h_{434} - h_{438})}{(h_{402} - h_{410})} = \frac{\Delta h_{boiler} - m_{waste}\Delta h_{waste}}{\Delta h_{boiler}} \cong$$

$$\frac{500 - .2(1800)}{500} = 28\%$$

FIG. 17 shows poor efficiency (28%): here $\Delta h_{waste}$ is 3 or 4 times larger than $\Delta h_{boiler}$, and $m_{waste}$ is 20%. $\Delta h_{waste}$ becomes larger as the output pressure of the last stage becomes smaller. The size of $\Delta h_{waste}$ cannot be improved, as it is primarily a physical characteristic of steam.

The key to efficiency is minimizing $m_{waste}$. Excellent heat recycling will minimize $\Delta h_{boiler}$, and $\Delta h_{waste}$ cannot be minimized. FIG. 17 has $m_{waste}$=20%.

Figure 18:
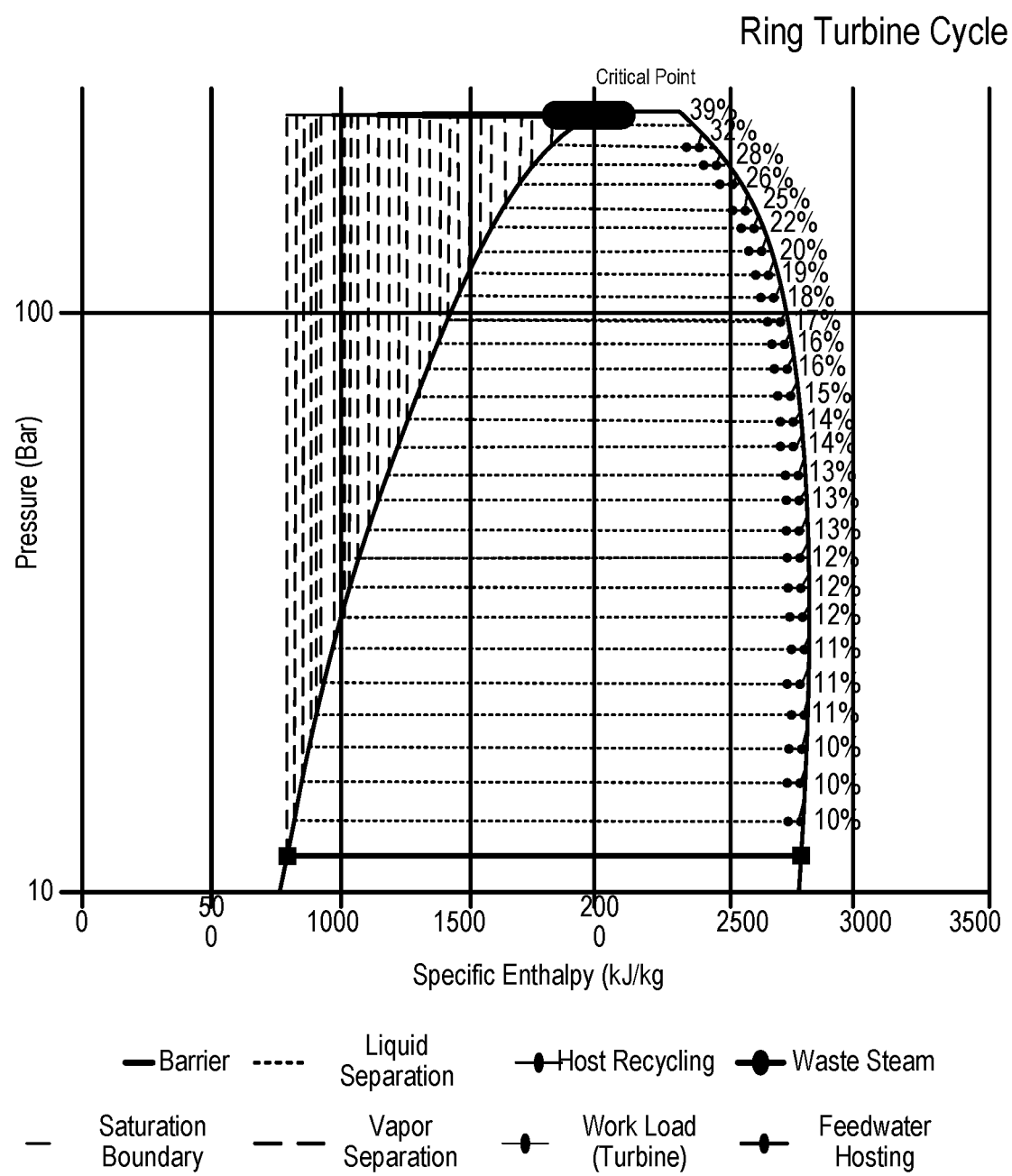
FIG. 18 depicts a more complex example numerical simulation of a steam thermodynamic cycle utilized by computational approximated model of an example embodiment of the present invention in terms of the relationships between temperature and enthalpy in various pressure regimes depicted in FIG. 16.

FIG. 18 depicts an example numerical simulation of a steam thermodynamic cycle utilized by computational approximated model of an example embodiment of the present invention in terms of the relationships between temperature and enthalpy in various pressure regimes depicted in FIG. 16.

FIG. 18 is the same as FIG. 17, except 30 stages are used instead of 5, and $m_{waste}$=10%. A 100 stage system was numerically simulated and resulted with $m_{waste}$=1%.

With a higher number of stage counts there is a trade-off. Either the pressure difference between the stages get squeezed closer together, or else the turbine needs to operate over a wider pressure range. If the stages have less pressure difference, then they also have less of a temperature difference, which can decrease the effectiveness of heat recycling into the pressurized feedwater. If the turbine operates over a larger pressure range, then $\Delta h_{waste}$ becomes larger because of the widening of the saturation lines with lower pressure.

Figure 19:
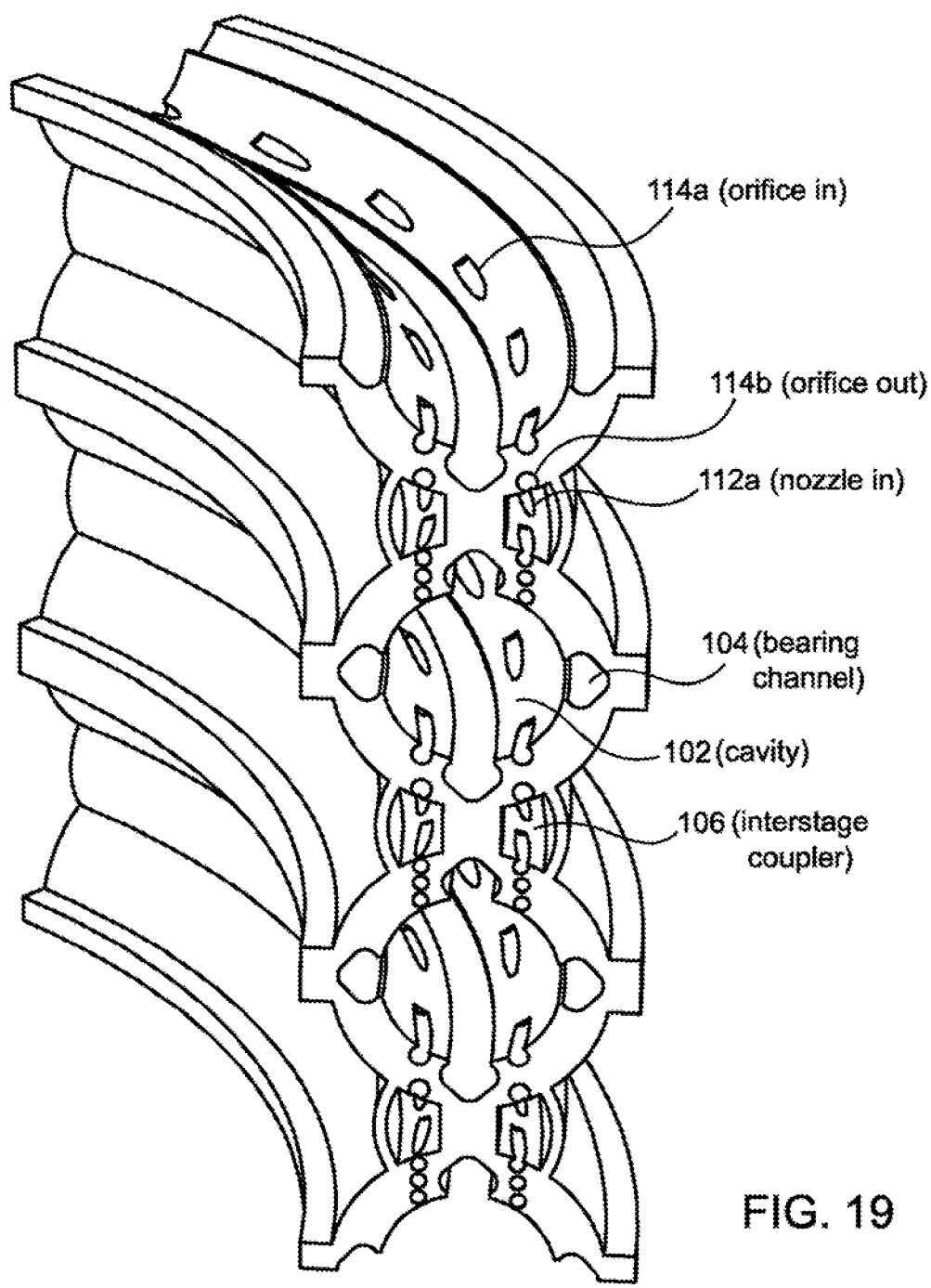
FIG. 19 depicts an example embodiment of a nozzle system to accelerate steam flows into a stage.

Steam energy is made up of enthalpy (heat, pressure, and phase change) as well as kinetic energy (motion energy). Kinetic energy is what drives the turbine, meaning that the steam needs to keep moving through all the stages. In a closed pipe, steam will maintain constant mass flow, which may allow the system to avoid the use of nozzles, and drive the turbines driven directly from the expansion of steam from the boiler into each ring stage. FIG. 19 depicts an example embodiment of a nozzle system than can be used to accelerate steam flows into a stage, if additional kinetic energy is needed.

Steam Traps

As described earlier, steam traps are an optional enhancement to the design that separates water from wet steam, to make sure the that steam passing through each turbine is dry. Were steam traps not used, a different heat cycle would exist than is shown in FIG. 18, and the steam would be wetter (and lower enthalpy) with each successive stage. Wet steam below ($\chi$<0.8) is difficult to model numerically, and is unknown how it will perform in turbines. Problems such as water hammering may occur.

There are many types of steam traps, with mechanical steam traps being the traditional solution. Venturi steam traps have no moving parts, and can be built directly into the turbine using 3D printing or molding. No steam trap is ideal, and a certain amount of steam is expelled with the water, and a certain amount of the water remains with the steam. The latter case is not a problem, provided the resulting steam is dry enough for the turbines to function. This moisture will have numerous other chances to be expelled, perhaps with a modest reduction in efficiency due to the mass of the waste steam being slightly higher.

When dry steam escapes through the steam trap, it will enter a water reservoir to feed a water pump. The steam will not travel up the pump, and will remain in the reservoir. This steam may need to be separated and cooled (waste heat) and returned to the reservoir. If an injector is used as a pump, the injector is likely to pull some of the steam through to a higher pressure. Steam gets wetter with higher pressure (for the same enthalpy), so the result is pure water.

Energy-Flow and Material-Flow Overview

Figure 6:
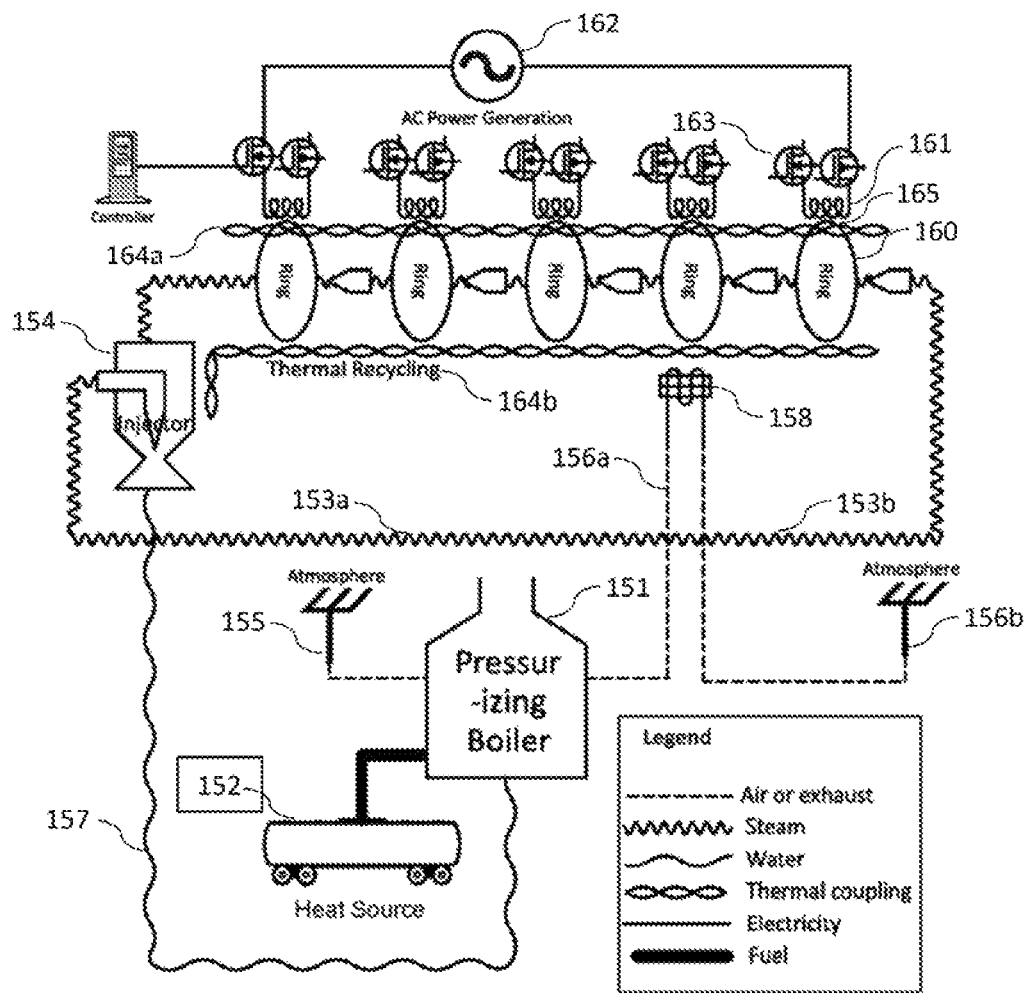
FIG. 6 depicts an example schematic representation of steam, air/exhaust, water, heat, electrical, and boiler-heating fuel or thermal energy flows in an example embodiment of the present invention. The boiler-heating fuel or thermal energy source can be a fossil fuel, bio-mass fuel, thermo-nuclear (fusion, fission, or other), geo-thermal capture, solar energy capture, etc.
Figure 6A:
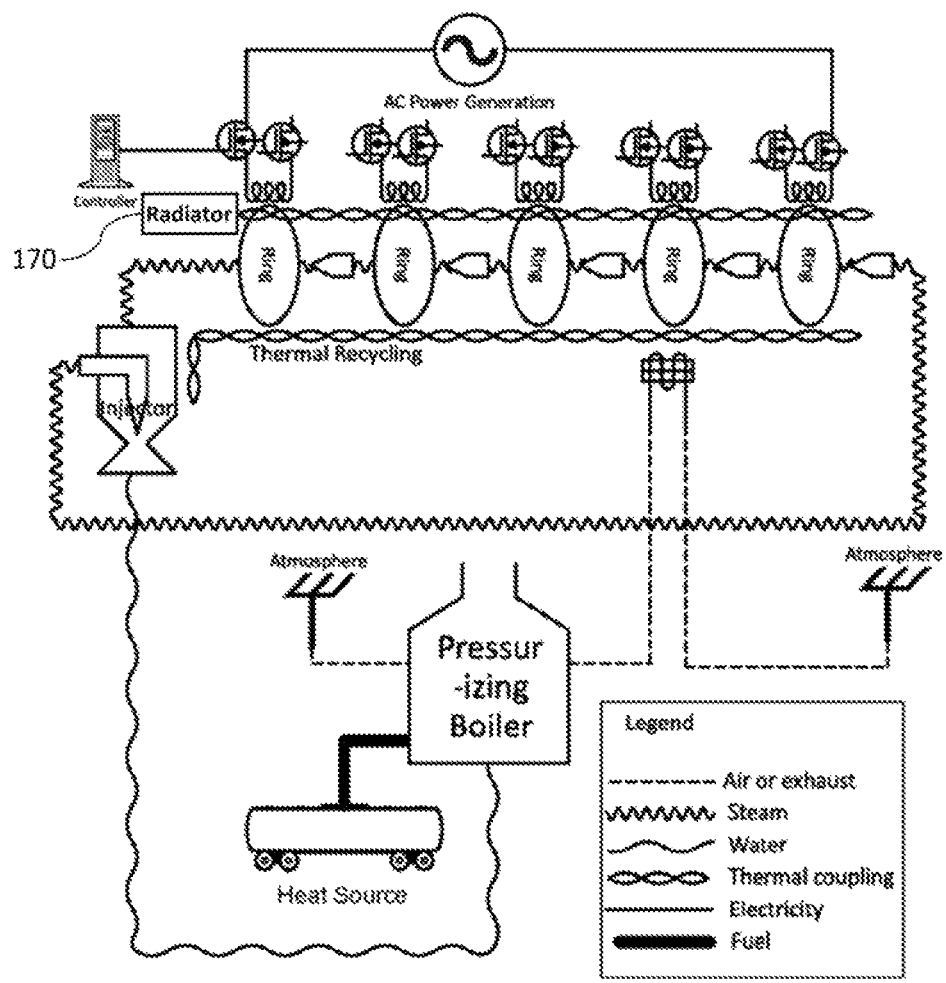
FIG. 6a depicts a less efficient variation of FIG. 6 wherein a radiator has been added to dispose of waste heat as provided for by the invention.

As described earlier, FIG. 6 depicts an example schematic representation of steam, air/exhaust, water, heat, electrical, and boiler-heating fuel, or thermal energy flows in an example embodiment of the present invention. The boiler-heating fuel or thermal energy source 152 can be a fossil fuel, bio-mass fuel, thermo-nuclear (fusion, fission, or other), geo-thermal capture, solar energy capture, etc. Also as described elsewhere in the specification, less efficient variations are possible wherein a radiator 170 can be used to dispose of waste heat, for example as shown in FIG. 6a.

The boiler 151 is fed by an energy source or heat source 152 which is used to heat liquid water until it is saturated steam at a targeted pressure.

The output 153a-153b of the boiler 151 is fed to the first ring stage 160, which passes that steam on to subsequent ring stages, however the enthalpy, pressure, and temperature of the steam decreases at each stage. The output steam 153b from the boiler 151 is also fed to an (optional) injector 154. The injector 154 is used as a pump, powered by steam, however other types of pumps can be used. For simplicity, only one pump is shown. For systems utilizing steam traps, a pump would exist for each ring stage.

Electricity flows from the rings via coils 161 that are mounted on the outside of the rings, that convert moving magnetic fields to electricity 162. Standard power circuits 163 are used to convert electricity from the coils 161 in AC power 162.

If the boiler burns fuel, then the boiler 151 will also take in atmospheric air 155, and release heated air 156a-156b with additional pollutants.

Heat flow is optimized to allow recycling of unused heat back from the rings to the pressurized feedwater 157. Excess heat can be recycled from many sources 164a-164b, and FIG. 6 shows excess heat from the boiler exhaust 156a-156b being recycled 158, as well as Ohmic losses 166 from electricity generation in the coils 161. Also as described elsewhere in the specification, less efficient variations are possible wherein a radiator 170 can be used to dispose of waste heat, for example as shown in FIG. 6a.

Additional Efficiency from Use of Recycled and Extracted Energy

Shortcomings in attaining theoretical isentropic efficiency are the leading cause of steam-driven electricity generation conversion inefficiency, but not the only source.

Other sources of system losses include boiler inefficiency, Ohmic losses in electricity production, and energy needed to run scrubbers for pollutants. The invention further provides arrangements and methods for each of these heat sources to be directed to electricity production.

Each of these other sources of inefficiency produce or can be adapted to produce heat. In conventional steam-driven electricity generation, excess boiler heat energy and heat-producing Ohmic losses in electricity production are deliberately rejected from the system and dissipated into the atmosphere. Much of this waste heat can be recycled, provided the excess heat exists at a temperature above the temperature of the pressurized feedwater at some stage. Thus, operating the ring stages lower pressures provides greater opportunity for heat recycling, because there is lower temperature feedwater that can absorb heat. Further, as will be explained, heat-producing chemical reactions can be applied to convert boiler exhaust pollutants into easily disposable materials.

Transfer of Energy from Steam to Rotor to Coils in a Stage

As shown in FIG. 7, all steam turbine systems involve a transfer of energy from heat to electricity, through multiple intermediate steps.

A heat source is needed to create steam. Often this involves burning fuels, but could also include the use of geothermal energy, nuclear energy, or solar energy. A boiler thermally powered by the heat source heats water to the boiling point at outputs pressurized dry steam.

Steam has a higher energy component than water. Steam energy is often referred to as enthalpy, which is a unit of chemical energy per mass of steam. Steam enthalpy depends on the temperature, the pressure, and the water content of the steam. Higher temperatures and pressures imply increased enthalpy, and when steam contains water droplets, the enthalpy of the steam is somewhere between the lower enthalpy of water and the higher enthalpy of steam, based on the concentration of water.

In some embodiments, an additional heating stage is used to elevate the temperature, and this is called superheated steam. Superheated steam has higher enthalpy than dry steam.

Using nozzles or other means, pressurized steam is accelerated. Steam enthalpy is partially converted to mechanical kinetic energy.

Kinetic energy is transferred from the steam to the rotor. Steam and water droplets collide with the rotor, providing a force on the rotor. The rotor will spin faster in the presence of these forces until an equilibrium condition is met. If the turbine is not producing any electricity, the rotor has no other forces on it, so the rotor will accelerate until it reaches the speed of the steam. When the turbine is producing electricity, there is a counteracting force placed on the rotor equal to the energy extracted. The turbine will find an equilibrium velocity that is slower than the steam velocity, where the forces from the collision of steam and rotor equal the forces from electrical energy being removed from the system. When the rotor is running at a velocity below the steam velocity, energy is removed from the steam energy in the form of lower steam enthalpy.

The rotor is comprised of one or more magnets positioned in several possible configurations such as those shown in FIG. 20 and FIGS. 21, 22, and 23. If the rotor is not moving, then there is a fixed magnetic field corresponding to the pole positions of the magnets. Whether the magnets are rare-earth permanent magnets, or auto-excited magnets differ only in the strength of the magnetic field, and the way they are constructed. When the rotor is spinning, the magnetic field is moving with the rotor position.

The magnetic field is converted to electrical energy in the coils which are constructed outside the stator casing. When a strong, changing magnetic field passes through a coil it induces current to flow through wire comprised by the coil. If the coil is connected to an electrical load, then electrical energy is extracted from the turbine. When there is an electrical load, this energy is transferred from rotor energy to magnetic energy to electrical energy, which shows up as a new force on the rotor trying to slow it down. At equilibrium, the energy trying to slow the rotor equals the energy trying to speed the rotor, and so the rotor maintains a constant speed that is slower than the surrounding steam. The energy that is taken from the stator causes the enthalpy of the steam to drop by an amount equal to the energy extracted from the coils.

Between the magnetic poles in the rotor and the coils that generate electrical energy is a series of materials and gaps that can be optimized for efficiently focusing and delivering magnetic fields to the coils. The field will always be strongest when the magnet poles are perfectly lined up with the coils.

Rare earth magnets are brittle, so they are often coated with nickel or other ferromagnetic material. The rotor and stator are separated by a gap large enough to avoid the stator and rotor colliding. The gap is filled with steam, which is not ferromagnetic. Magnetic strength falls in proportion to distance from the pole. Magnetic field losses can be, for example, more than 1000 times higher in the steam gap than through ferromagnetic metals; accordingly, it is advantageous that the gap size is minimized, and ferromagnetic materials are used to guide magnetic fields to the coils.

In an example embodiment, the stator can be made from iron, or any ferromagnetic material of sufficient ability to withstand the thermal and pressure requirements. The stator could be entirely made from one type of metal, or can be made of a mix of ferromagnetic and non-ferromagnetic materials to better guide the magnetic energy. Layers of ferromagnetic and non-ferromagnetic materials can be used to reduce eddy currents in the metal.

In an example embodiment a plurality of electrical coils can be positioned on the outside of the stator. Such coils, for example, can comprise conducting material (such as copper or aluminum) and insulators (such as glass, fiberglass, or ceramics) to form a spiral geometry. The conductors and insulators are likely not ferromagnetic, so it can be advantageous to guide the magnetic force through the coils can be enhanced by filling the middle of the coil with ferromagnetic material (Iron, nickel, etc.).

Each electrical coil will produce a current that is proportional to the time-rate-of-change in the magnetic field traversing the coil. If no electrical load is placed across this coil, then no energy is taken from the system. When a tiny electrical load is placed across this coil, the voltage across the coil can be measured, and control electronics can measure the magnetic force changes in real time at each coil. Through this mechanism, control electronics can know the electrical generation status of each coil relative to the rotor, and in some implementations, can use this measured information to adaptively decide which coils to use for extracting energy at any given time.

Figure 24:
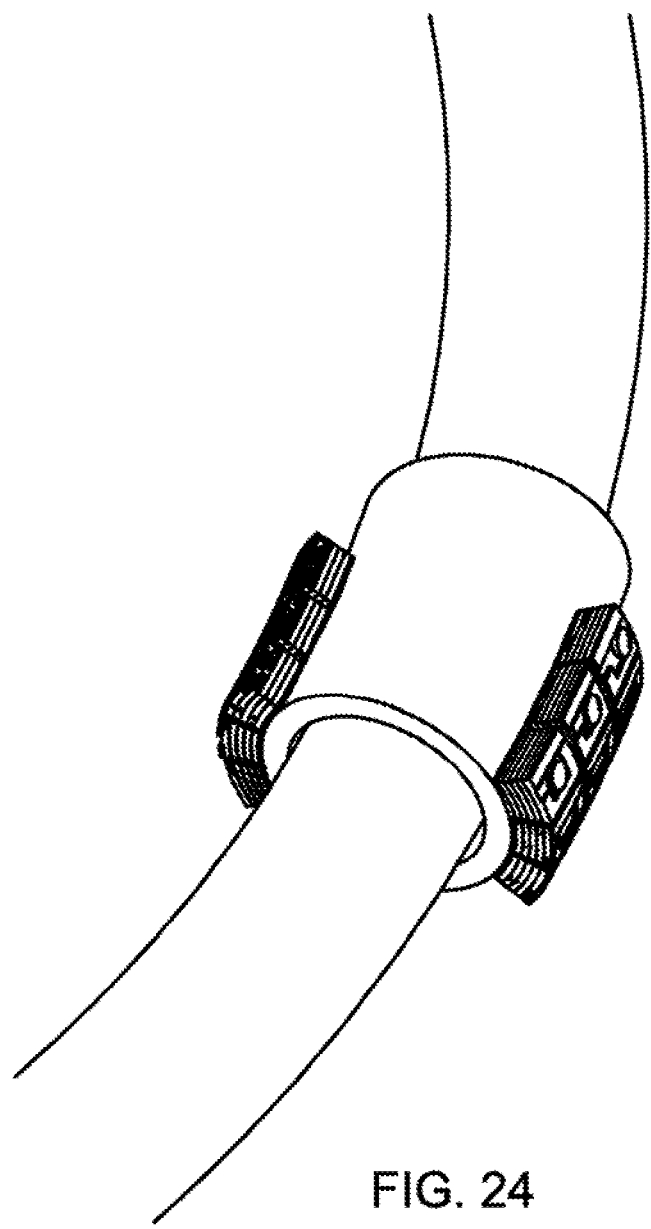
FIG. 24 depicts an example arrangement wherein two instances of the example array stacked-layer electrical coils are positioned antipodally on opposite sides of an example position on the exterior surface of a stator. For the sake of subsequent illustration, only a short portion of the stator is shown with a longer portion of the internal rotor ring.

FIG. 24 depicts an example arrangement wherein two instances of the example array stacked-layer electrical coils are positioned antipodally on opposite sides of an example position on the exterior surface of a stator. For the sake of subsequent illustration, only a short portion of the stator is shown with a longer portion of the internal rotor ring.

Figure 25:
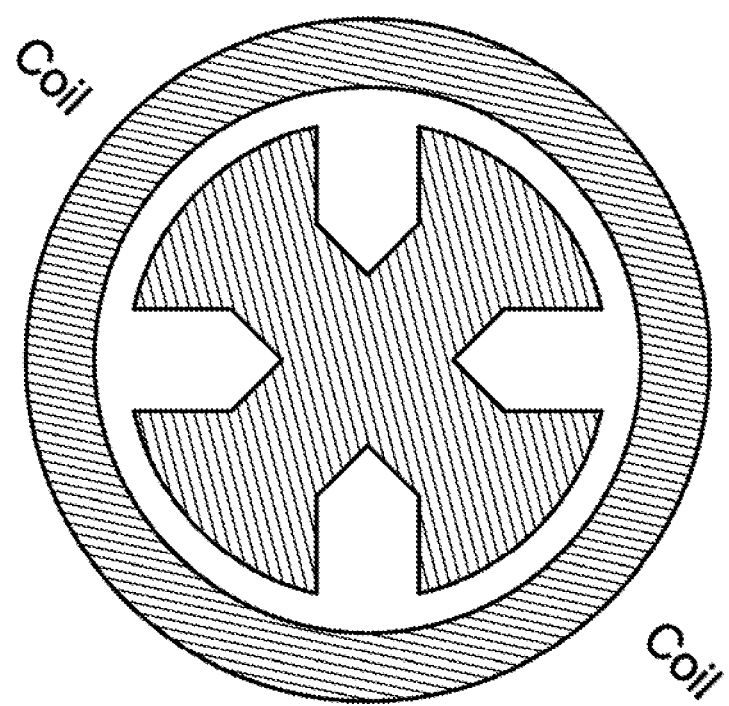
FIG. 25 depicts a cross-sectional view of an example arrangement of a rotor ring within the hollow toroidal stator housing showing one pair of antipodally-positioned coil pair on the exterior surface of a stator housing, for example as depicted in FIG. 24.
Figure 29:
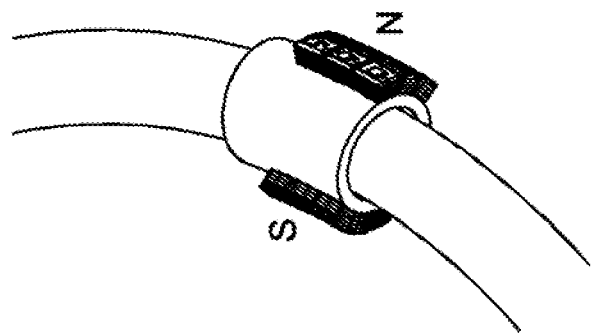
FIG. 26 through FIG. 29 depict an example rotational sequence of magnetic pole locations through the antipodal coil locations in the example arrangement of FIG. 24. The sequence progresses and repeats as the rotor ring rotates.
Figure 28:
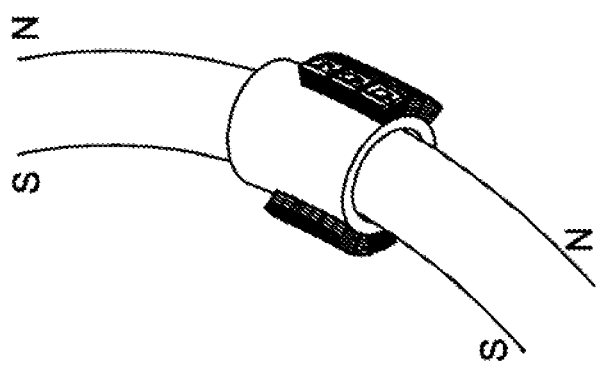
Figure 27:
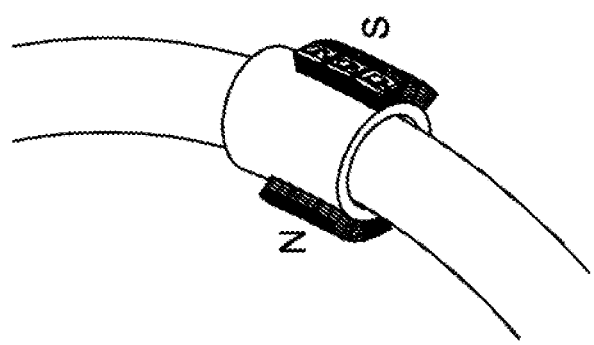
Figure 26:
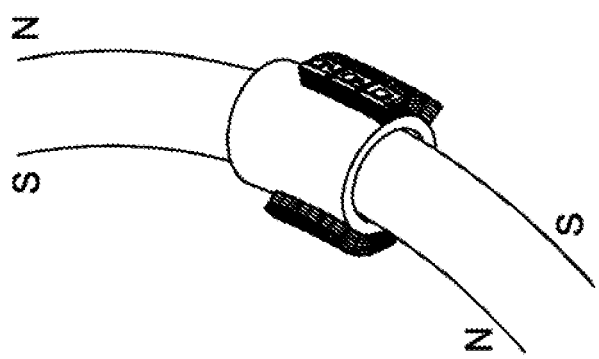

FIG. 25 depicts a cross-sectional view of an example arrangement of a rotor ring within the hollow toroidal stator housing showing one pair of antipodally-positioned coil pair on the exterior surface of a stator housing, for example as depicted in FIG. 24.

FIG. 26 through FIG. 29 depict an example rotational sequence of magnetic pole locations through the antipodal coil locations in the example arrangement of FIG. 24. The sequence progresses and repeats as the rotor ring rotates traversing the antipodal coil locations an example arrangement such as that depicted in FIG. 24

Figure 20:
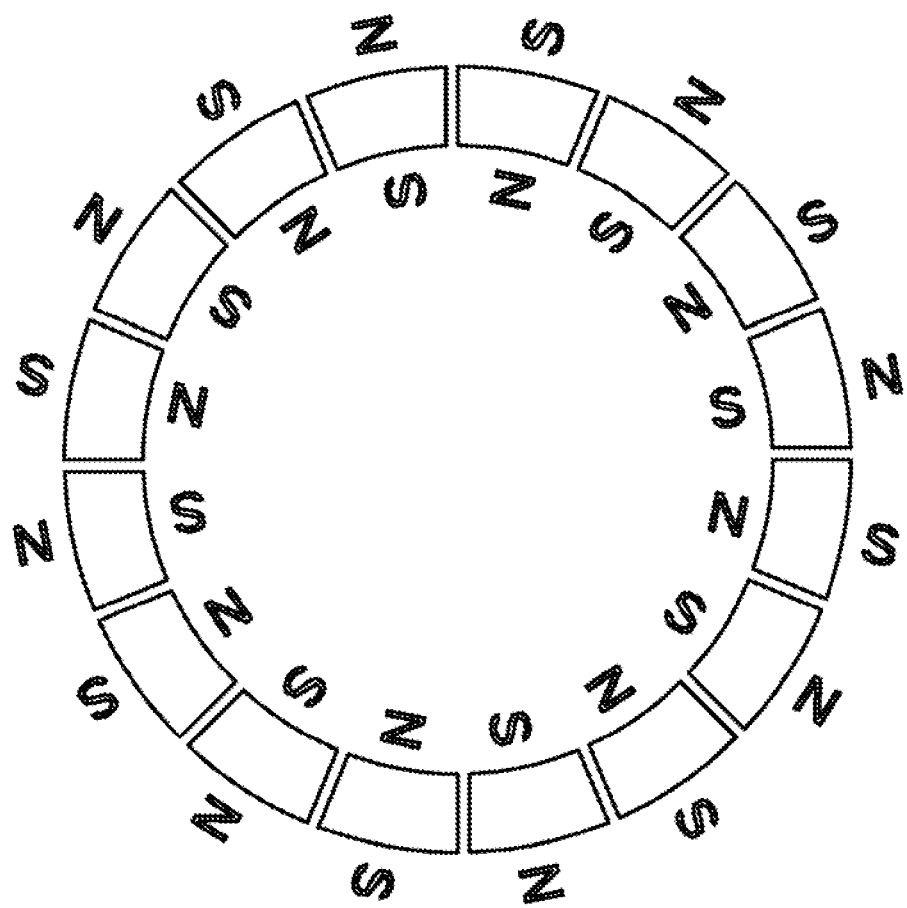
FIG. 20 depicts a representation of an example magnetic-pole configuration as would be experienced in a plane traversing the antipodal coil locations an example arrangement such as that depicted in FIG. 24.

FIG. 20 depicts a representation of an example magnetic-pole configuration as would be experienced in a plane traversing the antipodal coil locations an example arrangement such as that depicted in FIG. 24

Figure 21:
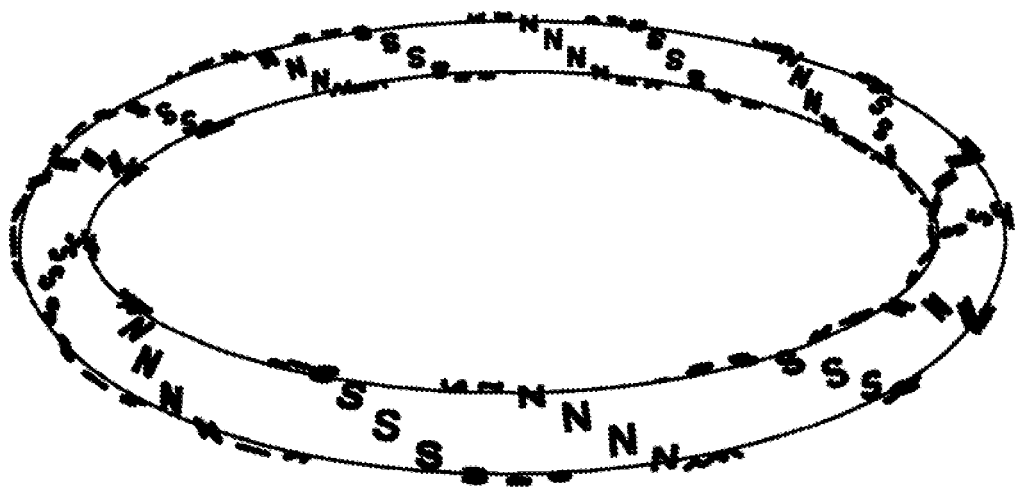
FIG. 21 depicts a representation of the location of north magnetic pole alignment in an example spiraling magnetic-pole configuration. The symbol "N" denotes the location of the north magnetic pole alignment along the surface of an example rotor ring. In this one spiral path is shown but two or more intertwine spiral paths be used as advantageous to various aspects and embodiments of the invention.

FIG. 21 depicts a representation of the location of north magnetic pole alignment in an example spiraling magnetic-pole configuration. The symbol "N" denotes the location of the north magnetic pole alignment along the surface of an example rotor ring. In this one spiral path is shown but two or more intertwine spiral paths be used as advantageous to various aspects and embodiments of the invention.

Figure 22:
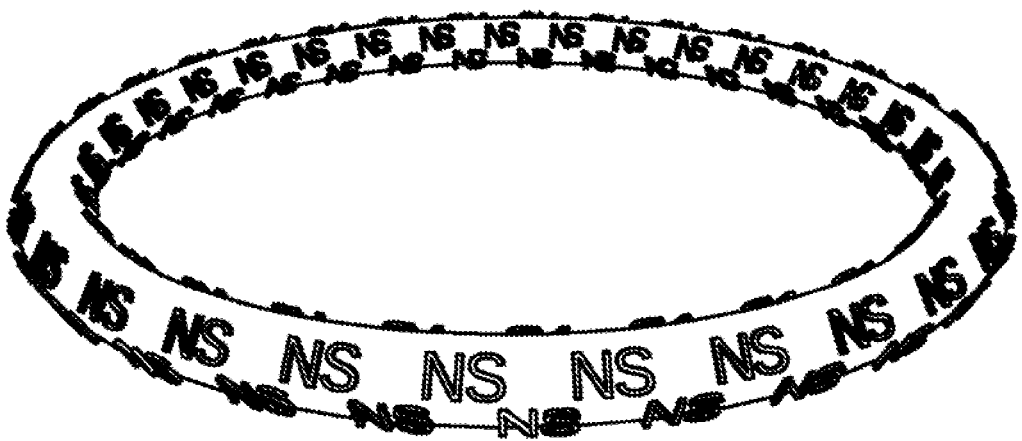
FIG. 22 depicts an alternative version of FIG. 21 showing the alignment locations of both north magnetic pole and south magnetic pole in an example spiraling magnetic-pole configuration. The symbol "N" denotes the location of the north magnetic pole alignment along the surface of an example rotor ring and the symbol "S" denotes the location of the south magnetic pole alignment along the surface of an example rotor ring. In this one spiral path is shown but two or more intertwine spiral paths be used as advantageous to various aspects and embodiments of the invention.

FIG. 22 depicts a representation of the location of north magnetic pole alignment in an example spiraling magnetic-pole configuration. In this configuration, pole pairs oscillate between two axial positions.

As described earlier, FIG. 23A depicts an example representation of a rotor ring that provides a modulated magnetic field superimposed on a fixed-bias magnetic field so that the magnetic field never attains a pole reversal or in many cases even zero field strength. In the depicted example representation, the proximity of the magnetic pole surface to the stator housing and coils surrounding the stator housing varies as the rotor ring rotates, but the pole direction does not change. The invention anticipates there are other potentially advantageous methods for a rotor ring to provide a modulated magnetic field superimposed on a fixed-bias magnetic field so that the magnetic field never attains a pole reversal or in many cases even zero field strength.

FIG. 24A shows an example representation of a rotor that uses blades instead of channels to harvest kinetic energy in the steam. In this case the magnets are placed on either side of the blades. The magnetic pole positions in this example would be the same as in FIG. 20.

With many coils on each ring stage, and many ring stages, the control system and associated controllable switches and power electronics can advantageously be configured to choose when to extract generated energy from each coil to guarantee that an intended and/or near-optimal amount of energy is taken from the system. In one embodiment of the invention, the control circuitry would seek to keep the rotor spinning at a constant velocity, and would drop a load from enough coils for sufficient length of time to reach this equilibrium state. This could, for example, permit the target rotor velocity to be set to maintain efficient operation at the rated power output of the turbine.

In some embodiments, the control system can advantageously employ one or more sensors to monitor each turbine to decide when to engage various coils. Example sensors can include temperature, pressure, and water content of the steam. The control system can advantageously use information concerning the phase position of the rotor to calculate when magnetic poles align with each coil. This can be accomplished I various ways, for example by reading the voltage across various coils when they are not attached to a load, computing when these voltages cross the zero boundary, and using the resulting information to calculate when a pole crosses in front of a coil. Reading the voltages across many coils allow the controller to be able to calculate the precise angle of the rotor within the stator.

If dynamic magnetic bearings (discussed below) are used, the voltages can be measured across idle coils and the precise position of the rotor can be calculated on all 6 degrees of freedom (X, Y, Z, yaw, pitch and roll).

The measurement electric outputs of various sensors and control of the coils can be a accomplished by a microprocessor, a microcontroller, a group of microprocessors or microcontrollers, or could be custom circuitry, semiconductor chip, ASIC or FPGA.

Figure 30:
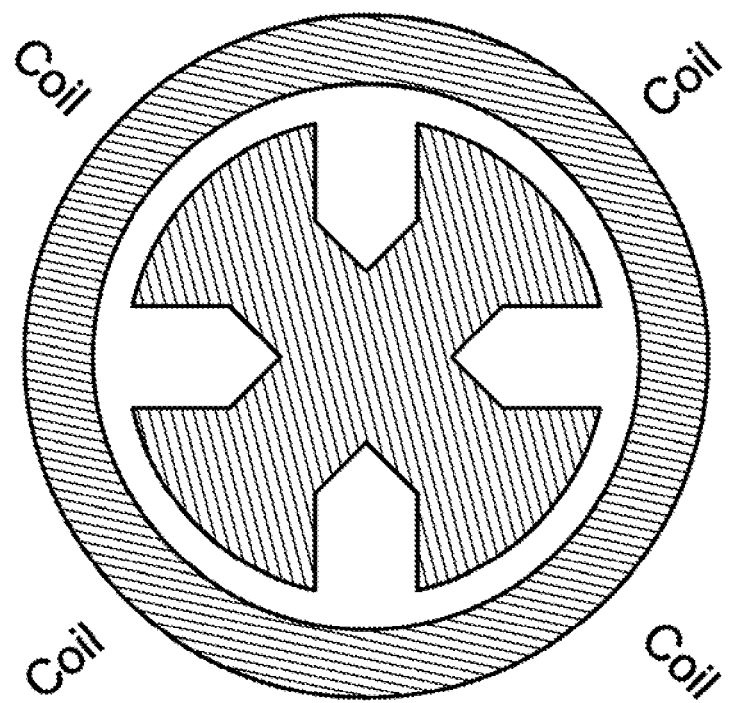
FIG. 30 depicts an example augment variation on the example arrangement shown in FIG. 25 comprising two pairs of antipodally-positioned coil pairs on the exterior surface of a stator housing. In this example two pairs are shown in orthogonal orientations but larger numbers of pairs in other orientations and geometries can be used as advantageous to various aspects of the invention. Depending on the number of spiral paths (one, two or more intertwine, etc.) and the configuration of multiple spiral paths, the antipodally-positioned coil pairs can be used to generate phase-locked currents in various phase relationships and/or generate phase-matched currents as advantageous to various aspects and embodiments of the invention.

FIG. 30 depicts an example augment variation on the example arrangement shown in FIG. 25 comprising two pairs of antipodally-positioned coil pairs on the exterior surface of a stator housing. In this example 2 pairs are shown in orthogonal orientations but larger numbers of pairs in other orientations and geometries can be used as advantageous to various aspects of the invention. Depending on the number of spiral paths (one, two or more intertwine, etc.) and the configuration of multiple spiral paths, the antipodally-positioned coil pairs can be used to generate phase-locked currents in various phase relationships and/or generate phase-matched currents as advantageous to various aspects and embodiments of the invention. Having multiple coil sets around the stator is essential for operating a magnetic bearing, as control is needed along multiple dimensions. Additional coil sets can also be useful to accommodate some magnetic pole arrangements within the rotor.

Figure 31:
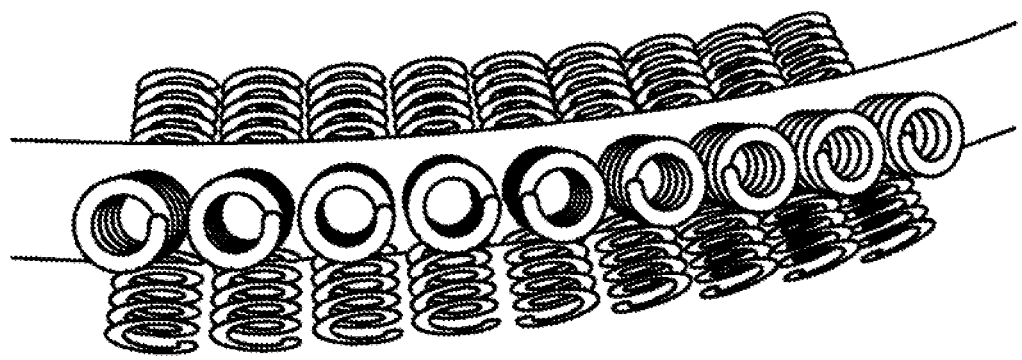
FIG. 31 depicts an example augment variation on the example arrangement shown in FIG. 30 wherein multiple instances of the two (shown) or more antipodally-positioned coil pairs positioned on the exterior surface of a stator housing are arranged in a circumference-spanning array.

FIG. 31 depicts an example augment variation on the example arrangement shown in FIG. 30 wherein multiple instances of the two (shown) or more antipodally-positioned coil pairs positioned on the exterior surface of a stator housing are arranged in a circumference-spanning array.

In an example embodiment, a control system can cause a coil to electrically connect to a load, for example using field effect transistors or another semiconductor and/or electromechanical switching arrangement. Such a control system can be configured to decide over time how the electrical generating capability of one or more coils could or should be used. For example, the controller can be configured to adaptively "close" one or more controllable switches (semiconductor switches, relays, etc.) so to allow current to flow from the coil to other power processing or transformative electronics. For example, when certain such switches are closed, current can flow, and energy is moved closer in power processing or transformative electronics to being outputted to a connected power grid. Depending on the arrangement of coils on the stator and magnetic poles on the rotor, there can be phases of the rotor rotation where a coil is not exposed to sufficient magnetic energy, in which case the controller would open at least one associated selected controllable switch. In an example embodiment the controller can increase or decrease the amount of energy taken from each coil by turning on the switches for shorter or longer periods of time or bay other arrangements.

In an example embodiment, a coil presented with a load creates alternating electrical current of some frequency determined by the rotational speed of the rotor. For a group of coils arranged around the same rotor neglecting the effects of reactive-impedance loads all such AC current a firm phase locked between all the coils within a single ring stage. Well-known standard power electronics designs exist that can combine the power from multiple phase aligned AC power sources and produce DC power electronics.

The production of outgoing synchronous AC power suitable for example for delivery into a commercial or private AC power grid can be achieved with standard commercial devices that convert DC power to synchronous AC power. In some embodiments, such conversion could be made separately for each ring in a manner that such that synchronous AC power can easily be combined. An alternative implementation would be to have derived DC current from each ring stage combined, and to have the resulting DC current converted to synchronous AC power using standard commercial products.

Figures 32, 33A:
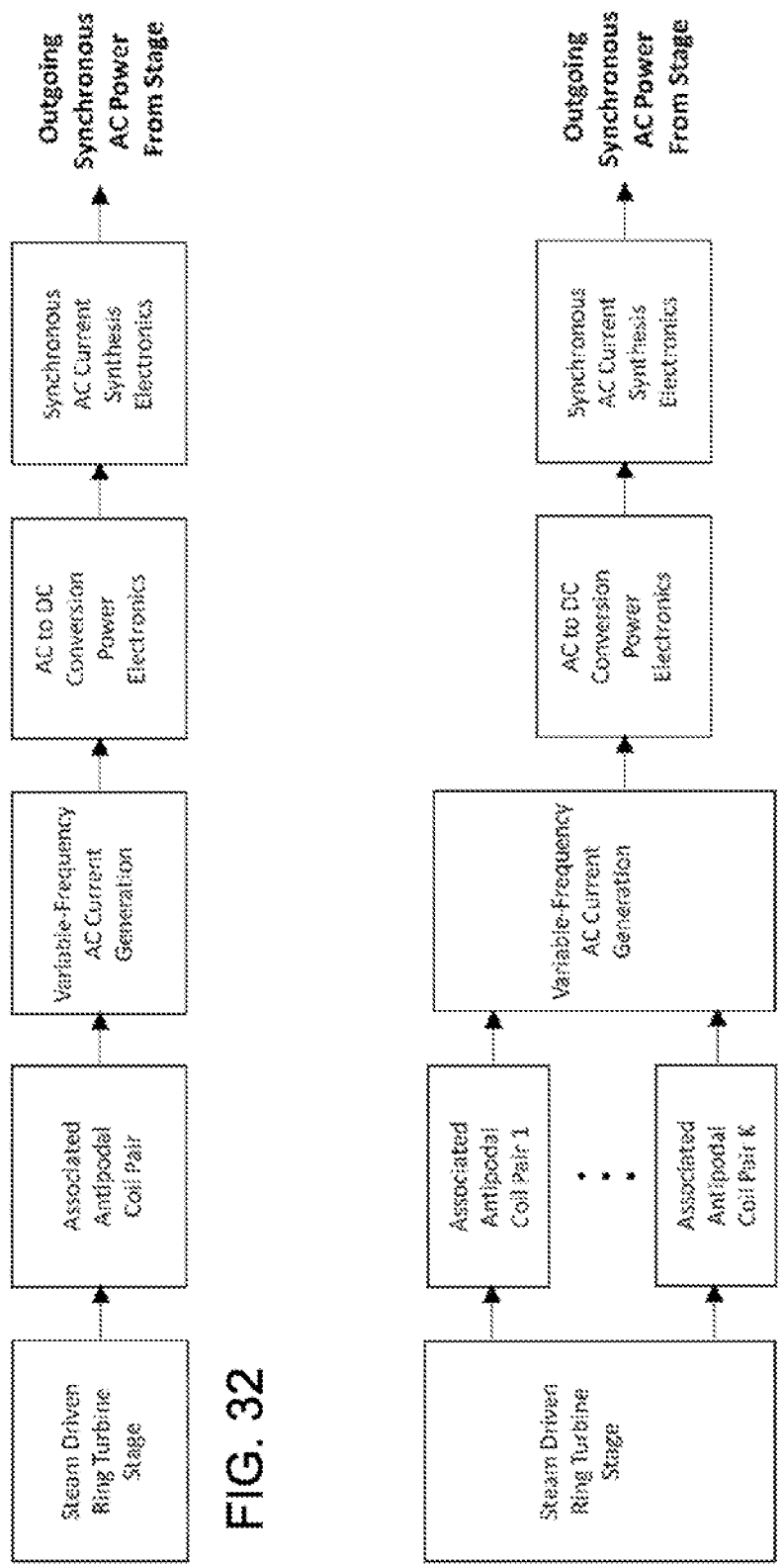
FIG. 32 depicts an example energy and frequency conversion arrangement for one antipodal coil pair of a single ring turbine stage.
FIG. 33a depicts an example energy and frequency conversion arrangement for two or more antipodal coil pairs associated with a single ring turbine stage and thus generating currents with matching or phase-locked phase arrangements.
Figure 33B:
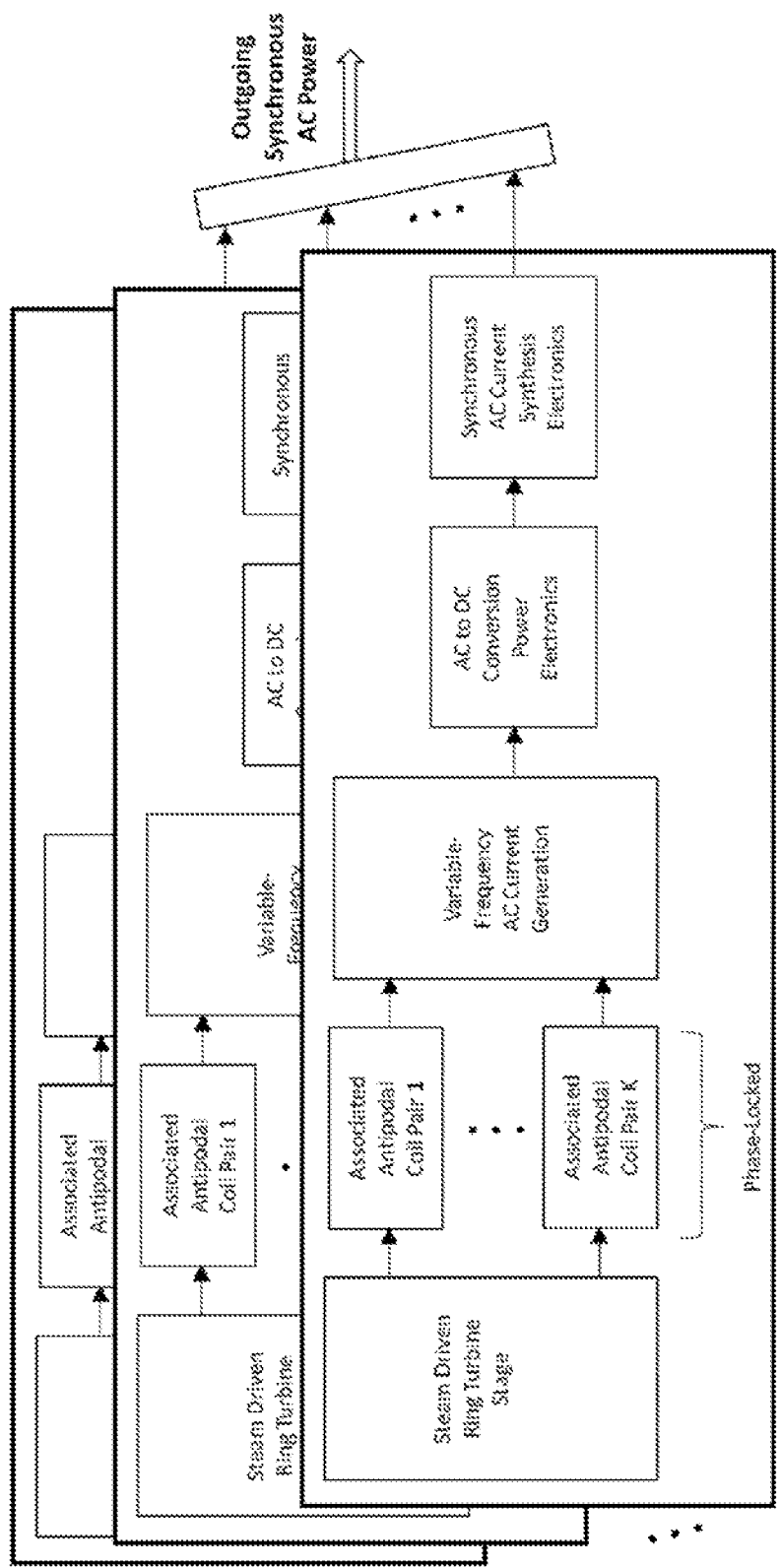
FIG. 33b depicts an example arrangement wherein multiple instances of arrangements such as that depicted in FIG. 33a are aggregated to provide larger quantities of outgoing synchronous electric power suitable for powering a building, campus, community area, rural area, or connection to a utility electrical grid.

FIG. 32 depicts an example energy and frequency conversion arrangement for one antipodal coil pair of a single ring turbine stage. FIG. 33a depicts an example energy and frequency conversion arrangement for two or more antipodal coil pairs associated with a single ring turbine stage and thus generating currents with matching or phase-locked phase arrangements. As an extension of this, FIG. 33b depicts an example arrangement wherein multiple instances of arrangements such as that depicted in FIG. 33a are aggregated to provide larger quantities of outgoing synchronous electric power suitable for powering a building, campus, community area, rural area, or connection to a utility electrical grid.

There are numerous alternative embodiments of this invention that provide other ways to control the coils on the rings to maintain optimum performance and to produce synchronous AC power. For example, the controller might choose to seek to produce a constant amount of power rather than maintain a constant rotor velocity. Regulating the amount of power could be accomplished by varying the load on the coils, rather than varying the amount of time a coil is exposed to a load, DC voltage can be constructed with typical voltage regulators instead of switches or FETs, and many other combinations.

Changing Magnetic Field Orientation with Ring Rotation

Current is only induced in a coil when it is exposed to a changing magnetic field. Unless the rotor is turning, the permanent magnets (or self-excited magnets) will have a magnet field that is not changing, and so no current will pass through the coils. Typically, in rotating magnetic devices, the rotor will have magnets with different pole positions around the rotating shaft. As the rotor turns, coils that are fixed on the stator are exposed to a series of alternating poles as the rotor turns. This configuration is also possible with a ring turbine, as shown in FIG. 20. The more poles the magnet has, the more current will be generated in coil. While it can be desirable to maximize the amount of energy that can be extracted per rotation of the rotor (by using stronger magnets, more poles, larger coils, and a narrower gap), it is only necessary to make the system robust enough to extract the amount of power needed. Efficiency is not gained by extracting more energy, if we are eventually extracting all the energy generated across all the coils. Because the rings have a large surface area, and there are many rings, the goals are not to maximize the density of energy extracted, but rather to ensure that we can extract all the energy generated over the area of all the rings. Therefore, it is possible to look for alternative designs that have other advantages, such as manufacturing complexity, and support for magnetic bearings.

When mechanical bearings are used, the pole configuration can be simpler, as no magnetic forces are needed along most of the degrees of freedom of the rotor. FIGS. 21 and 22 show two different pole orientations that might support the needs of a magnetic bearing. Both options create pole orientations around an additional dimension. There are many other pole configurations possible that serve the same purpose. The design choice primarily is based on the difficulty in manufacturing the rotor, and the availability of locations to place the coils on the periphery of the stator. There is limited surface area on the stator, and competition for what components should be placed at different locations on that surface area. In addition to coils, there needs be space given for the bearing channels (unless magnetic bearings are used), for the nozzles, pumps or injectors that feed steam between the ring stages, and for flanges that are used to seal stator channels after the rotor has been placed inside. The design choices can vary based on configuration and economics.

Figure 23A:
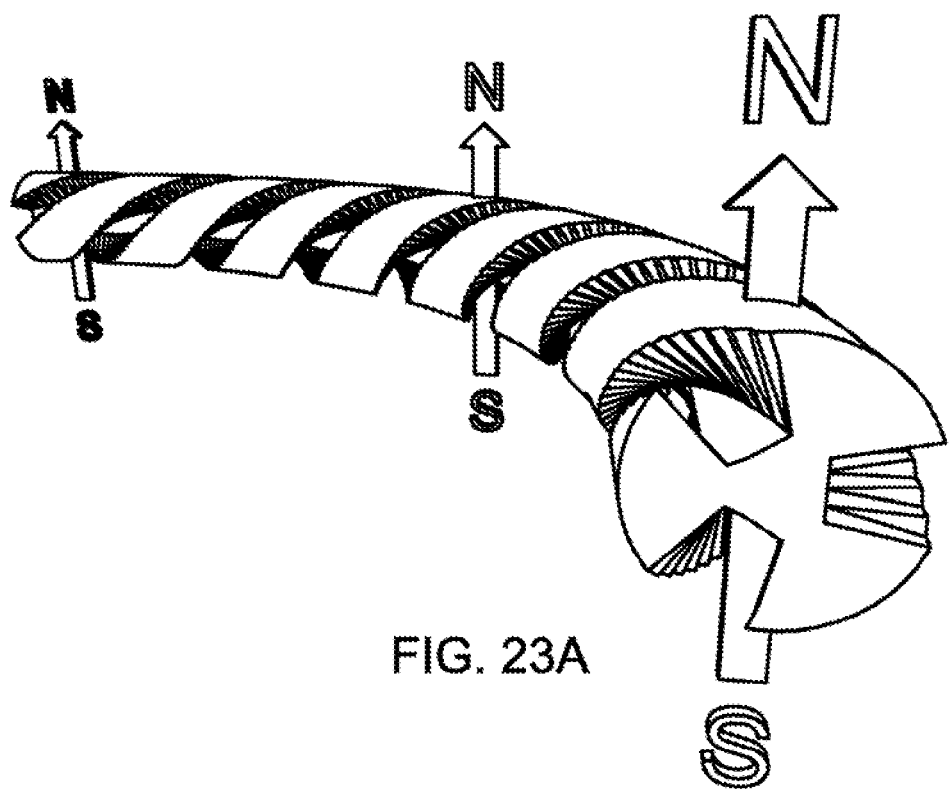
FIG. 23A depicts an example representation of a rotor ring that provides a modulated magnetic field superimposed on a fixed-bias magnetic field so that the magnetic field never attains a pole reversal or in many cases even zero field strength. In the depicted example representation, the proximity of the magnetic pole surface to the stator housing and coils surrounding the stator housing varies as the rotor ring rotates, but the pole direction does not change. The invention anticipates there are other potentially advantageous methods for a rotor ring to provide a modulated magnetic field superimposed on a fixed-bias magnetic field so that the magnetic field never attains a pole reversal or in many cases even zero field strength.
Figure 23B:
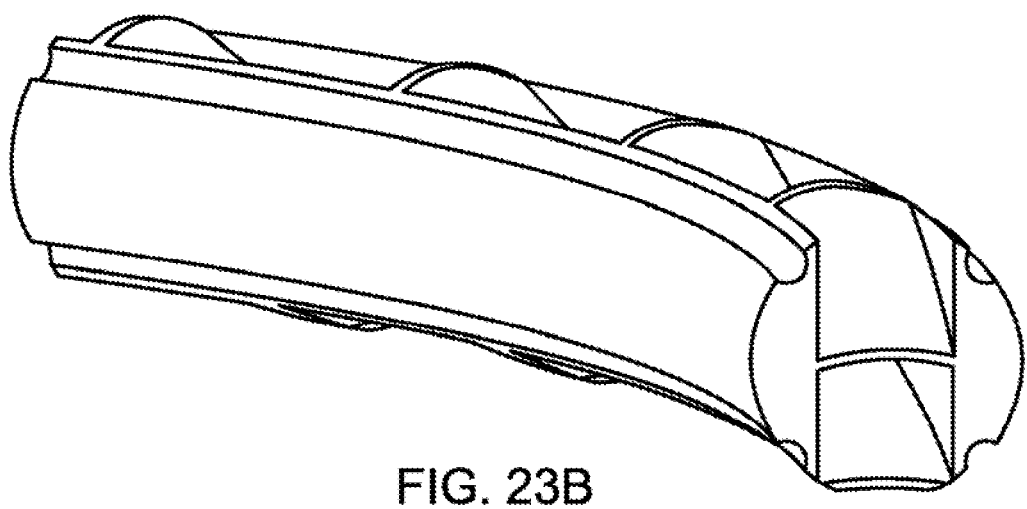
FIG. 23B depicts an alternative geometry for the rotor, where instead of channels, blades are built into the core of the rotor, with magnets housed on either side of the blades. The magnets would alternate between north and south poles on both sides of the blades.

As shown in FIG. 23A single pole rotor can be used within a ring turbine, provided magnetic bearings are not used. In this configuration, the poles must be oriented on the z-axis of the diagram, consistent with the axis of the ring. Other orientations are not possible in a ring. For example, if the desired pole configuration was shifted 90 degrees, all the north poles would need to face outward, which would not be a consistent direction. The benefit to this approach is that it can make the rotor simpler to manufacture. The disadvantage is that the magnetic fields never fully reverse direction, so only half of the magnetic field range is exposed to the coils.

Magnetic Materials

A coil is made up of any conductive material, often copper or aluminum. Neither of these materials is ferromagnetic. The coil conducts electricity which has been induced in the presence of a magnetic material (or in the case of magnetic bearings, when current is forced through a coil, it will induce a magnetic field along the axis of the coil). A magnetic field will pass through air or non-ferromagnetic material but will lose force the further away the coils are from the magnet it is reacting to. Using ferromagnetic metals, such as iron and nickel, or related alloys, the magnetic force can maintain its force over much larger distances. For this reason, the stator and rotor must be made from ferromagnetic materials, and the air gap between the stator and rotor must be made as small as possible, given the performance limitation of the bearings and the manufacturing tolerance of the stator and rotor.

Figure 34:
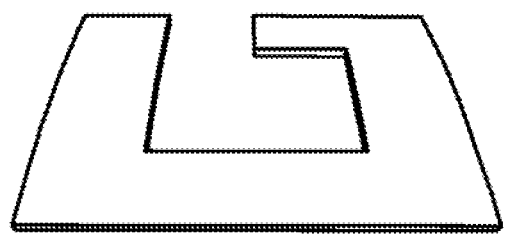
FIG. 34 depicts a first electrically-conductive layer used in a representational example of an approach to fabricating electrical coils by stacking functionally-shaped layers of electrically conductive material and interconnecting groups of adjacent layers with conductive plugs to create a spiraling electrical coil comprising an open center volume.

The area inside the coils, as shown in FIG. 34, also should have ferromagnetic material extending from the stator, so that the magnetic field remains strong throughout the height of the coils, and to focus the magnetic fields that are along the direction of the coil axis.

In embodiments where the rotor is implemented using permanent magnet materials, the rotor can for example comprise high temperature rare earth material, for example (but not limited to) as Samarium-Cobalt. Rare earth magnets are magnetized at very high temperature, and are able to maintain a consistent and strong magnetic field in the range of 1T. The magnetic field from rare earth magnets is persistent and does not vary in the presence of a coil load.

Rare earth permanent magnets can provide more magnetic energy, and therefore allow for the use of smaller coils. However, physically-large rare earth magnets can be expensive, dangerous and hard to work with, so there can be different design choices made for different situations. It is noted that the best high temperature rare-earth magnets, such as SMCO, are often not able to operate at the critical temperature of steam.

If a magnet is manufactured with a variety of pole orientations, different parts of the magnet must be magnetized separately, and then the resulting parts assembled together into the rotor. If the entire rotor were magnetized as a single unit, then the north and south poles would be in the same direction everywhere throughout the rotor. Rare earth magnets are typically coated with nickel, which is ferromagnetic, and has better strength characteristics than rare earth metals.

Ferromagnetic metals will hold a magnetic field after it has been magnetized, but some materials are more easily excited than others. It is anticipated that there can be situations wherein various components or structures comprising ferromagnetic materials within embodiments or implementations of the invention can be magnetized or magnetically altered while the rotor is assembled with the stator. This can occur, for example, when implementations of the invention are taken offline, or could occur in short bursts when the machine is operating. In some situations, this can be disadvantageous: for example, it is desirable for the ferromagnetic metals in the stator maintain or realign their fields quickly to provide stronger fields, whereas it is better for rotor magnets to hold their fields for a longer time (that is, the rotor in these types of embodiments should advantageously comprise ferromagnetic metal that holds the magnetic field.

One approach to magnetically-excite a ferromagnetic material advantageous to the present invention is to enclose the material with an electrical coil and for a current to run through the coil, for example periodically or statically. The conductors constituting the coil would typically be electrically insulated, particularly if the coiling arrangement puts the parts of the coil in contact with itself or with the enclosed ferromagnetic material (as typical ferromagnetic materials also conduct electricity). Thus, an example electrical-current magnetized rotor can be constructed from at least three materials: A ferromagnetic metal, a conductor, and an insulator. If different pole orientations are needed, different coils within the rotor will be placed within the rotor at these orientations. The invention provides for such rotor shapes to be a smooth toroid with aerodynamic channels and/or blades, with the internal structures designed to conform with the requirements necessary to implement such an electrical-current magnetized rotor.

In one implementation of such an electrical-current magnetized rotor, a current source can be supplied to the coils comprised by such an electrical-current magnetized rotor. In traditional generators and rotors, this current source is often provided with brushes. These brushes are conductive material that maintains contact with the rotor as it rotates. Alternatively, the bearing channels and rotor wings can be used to carry current without brushes, provided there are at least two bearing channels and wings. If magnetic/air-bearings are used to mechanically stabilize the rotor, brushes can be used to excite the magnet. The invention provides for other ways to induce coils comprised by such an electrical-current magnetized rotor. Permanent magnets mounted on the stator could be used to induce current in the rotor that could be used to magnetize ferromagnetic material in the rotor.

Low-Velocity Steam

Low velocity steam is important to reduce damage to the rotor blades and channels. The destructive force of a water droplet is measured as the pressure applied to the rotor when the droplet collides with the rotor. A representative value of rare earth magnet shear strength is 40 MPa. Given the critical nature of the system, a wide design margin is typically appropriate. A pressure of 10 MPa will be used as an example to demonstrate the principles and associated calculations.

A water droplet within a wet-steam flow will itself have the density of water which varies very little with pressure. The droplet will collide with the rotor at $v_{collision} = |v_{steam} - v_{rotor}|$.

To meet non-destructive requirements, the collision pressure of a water droplet must be less than 10 MPa, so $$\rho_{water} v_{collision}^2 < 40 \text{MPa, where } \rho_{water} = 1000 \frac{\text{kg}}{\text{m}^3}.$$

This can be alternatively posed as $$v_{collision} < \sqrt{\frac{10\text{Mpa}}{1000\frac{\text{kg}}{\text{m}^3}}} = 100 \text{ m/s},$$

or $$v_{steam} - v_{rotor} < 100 \text{ m/s}$$

Depending on the specific material used for the rotor or variations in chosen design margins, values for the maximum velocity differential could be higher or lower than this example. It is useful to note that 100 m/s is approximately one fourth the speed of sound in steam (and represents a velocity corresponding to one-sixteenth the kinetic energy of steam traveling at the speed of sound). In this and related approaches to implementations of the present invention, the steam velocity is almost entirely dependent on the ratio of pressures of consecutive stages. This pressure ratio must be sufficiently small to protect the rotor from damage in operation.

In such implementations of the invention, steam pressure is used to apply force to the rotor to induce rotation that can be used for generating electricity. If no generated electrical energy is taken from the rotor via the coils, the rotor rotation rate would increase until the rotor tangential velocity it equaled the incident steam velocity. However, when generated electrical energy is extracted from the coils, loading is exerted and the rotor speed will find equilibrium where the steam force energy extracted by the rotor equals (within losses) the electrical energy extracted by the electrical coils. As the generated electrical energy extracted from the system increases, the rotor tangential velocity will increasingly slow relative to the incident steam velocity. If too much generated electrical energy is taken from the system, the relative rotor speed will exceed the design rule. If too little generated electrical energy is taken from the system, then too little enthalpy will be harvested from the steam, and a radiator will be needed to reject the unused energy before the water can be returned to the boiler.

Additional Aspects of Multi-Stage Cascades

Because steam passes through narrow and constrained paths inside the stator, a sequence of ring stages, each comprising a separate associated rotor and coils can be stacked on top of each other. Steam passes from one stage to the next, with each steam harvesting fractions of the available steam enthalpy. The advantage of this approach is that each stage is optimized to work at a specific pressure and steam fraction, and no stage is expected to harvest all the energy on its own. Another advantage is that all stages can operate at lower steam and rotor velocities than traditional turbines.

Figure 35:
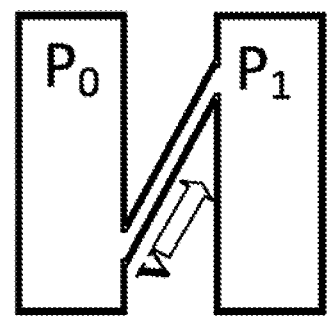
FIG. 35 depicts an example steam transfer arrangement between stages. As each stage extracts energy from the total steam flow it is provided, the operating steam pressure $P_1$ in a subsequent stage is lower that the operating steam pressure $P_0$ in the stage that proceeds it. The pressure difference gives rise to a steam velocity, denoted v. For a sufficiently small orifice size limiting the flow between stages, the orifice size has trivial significance and the velocity takes on a value essentially determined by the pressures $P_0$ and $P_1$ in each the stages.

FIG. 35 depicts an example steam transfer arrangement between stages. As each stage extracts energy from the total steam flow it is provided, the operating steam pressure $P_1$ in a subsequent stage is lower than the operating steam pressure $P_0$ in the stage that proceeds it. The pressure difference gives rise to a steam velocity, denoted v. For a sufficiently small orifice size limiting the flow between stages, the orifice size has trivial significance and the velocity takes on a value essentially determined by the pressures $P_0$ and $P_1$ in each the stages.

Figure 36:
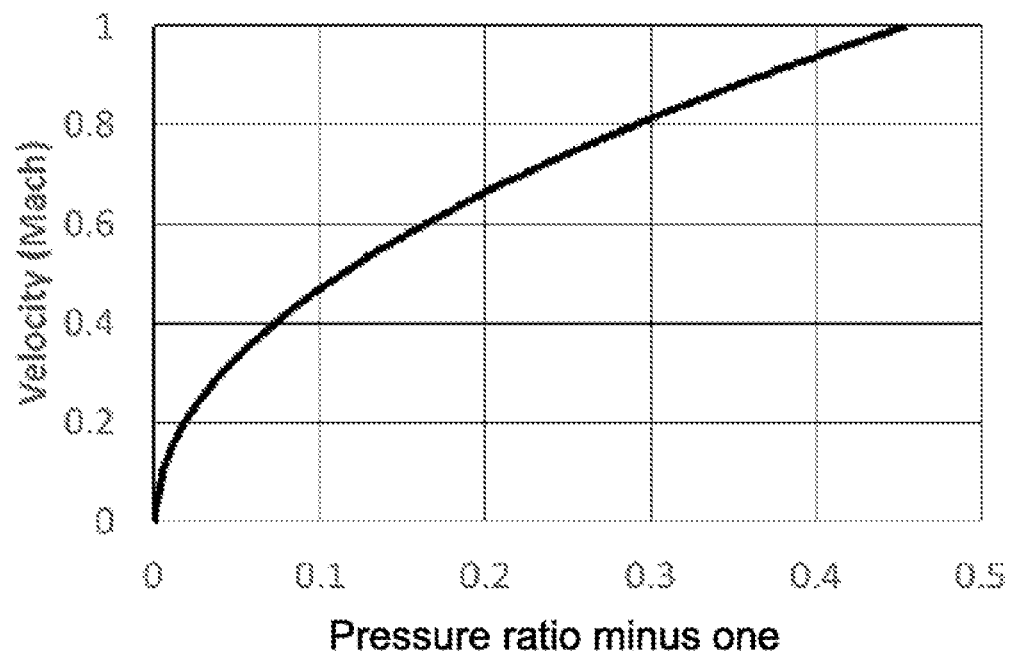
FIG. 36 depicts a representative curve relating steam velocity v flowing between successive stages to the ratio of pressures $P_0$ and $P_1$ in each the stages.

FIG. 36 depicts a representative curve relating steam velocity v flowing between successive stages to the pressures $P_0$ and $P_1$ in each the stages. The velocity of the steam is proportional to the ratio of the pressure minus one. Steam will not travel faster than the speed of sound through a nozzle in this configuration.

Figure 37:
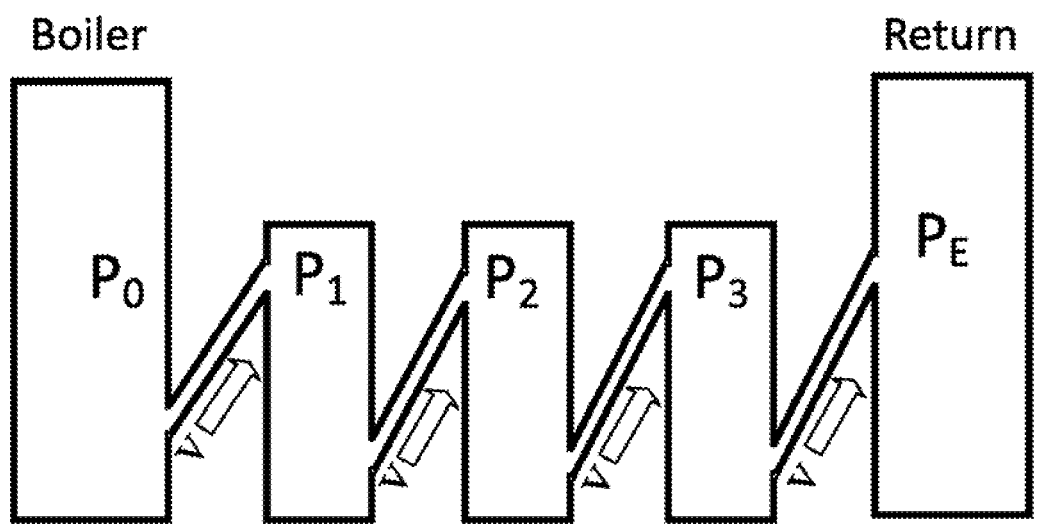
FIG. 37 depicts an example sequence of stages (here three are shown, although numbers in the 10-100 or beyond are anticipated for by the invention), the steam is sourced by a steam boiler (left) and after traversing all stages is subsequently feed to a return arrangement.

FIG. 37 depicts an example sequence of stages (here three are shown, although numbers in the 10-30 or beyond are anticipated for by the invention), the steam is sourced by a steam boiler (left) and after traversing all stages is subsequently feed to a return arrangement.

As stated earlier, the velocity of the steam entering a ring stage is primarily determined by the ratio of steam pressure delivered from the output of the nozzle to the steam pressure applied to the input of the nozzle. In an example embodiment, this ratio needs to be substantially higher than the choke ratio for steam, which is 0.543. Under this example operating condition, a given pressure ratio $p_r$ is obtained for each consecutive pair of rings in the connected sequence of ring stages; that is the pressure at each successive stage will be lower by a factor of $p_r$. Pressure applied to each ring drops geometrically from stage to stage and a constant steam velocity is obtained. The pressure drop across all the rings in such a sequence of N rings would then be $p_r^N$.

Steam boilers commonly used to generate steam for power generation will produce steam at 10 bar (1 MPa) or more. As an example, if a system were designed with 30 consecutively interconnected stages each with constant $p_r$ and the pressure across all 30 stages is arranged to drop from 10 bar to 1 bar, then $$p_r = \sqrt[N+1]{\frac{p_{out}}{p_{in}}} = \sqrt[31]{\frac{1 \text{ bar}}{10 \text{ bar}}} = .926.$$

The ideal number of stages depends on a variety of design parameters and engineering trade-offs, but the two of the most important parameters involved are the desired steam velocity and the output pressure from the boiler. Having a larger number of stages that are each proportionately smaller will produce the same amount of energy and efficiency, but could increase the cost of the full system. Having too few stages will either require that the boiler runs at lower pressure, or that greater destructive force could occur on each rotor.

Figure 38:
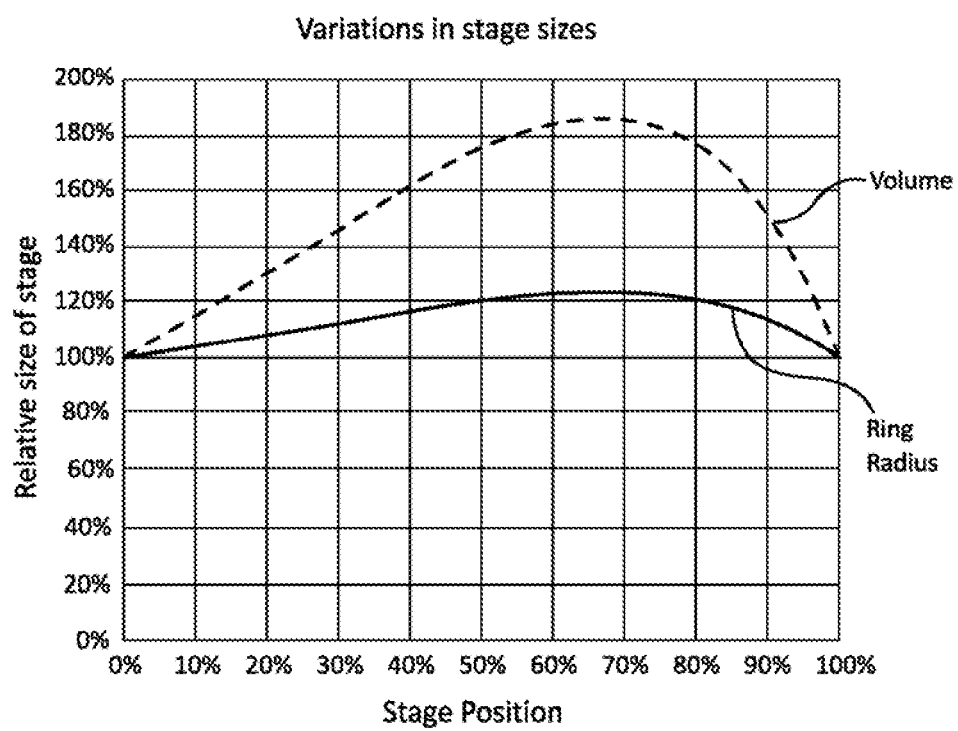
FIG. 38 depicts example stage volume and major-radius of the stage ring as a function of stage sequence number in an example high performance embodiment of the present invention. In this example, all dimensions of the stage scale proportionally, so the major-radius of each stage (and accordingly the major-radius of the internal ring within that stage) varies as the cube root of stage volume, and similarly the cross-sectional diameter of each stage (and accordingly the minor-radius of the internal ring within that stage) varies as the cube root of stage volume.

FIG. 38 depicts example stage volume and major-radius of the stage ring as a function of stage sequence number in an example high performance embodiment of the present invention. In this example, the steam mass in each stage declines linearly, and the pressure ratio between stages is constant. All dimensions of the stage scale proportionally, so the major-radius of each stage (and accordingly the major-radius of the internal ring within that stage) varies as the cube root of stage volume, and similarly the cross-sectional diameter of each stage (and accordingly the minor-radius of the internal ring within that stage) varies as the cube root of stage volume.

Figure 39:
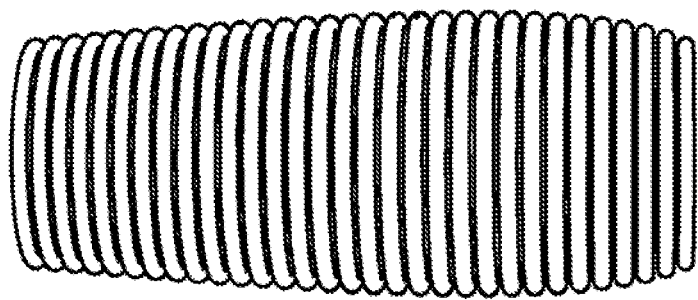
FIG. 39 depicts a representative relative major-radius scaling of a sequence of stages following the relationships of stage sizes to stage sequence number as depicted in FIG. 38.

FIG. 39 depicts a representative relative major-radius scaling of a sequence of stages following the relationships of stage sizes to stage sequence number as depicted in FIG. 38.

The example in FIGS. 38 and 39 could be configured for different design decisions. For example, the mass between stages falls more precipitously when steam traps are used. Maintaining a constant pressure ratio between stages is a choice. The design could instead choose to maintain a constant temperature gradient between stages to optimized heat recycling. Or the design could choose to make each stage the same size to simplify manufacturing. Each of these patters will have different pressure, temperature, and sizes for each stage.

In operation neither steam nor water can exit from the systems within any of the rings, except by means of provided safety-relief valves or servicing arrangements.

Various variation and alternative implementations are anticipated, and a few of these are discussed below.

As a first example, in some embodiments it can be advantageous for the steam to have a consistent velocity. For implementations involving conservation of mass flow (for example an arrangement without steam traps that do not allow water or steam to escape), each ring can be designed to hold a constant mass of steam relative to the other rings. (A variable mass alternative is also discussed later.) In a system without escape and equal steam mass in each ring, and consistent steam velocity, there could be engineered a consistent energy extracted from each ring. The enthalpy of steam varies proportionally to $\chi$ for wet steam. Assuming enough heat recycling could occur at each stage, then each stage could house steam with $\chi$ that is lower than the previous steams $\chi$ by a constant amount. Given the limitations of nearly isentropic turbine path, and limits on heat recycling this may not be possible, however for the purpose of this example, a 30-stage ring turbine with $\chi_{min}=0.1$ starting with dry (not superheated) steam, would result in $\chi$ declining by 0.03 at each stage.

In this example, it is noted that $\chi$ declines linearly with each stage, while the pressure drops geometrically between stages. The relative volume of steam (given constant mass) will approximate $$\frac{\chi}{p}$$

for every stage. The relative volume of an ideal gas is proportional to 1/p. Wet steam contains a proportion of water which has a volume of less than 0.1% of that of steam at 1 bar. While ideal gasses compress proportionately to pressure, liquid is almost incompressible. For an approximation we can ignore the volume of liquid water for any value of $\chi$ that is not very close to zero, although the actual design will use a somewhat more complex equation. For an example approximation, the volume of a mass of steam falls linearly with $\chi$, simply because the amount of steam has fallen linearly, and the volume of the water is ignored. Thus, the relative volume (given a constant mass) for a ring stage is proportional to $$\frac{\chi}{p}.$$

If the system starts with dry, non-superheated steam, $\chi=1$ before the first stage, and is $\chi_{min}$ after the last stage. If there are N stages, then $$\chi_i = \chi_{min} + \left(1 - \frac{i}{N}\right)(1 - \chi_{min}) \text{ and } p_i = p_{in}\left(\frac{p_{out}}{p_{in}}\right)^{i/N},$$

so the volume will be $$\frac{\chi_{min} + \left(1 - \frac{i}{N}\right)(1 - \chi_{min})}{p_{in}\left(\frac{p_{out}}{p_{in}}\right)^{i/N}}.$$

To get a picture of relative volume, we can ignore $p_{in}$, and graph the function based on various values of i/N, given known values for $\chi_{min}$ and $$\frac{p_{out}}{p_{in}}.$$

Using this equation, we can see one reason why $\chi_{min}$ must not be too low. The last stage (where I equals N) would simplify to $$\frac{\chi_{min}}{p_{out}}.$$

If $\chi_{min}$ were essentially zero, then the ring volume would have to be essentially zero, which is physically impossible.

As can be seen in figures showing all the rings stacked, the rings slowly get larger (in line with the equation above) until a maximum value is reached, after which the rings start to get smaller at an accelerating rate. A possible design decision would be to require that the last stage be the same size as the first stage, to avoid the portion of the equation curve with rapidly declining volumes. For this design point to be achieved $$\chi_{min} = \frac{p_{out}}{p_{in}}.$$

For example, it our boiler produced steam at 10 bar, and the last ring stage expelled steam at 1 bar, then $\chi_{min}$ must be 0.1 (plus an incremental 1/N, as stated earlier, where N is the number of stages.) If a lower pressure boiler is used to reduce the number of stages, then $\chi_{min}$ would be even higher, resulting in more rejected heat.

When operating, each ring will comprise a different volume of steam, and this is advantageously accomplished by scaling each axis by the cube root of the required volume. Thus, the scale factor for a ring would be proportional to $$\sqrt[3]{\frac{\chi_{min} + \left(1 - \frac{i}{N}\right)(1 - \chi_{min})}{\left(\frac{p_{out}}{p_{in}}\right)^{i/N}}}.$$

It can be desirable to not perfectly scale each ring (for example for better magnetic coupling it can be suboptimal to not scale the gap between the rotor and stator), in which case more complex equations are required. But the results will not vary greatly from this general relative degree of scaling from ring to ring.

Alternative implementations are possible that permit water to be extracted from the ring stages, rather than maintaining the water in the system through all of the stages.

The advantage of this approach is that steam will be dryer at each stage, and many of the concerns around $\chi_{min}$ are no longer appropriate. The primary disadvantage of this approach is that there is less mass at each stage, and so there is progressively less kinetic energy transferred to the rotor, and thus less energy extracted in the later stages. This is not a fatal problem, as the earlier stages can make up for the difference at some cost to the system. Water would need to be extracted from stages using Venturi steam traps, and extra plumbing will be required to route the water from each stage back to the boiler. If the Venturi steam traps expel water into 1 bar pressure from a higher pressure, only water can be expelled at 1 bar. Since the rings are operating at a higher pressure, steam where the water can be liquid at a higher enthalpy level, some wet steam will remain trapped in the ring stage.

The previous example assumed a constant drop in enthalpy between stages, and a constant pressure ratio between stages, as well as assumed that no steam traps were used. As a result, the size of each stage needed to adjust. In reality the enthalpy changes at each stage will vary based on the opportunity for heat recycling, and the slope of the is enthalpic curve at that point on FIG. 18. It may be preferable to not have constant pressure ratio between stages, but rather have constant temperature changes between stages (to optimize heat recycling), or to keep the sizes of the stages constant to simplify manufacturing.

In one aspect of the invention, each stage has a natural operating temperature associated with the pressure within a cavity comprised by that stage.

Waste Steam

Waste steam exits the last stage of the ring turbine, and the energy of this steam will not be used to generate electricity. Nominally, this steam must be cooled until it becomes water before it can be put into a pump to raise the pressure as feedwater to the boiler. As noted before, injector pumps can tolerate some level of wet steam, so it may not be necessary to 100% cool the steam before pumping it to the feedwater, however enough enthalpy needs to be removed, to guarantee that the resulting feedwater is not wet steam.

Although the amount of waste heat is much less than that for a conventional turbine, there will still need to be a cooling tower, radiators and/or evaporation ponds.

Bearing Arrangements

As described throughout, in operation the rotor of each ring will be rotating inside its associated stator. For optimal magnetic coupling between the rotor and the coils, it is desirable to have the gap that separates the magnetized rotor and the ferromagnetic stator be as small as possible. Also, kinetic energy transfer occurs primarily in the rotor channels rather than in the gap, providing another reason to minimize gap distance.

Bearing arrangements can be used to prevent the rotor from touching or colliding with the stator. There are large numbers of bearing solutions prevalent in mechanical designs, and aspects of that prior art is applicable to this design, either directly or advantageously with some novel improvements to be discussed.

Figure 40:
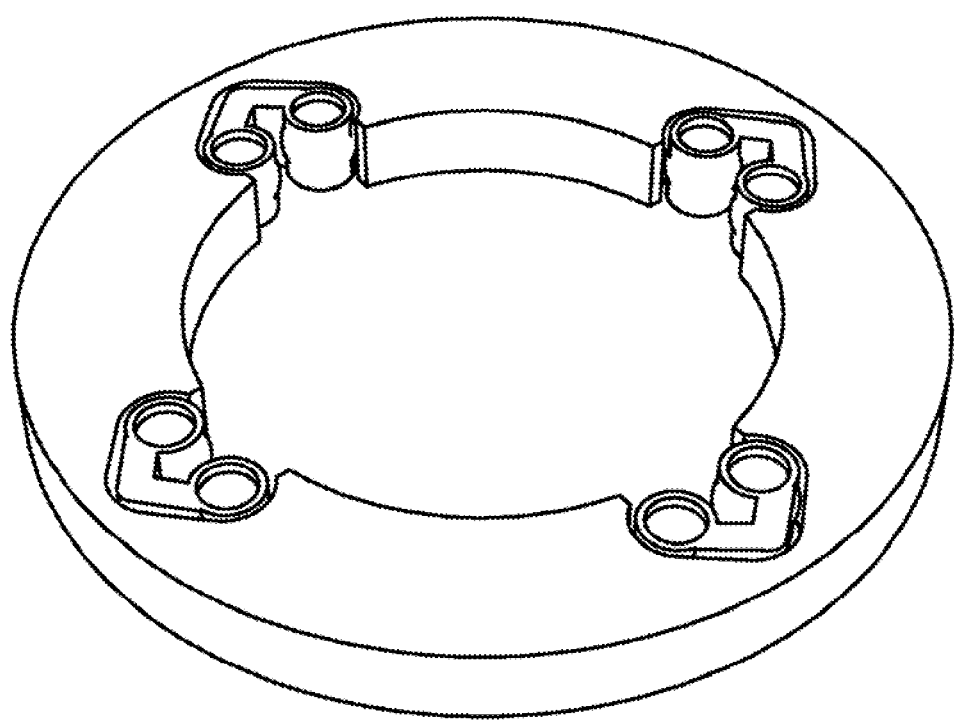
FIG. 40 depicts an example bearing arrangement within a cross-section of the interior of the toroidal stator housing.
Figure 58:
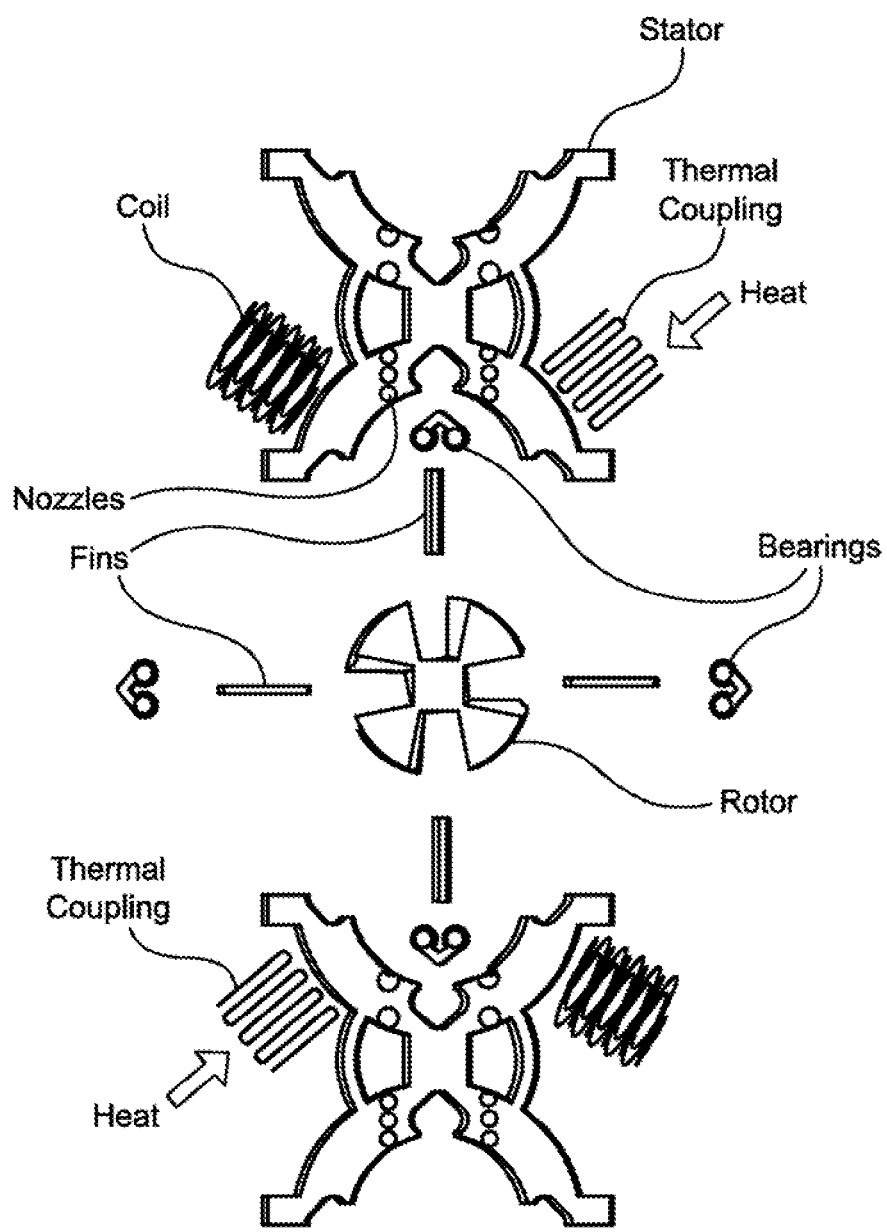
FIG. 58 depicts a representative exploded view of an example embodiment of several adjacent ring stages, showing stator, rotor, bearings, injectors, coils and heat recycling.

In some embodiments of the invention, mechanical bearings (for example ball bearings) can be introduced between the rotor and stator within the cavity depicted in FIG. 58 so as to keep the rotor from colliding with the stator and invoke adequately stabilized rotation. As an example of this, as shown in FIG. 40, a small separation of additional space within the stator wall of the cavity and the enclosed rotor can be provided along with cups or other escallop to accommodate ball bearings between the rotor and the stator. In this example embodiment, four sets of bearing channels are shown, however of course other implementations are possible. In embodiments of the invention that do not use ball bearings, the small separation could be reduced and/or have a different geometry.

In FIG. 40, a cross-section view of the stator is shown with an embodiment that has four bearing channels that extend along the entire inner surface of this hollow ring. Ball holders fit into the bearing channels, and these ball holders position a pair of balls equally spaced around the entire channel. The spacing between ball pairs within a channel is a design parameter. If the spacing is too large, the balls will be too far apart and insufficient bearing support is supplied. If the balls are too close, unnecessary friction is introduced to the system. Friction loss will generate heat, and most of this heat will be recycled back into the steam.

Figure 41A:
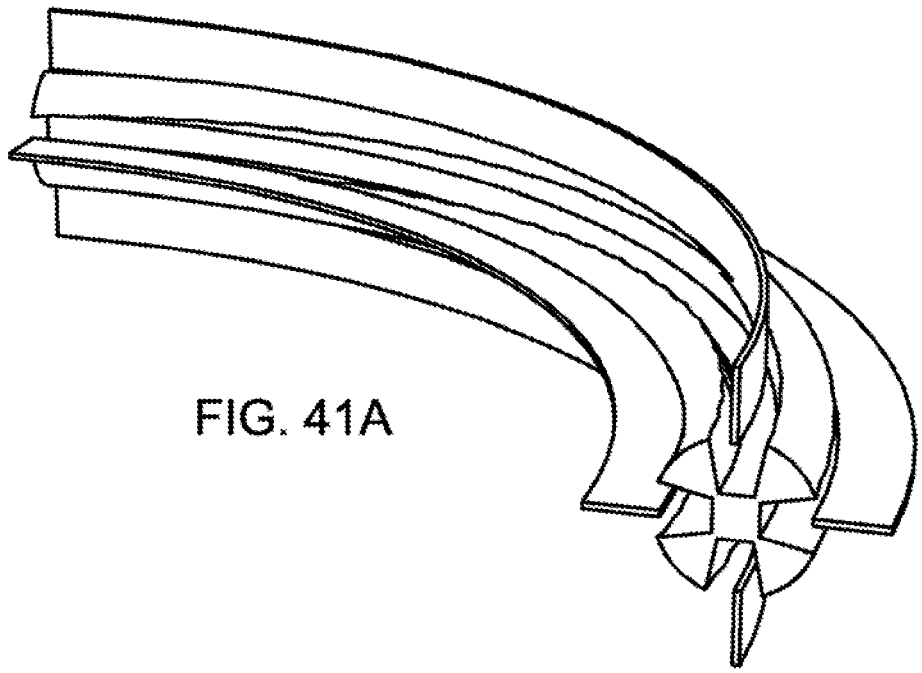
FIGS. 41A and 41B depict two examples of fin-based bearing arrangement for suspending the rotor ring within the toroidal stator housing.
Figure 41B:
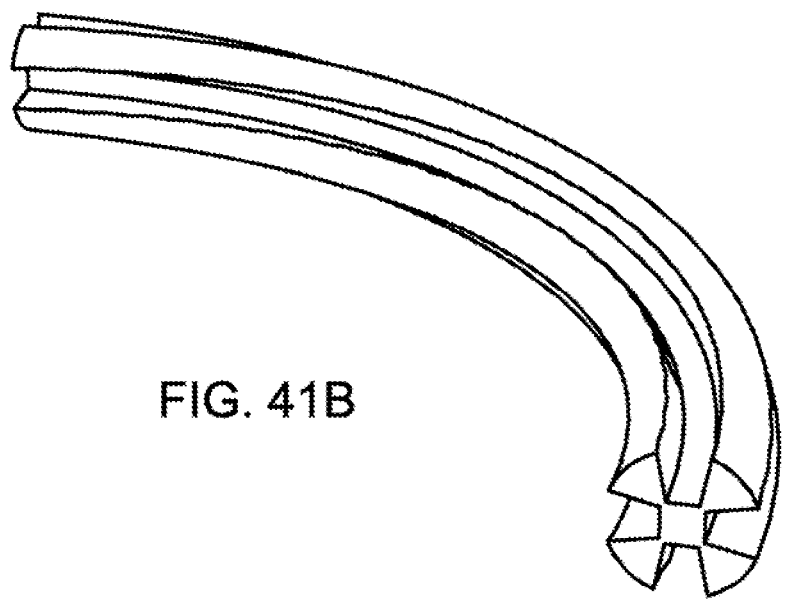
Figure 42A:
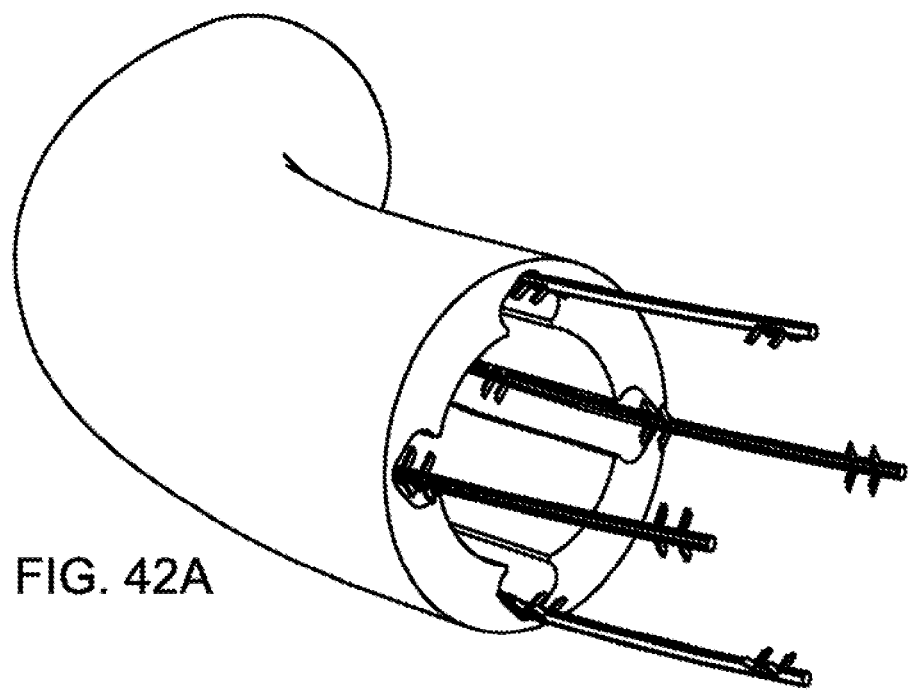
FIGS. 42A and 42B depict two views of an example embodiment of a ball bearing system for a rotor/stator pair.
Figure 42B:
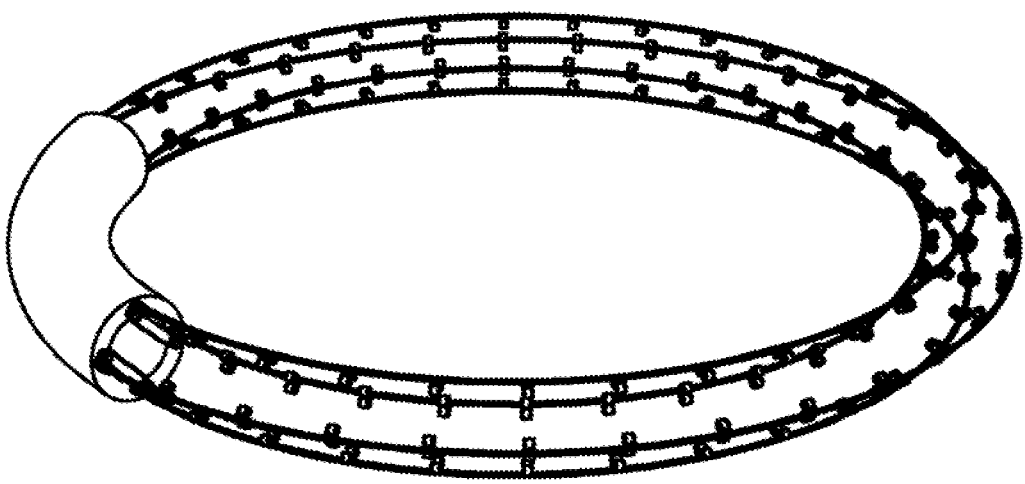
Figure 43:
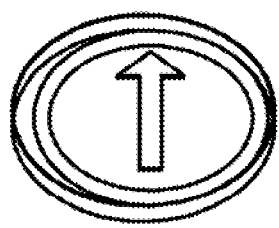
FIG. 43 through FIG. 48 depict the traditionally-named directions of translations and rotations representing the six degrees of freedom of rigid motion of a rotor ring within its associated toroidal stator housing.
Figure 44:
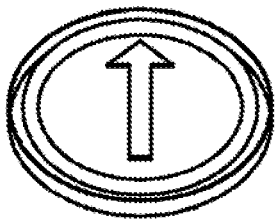
Figure 45:
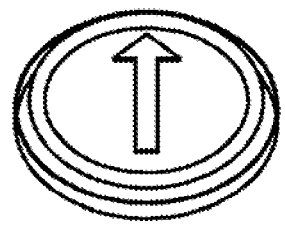
Figure 46:
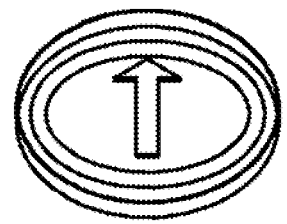
Figure 47:
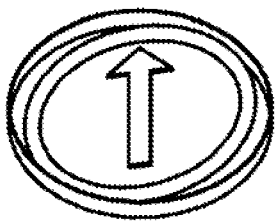
Figure 48:
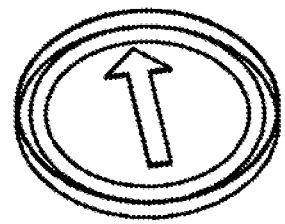

FIG. 41 shows an example embodiment of the rotor that comprises four fins, one fin for each of the bearing channels. Each fin is located between a pair of balls, and the resulting arrangement guarantees that the rotation of the rotor will stay within design tolerances within its required path. FIG. 42 depicts two views of an example embodiment of a ball bearing system for a rotor/stator pair.

It is anticipated that the rotor will undergo undesirable rotational and translations motions during rotor rotation. FIGS. 43-48 show the 6 associated degrees of freedom for a rotor within a stator. YAW (depicted in FIG. 48) is the only desired movement of the rotor; to the extent possible within engineering tolerances X, Y, and Z motions of the rotor should remain fixed and no PITCH or ROLL should occur. Similarly, to the extent possible within engineering tolerances X, Y, and Z positions of the stator should remain fixed, and no YAW, PITCH, or ROLL should occur.

Figure 49:
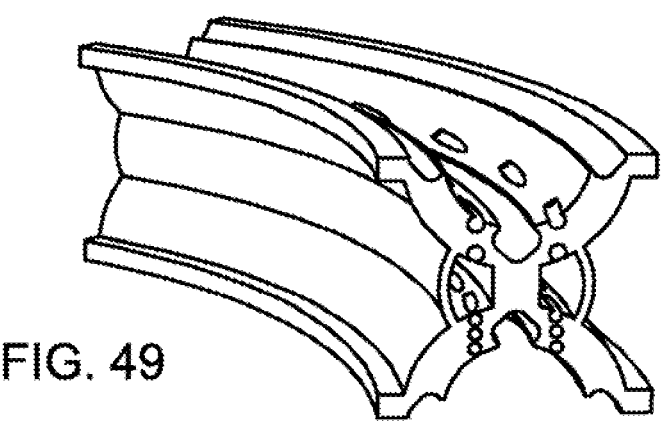
FIG. 49 depicts an example union arrangement between two adjacent toroidal stator housings of two adjacent ring turbine stages.
Figure 50:
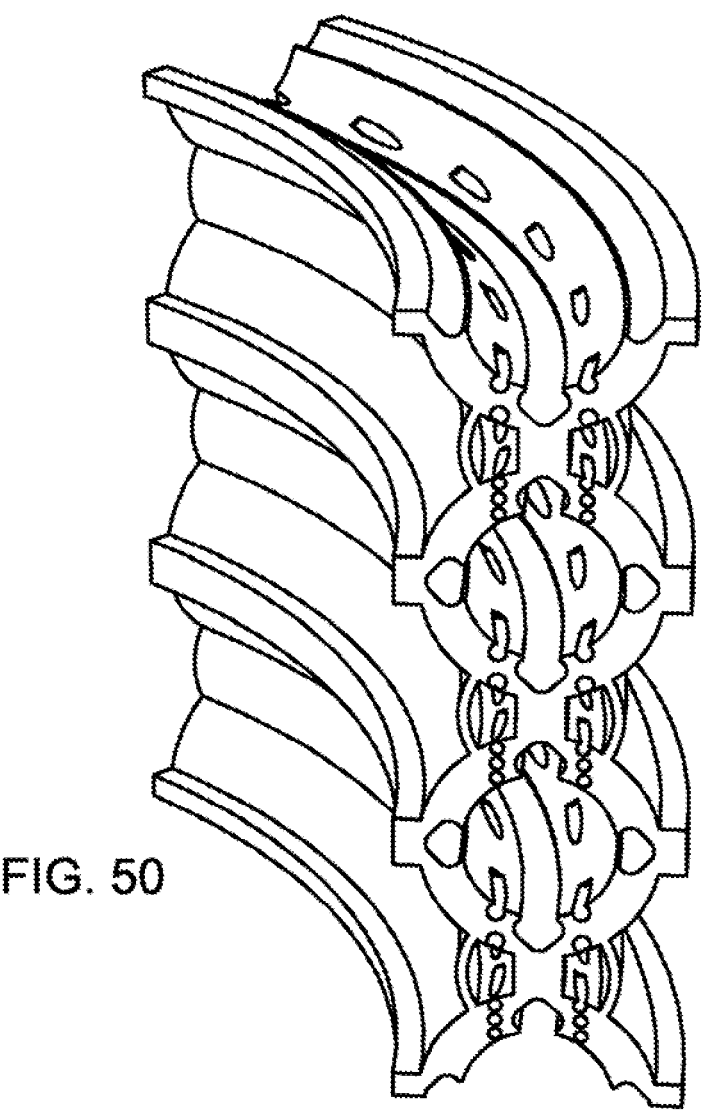
FIG. 50 depicts an example union arrangement between three sequentially-adjacent toroidal stator housings of three sequentially-adjacent ring turbine stages.

The example configurations depicted in FIGS. 41, 49, and 50 comprise four bearing channels and four fins. It is possible to use a configuration with other numbers of bearing channels, for example two bearing channels or three bearing channels. Employing fewer channels would likely not reduce rotational friction, as having fewer channels likely will require a corresponding decrease in the spacing between rotating bearings (such as aforementioned rotating ball bearings). It is noted that each channel produces volume inducing vibration-producing turbulence into the steam, so fewer channels is preferable. With two bearing channels, there can be situations where there is not be enough support for all the degrees of freedom. With three bearing channels spaced at 120 degrees apart, the bearings are not antipodal. Because magnets generally have north and south poles that are antipodal, it could be desirable to have coils be antipodal, and having bearing channels that are not antipodal will reduce the available space for coils.

A disadvantage of using multiple bearing channels for the previously described arrangements is that the afore described fins must extend from the rotor across the gap into the bearing channel. These fins could prevent steam from being able to move across the fins. In the channels are configured in a twisting pattern, it is expected that the steam would also follow a twisting pattern in the gap, and the fins could interfere with this motion. There are many solutions to this problem, including having the fins be perforated with many holes, or having the fins have a cutaway whenever a fin passes over a channel.

Another example configuration would not involve fins, but rather could include matching bearing channels on both the stator and rotor, where each bearing channel could host at least one ball located with advantageous spacing within the channel.

Traditionally turbines have bearings integrated into the shaft, and fan blades extend from the shaft. Even with a shaft-less rotor, it could still be possible to have the bearings be placed where the shaft would have been—at the center of hole in the middle of the ring. This approach avoids needing the large bearing channels and rotor wings, however would require a spoke system that extended to a hub and bearing assembly. These spokes need to be within the stator cavity which would substantially increasing the volume of the steam channel. The cavity area that housed the spokes, would also house a significant volume of steam which could degrade the highly-constrained steam paths.

Alternatively, mechanical (ball) bearings can be omitted and replaced with other bearing means. If the rotor could free float inside of the stator, it would naturally remain centered (when spinning) in the channel based on three factors. Steam traveling through the channels in the rotor are traveling at a higher speed, and thus at a lower pressure that the steam in gap. Therefore, there will be forces on the rotor from all sides pushing to keep the rotor centered. Because steam is flowing through a twisted channel, there is a position-averaging effect that will keep the rotor centered. The gyroscopic effect of a rotating mass around its center of mass will work to resist perturbations to the rotational orientation, strengthening the rotational stability of the system and helping the rotor remain centered as the forces of twisting steam flow act on it.

Even with bearings exploiting steam flow and gyroscopic effects, such an embodiment design exposes the rotor to turbulent shock. The nozzles, pumps or injectors are directing moderately high speed steam into the rotor channels. As the rotor moves, the channels change position while the nozzles, pumps or injectors stay fixed. At any given time, some nozzles, pumps or injectors will be optimally providing kinetic energy to the walls of the channels of the rotor. At the same time, other nozzles, pumps or injectors will be focusing the steam at a part of the rotor that does not have a channel, and so the steam must either move through a narrow gap, or provide a diminished flow of steam due to higher resistance to flow. In either case, there will be destabilizing forces occurring on different parts of the rotor during different angles of rotation. Even at equilibrium, it is possible that the steam motion and gyroscopic effects are insufficient to serve as a bearing, in which case either magnetic or mechanical bearings will be needed.

The coils used to extract energy from the rotor can alternatively be used to add energy to the rotor. Furthermore, individual coils can be configured to either add or reduce energy in different regions around the rotor. For example, if the rotor was perceived to be too far to the left within the coil, opposite coils can work in tandem to push the rotor to the right. The existing coils can be augmented to control a dynamic magnetic bearing.

For a dynamic magnetic bearing to work properly, there must be a control system that can detect the position of the rotor on 5 degrees of freedom described above (tolerances X, Y, Z, PITCH, ROLL). Each coil can be configured in one of three states by the controller. The coil can be used for extracting power, inserting power, or can be electrically disconnected. When the electrically coil is disconnected, it will nonetheless still experience the strength of the magnetic field. Measurement of the voltage across a non-energy-extracting coil can be used to calculate the proximity of a magnetic pole to the coil. A computational or analog controller provided with such measurements can easily solve for the position of each degree of freedom of the rotor on based on measured values of the voltage of each of selected coils at appropriate points in time.

The magnetic poles on the rotor will always be aligned to point perpendicular to the surface of the rotor and stator, and the gap between them. Similarly, the coils are arranged such that they will generate a magnetic field in the same orientation. The strength of the magnetic field generated by the coils is dependent on the amount of current put through the coils, and reversing the direction of the current will reverse the direction of the field. The field on the rotor is either a permanent magnet or electrically-excited magnet. When the rotor is moving, the magnetic field it emanates is moving with it. When stator coils are acting as a magnet, the resulting field is at a fixed position, but can be turned on (or reversed) by the controller. If both the rotor pole and an aligned magnetic coil have the same magnetic polarity (e.g. a north pole adjacent to a north pole, or a south pole adjacent to a south pole), then the magnets will repel each other, putting force on the rotor. If the rotor pole and an aligned magnetic coil have opposite magnetic polarity, then they will attract. Where the two magnets are directly opposite each other, then the (repelling or attracting) forces will be aligned with the magnetic field. However, if the magnets are not exactly aligned, then the forces will be diminished, and the direction of the force will be the same as the angle that separates the poles.

In many implementations, a dynamic magnetic bearing would need to supply precisely timed forces along a specific axis or degree of freedom. To achieve the force required would often require the controlled simultaneous engagement from multiple coils, as the force direction from any one coil is unlikely to match a required corrective force direction.

For a dynamic magnetic bearing to effectively stabilize on all stabilizing degrees of freedom could require an array of coils around the periphery of the stator to have coverage on all axes that can be independently controlled providing adequate distribution around the both the minor and major radiuses of the ring.

In some implementations, an electrically-powered magnetic bearing must take special actions during the start-up and shut-down of the system. When the rotor is not spinning, and steam is not moving within the stator, the rotor will rest on the floor of the stator cavity due to gravity. The magnetic bearings must be able to lift the rotor from the bottom, and begin the spinning process. During shut down it must do the reverse, such that the rotor is left undamaged after the machine has stopped.

A static magnetic bearing can in some implementations provide a superior option. Permanent magnets are placed in the bearing channels of both the stators and rotors, such that the stator and rotor magnets oppose each other. These magnets will keep the rotor stable on 5 degrees of freedom, and will minimize the volumes of space where steam will be unproductive. For a static magnetic bearing to work, it is not possible to use twisting steam channels in the rotor, as the static bearing magnets will interfere with the magnets used for energy production.

Thermal Recycling

Efficiency losses in turbines are dominated by rejected heat. If heat can be recycled, efficiency increases. Heat energy can be transmitted to the steam within a ring via radiation through the stator casing. A ring is filled with wet steam at constant pressure. Wet steam ("Region IV" steam) is characterized by the fact that the temperature of the steam is constant for a given pressure, regardless of energy entering or leaving the system. As mentioned above, removing generated electrical energy via the coils must make the steam wetter (by simple conservation of energy principles). Similarly, rejected heat loss via radiation from the steam will make the steam wetter. If exogenous heat is added to the steam via incoming thermal radiation, the steam will in contrast become dryer, and more energy can be available for harvested in this or subsequent ring stages.

For heat to be injected into a ring, typically two conditions must exist. First there needs to be good thermal conductance between the source of the heat (ideally recycled heat) and steam within a particular ring. Generally, this is accomplished by using metal with good heat conductivity between the heat source and the heat sink that are near to each other.

For heat to transfer to a ring serving as a heat sink, that ring will need to be operating at a lower temperature than that of the heat source, ad further there must be an adequate thermal gradient for the heat to prefer to propagate into the heat sink rather than radiate into the atmosphere. With a multistage ring turbine, each ring is operating at a different pressure, and because the ring contains wet steam, that steam has a known temperature given the pressure. For example, if the pressure in a ring as at atmospheric pressure (1 bar), then the wet steam will have a temperature of 100° C. (the boiling temperature of water at atmospheric pressure.) If the ring turbine operates from the range of 10 bar (high pressure) to 0.1 bar (a vacuum), then each of the ring stages would have a different temperature, from 180° C. at the first stage to 40° C. at the last stage. The lower operating temperatures of the vacuum stages provide better heat sinks for recycling energy because the heat sinks operate at a lower temperature.

Electrical coils carrying current i generate Ohmic heat according to $W=i^2R$, where i is the amount of electrical current (Amps), and R is the resistance of the coil. The coil resistance R can be minimized by using more metal to make the coils (thicker and/or wider electrical paths) and by using the most conductive metals, but there is typically a limit to the size of the coils. (Reactance of the coils, load reactance, and power-factor are neglected in this simplified consideration.)

Typical electrical coils are made by wrapping 'magnet wire' around an article of ferromagnetic material arranged to act as a magnetic pole. The wire wrapping typically comprises many revolutions wound according to a prescribed winding geometry, and the magnet wire employed is typically a conductive metal coated with a thin electrical insulator. This wire and pole configuration will radiate its Ohmic heat directly into the surrounding air unless the pole it is wrapped in such a way so as to radiate the heat to the stator.

Alternatively, FIG. 51 depicts two views of representational example of electrical coil fabricating by stacking functionally-shaped layers of electrically conductive material and interconnecting groups of adjacent layers with conductive plugs to create a spiraling electrically-conducting structure comprising an open center volume. In this example a rectangular spiral is rendered from a stack of flat rectangular plates but other flat or curved plate geometries can be used as advantageous to various aspects and embodiments of the invention.

Using 'printed' coils as represented in FIGS. 24, 26, 27, 28, 29, 34, 51A, 51B, 52, 53, 54, 55, 56, and 57 can be arranged to minimize the resistance of the coil, and conforms the surface area of the coil with the surface area of the stator to maximize heat transfer. The heat generated in the coils will heat up the stator casing, however the moving steam inside the stator will cool the casing and make the steam dryer.

Another source of heat are exhaust gases created from the burning of fuels used to heat the boiler. In some traditional turbine systems, such heat is captured and put to productive use in pre-heating water before it enters the boiler. In that scenario, the heat sink (water entering the boiler) can have a temperature as high as 100° C. Improved thermal coupling can be obtained employing vacuum stage rings which would sink heat into rings as low as 40° C.

Other possible sources of additional usable process heat include heat generated from beneficial associated secondary chemical reactions as will be described, and the ring turbine offers a range of temperatures to use as heat sinks to recycle this heat.

In one aspect of the invention, where the housing of each stage is arranged to absorb provided heat and utilize that absorbed heat for energy generation.

In another aspect of the invention, heat from bearing friction is cooled with thermal coupling with at least one stage housing, with the heat being transferred to steam enthalpy within that at least one stage.

In another aspect of the invention, Ohmic heat generated in electrical coils is cooled with thermal coupling with at least one stage housing, with the heat being transferred to steam enthalpy within that at least one stage.

In another aspect of the invention, exhaust heat from the boiler is cooled with thermal coupling with at least one stage housing, with the heat being transferred to steam enthalpy within that at least one stage.

Rotational Startup and Rotational Shutdown

When a ring turbine is initially started, the rotor will not be moving. In some implementations it is therefore necessary for the steam velocity to be lower than its equilibrium velocity when the rotor is at its equilibrium velocity. The primary driver of velocity is the relative pressure between stages, so the startup of the system will need to ramp up the pressure from the boiler until the rotors are spinning fast enough.

During active operation, each ring is spinning at a fixed rate with equal amounts of energy being added to the angular velocity from steam as is being removed via the coils. Whenever the ring is spinning below its expected rate, energy needs to be added to the system, either through the steam providing more energy than the coils are removing, or by reversing the coils and adding energy from the coils to the rotor.

When the coils are spinning slower than their target velocity, the rotors are subject to damage if the steam is moving at too high a velocity. To protect rotors, the velocity of steam (relative to the rotor) must be kept below a critical value. If the rotor is traveling slower, so must the steam. Thus, during startup steam velocities must be much lower than they are when the rotor is fully spun up.

One of the ways to lower the steam velocity is to lower the total pressure across all of the stages. For example, if the target rotor velocity is 50 m/s, and the target steam velocity is 100 m/s, then the maximum velocity differential is near 50 m/s. If the rotor is not moving, then the initial steam velocity cannot exceed 50 m/s. To reduce the steam velocity in half, and would require the pressure across the nozzles, pumps or injectors to be about 25% as high. As the rotor gains speed, the steam pressure can be increased. During the spin-up process, the Venturi steam traps may not have sufficient pressure drops to operate properly, resulting in steam loss through the traps.

As an alternative for other embodiments, current sequentially or periodically applied to the electrical coils can be used to align and/or spin up the rotor before steam is presented to the system.

If an implementation of the invention employs steam bearings or magnetic bearings to keep the rotor centered (rather than mechanical bearings such as ball bearings), these steam or magnetic suspension bearings can in the startup phases of some embodiments not be effective when the rotor has low angular velocity. It can be advantageous in these situations to add additional electrical coils that can be used to lift the rotor into position and hold it in that position until full stability and full angular momentum is established.

The gap between the stator and rotor is ideally as small as possible to maximize the magnetic coupling between the rotor and coils. The gap can also be used to minimize the windage losses resulting from steam traveling through the gap region and failing to apply force to the rotor.

To minimize the size of the gap requires both good mechanical tolerances on the production of the rotor and stator, plus bearing designs that minimize the amount of movement of the rotor on undesirable axes.

Venturi steam traps are less ideal during startup and shutdown, due to lower pressures across the trap. At very low pressures, steam will escape freely to the water return path, and the pump will not function. Steam may need to be expelled during startup and shutdown.

Powering down the system can be safer than startup, provided that steam flow is stopped or sufficiently diminished in such a manner to avoid damaging the rotor. The rotor will naturally come to a stop if the coils continue to take energy from the system.

Non-mechanical bearings also provide a challenge for spinning down, as typically magnetic and steam bearings rely on the rotor to be spinning at a high angular velocity to provide sufficient bearing forces. As the rotor is slowing down, and the bearing forces decrease the rotor is likely to collide into the wall, or violently settle at the bottom of the cavity. The same electro-magnets envisioned for startup can be used during spin down to apply forces on other axes during spin up and spin down to guarantee that the rotor comes to rest safely.

Variable-Load Operation

One common source of turbine inefficiency in today's electrical production systems is that not all turbines operate at full capacity, and there are energy-conversion losses associated with operating a turbine below its peak capacity.

The ring turbine system is fed by a source of steam at a known pressure. If a lower steam pressure is supplied to the ring system, the pressure gradient between the rings will decrease proportionately, and the amount of energy transferred to the rotors and coils will likewise decrease. At modest reductions, the system should not lose much efficiency, especially if the afore described means of capturing and recycling otherwise waste heat and energy are implemented in the embodiment. At reduced pressure in all ring stages, each stage temperature will also be lower, which in turn would improve their ability to recycle heat. There is expected to be a lower bound on stage operating temperatures where each stage comprises insufficient pressure to operate the machinery.

Adapting to changing electrical load requirements can in some embodiments involve changing the pressure output from the boiler, with this likely changing the rate of fuel consumption by the boiler. As these changes are not instantaneous, it can be necessary to vent excess steam during an electrical load reduction transition, or preferably, to find ways to store excess heat or energy temporarily during a transition.

Increases in load requirements cannot be met instantly without a separate store of energy. Energy stores can be accomplished with capacitors, batteries, hot liquid reservoir, etc.

3D Metal Printed Fabrication

By using low velocity steam, and having many stages, there can be lower requirements for the strength of the materials used to construct the stages. Because high levels of performance are not needed by each stage, and later stages can pick up the tailings of energy extraction, precise dimensions can in some embodiments be less important than for traditional turbines. Both factors make 3D-printing manufacture viable for the ring turbine. A disadvantage of the ring turbine system is having many stages, each with different dimensions. A ring turbine can be a large device with many chambers and nozzles. While this complexity can add costs to molded or milled parts, it is not a disadvantage for 3D printing. Molding is economical at larger scales, while 3D printing provides greater agility in customizing and updating the design.

FIG. 49 depicts a section of an example of how the stator would be manufactured using a 3D printer. In this embodiment, the lower half of one stator ring is manufactured with the upper half of an adjacent stator ring. Using a clam-shell arrangement for the stators allows the rotors and bearings to be installed within the stator, and then the stator parts can be fastened to ensure a sealed cavity.

Figure 53:
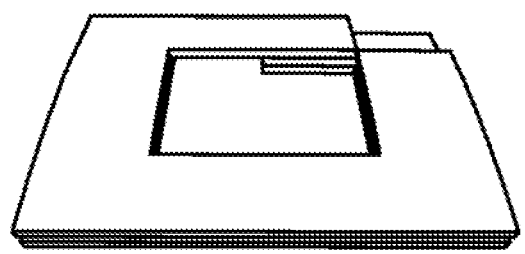
FIG. 53 depict a representational example of further steps in an approach to fabricating electrical coils by stacking functionally-shaped layers of electrically conductive material and interconnecting groups of adjacent layers with conductive plugs to create a spiraling electrical coil comprising an open center volume.
Figure 54:
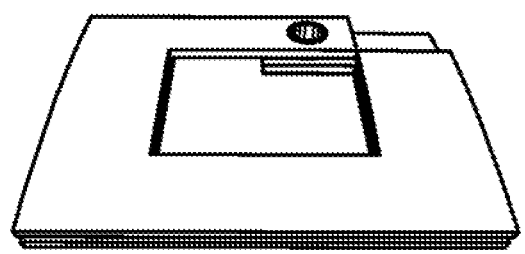
FIG. 54 depicts an electrical connection and structural supporting connecting plug linking one end of the second electrically-conductive layer with the first electrically-conductive layer below.
Figure 55:
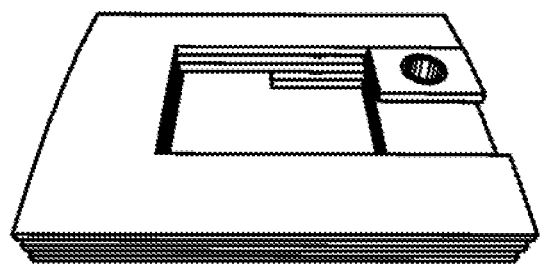
FIG. 55 then depicts repeating the process to add a third electrically-conductive layer to the arrangement depicted in FIG. 54. In this example a rectangular spiral is rendered from a stack of flat rectangular plates but other flat or curved plate geometries can be used as advantageous to various aspects and embodiments of the invention.

FIGS. 34, 53, 54, and 55 depict a representational example of an approach to fabricating electrical coils by stacking functionally-shaped layers of electrically conductive material and interconnecting groups of adjacent layers with conductive plugs to create a spiraling electrical coil comprising an open center volume. FIG. 34 depicts a first electrically-conductive layer, and FIG. 53 depicts a second electrically-conductive layer positioned atop the first electrically-conductive layer of FIG. 34. FIG. 54 then depicts an electrical connection and structural supporting connecting plug linking one end of the second electrically-conductive layer with the first electrically-conductive layer below. FIG. 55 then depicts repeating the process to add a third electrically-conductive layer to the arrangement depicted in FIG. 54. In this example a rectangular spiral is rendered from a stack of flat rectangular plates but other flat or curved plate geometries can be used as advantageous to various aspects and embodiments of the invention.

Figure 51A:
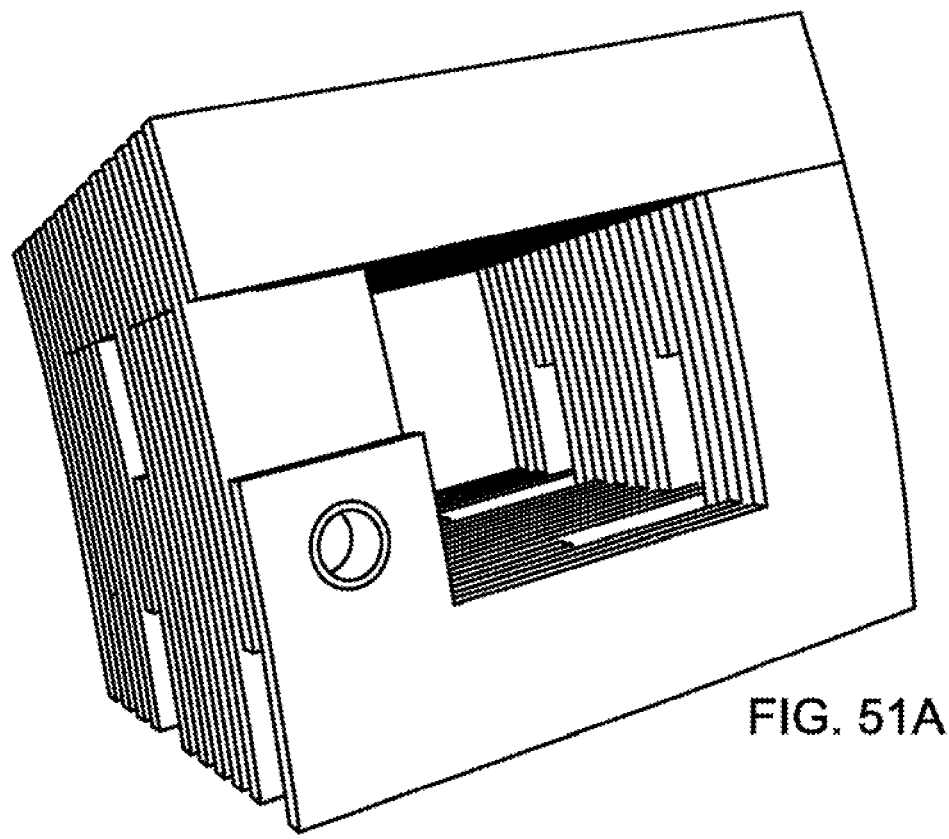
FIGS. 51A and 51B depict two views of a representational example of electrical coil fabricating by stacking functionally-shaped layers of electrically conductive material and interconnecting groups of adjacent layers with conductive plugs to create a spiraling electrically-conducting structure comprising an open center volume. In this example a rectangular spiral is rendered from a stack of flat rectangular plates but other flat or curved plate geometries can be used as advantageous to various aspects and embodiments of the invention, such as recycling heat, and maximizing the amount of electrical energy that is produced by the moving magnetic field.
Figure 51B:
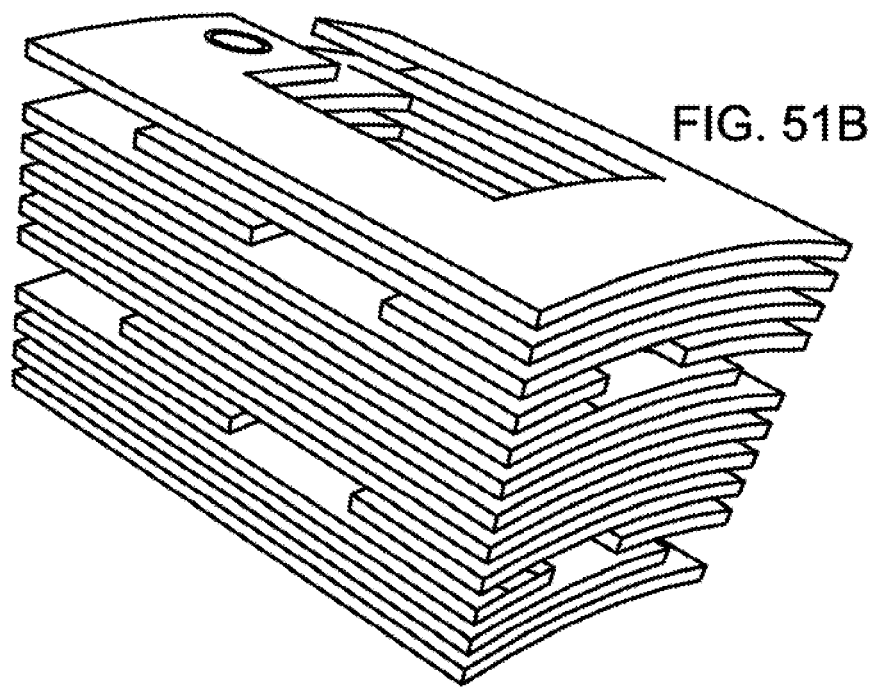

FIGS. 51A and 51B depict two views of a representational example of electrical coil fabricating by stacking functionally-shaped layers of electrically conductive material and interconnecting groups of adjacent layers with conductive plugs to create a spiraling electrically-conducting structure comprising an open center volume. In this example a rectangular spiral is rendered from a stack of flat rectangular plates but other flat or curved plate geometries can be used as advantageous to various aspects and embodiments of the invention.

Figure 56:
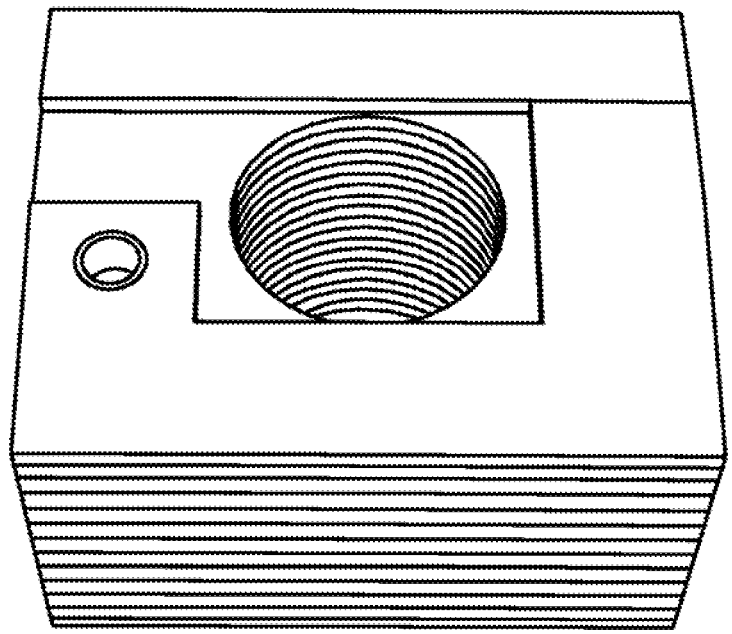
FIG. 56 depicts an example arrangement wherein the open center volume of the stacked-layer electrical coil such as that depicted in FIG. 51 is arranged for the introduction of a core of ferromagnetic material.

FIG. 56 depicts an example arrangement wherein the open center volume of the stacked-layer electrical coil such as that depicted in FIG. 51 is arranged for the introduction of a core of ferromagnetic material.

Figure 57:
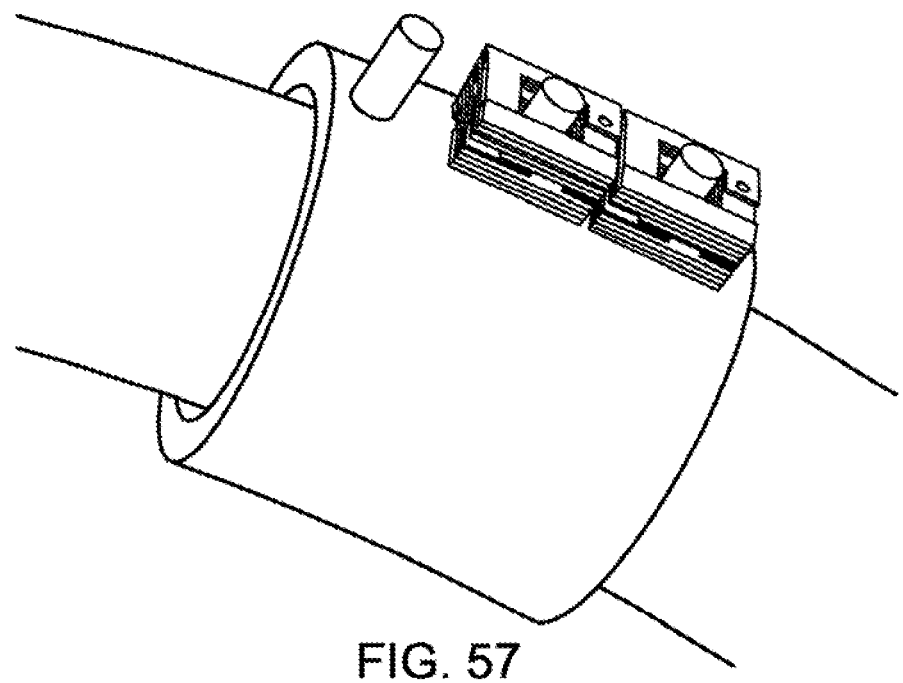
FIG. 57 depicts an example arrangement showing (on the left) representational example of a core of ferromagnetic material that can be introduced into an open center volume of a stacked-layer electrical coil such as that depicted in FIG. 51, and further shows (on the right) two instances of a stacked-layer electrical coil such as that depicted in FIG. 56 whose open center volume has been fitted with a core of ferromagnetic material. Each of these are depicted in an example contact position and example orientation on the outer surface of an example stator housing of a ring stage.

FIG. 57 depicts an example arrangement showing (on the left) representational example of a core of ferromagnetic material that can be introduced into an open center volume of a stacked-layer electrical coil such as that depicted in FIG. 51, and further shows (on the right) two instances of a stacked-layer electrical coil such as that depicted in FIG. 56 whose open center volume has been fitted with a core of ferromagnetic material. Each of these are depicted in an example contact position and example orientation on the outer surface of an example stator housing of a ring stage.

Figure 52:
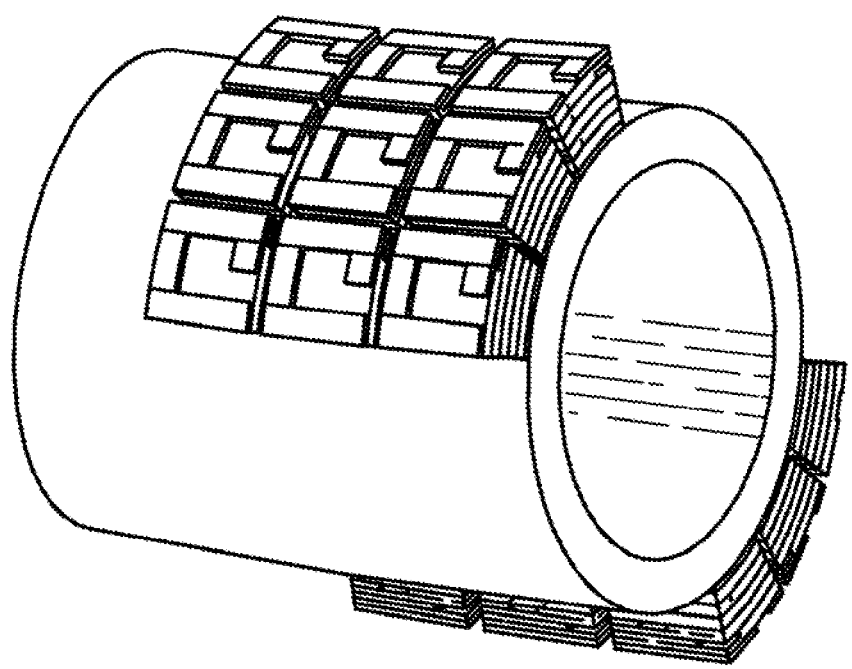
FIG. 52 depicts an example array of instances of a stacked-layer electrical coil such as that depicted in FIG. 56, each of which whose open center volume can been fitted with a core of ferromagnetic material, arranged in contact positions and example orientations on the outer surface of an example stator housing of a ring stage.

FIG. 52 depicts an example array of instances of a stacked-layer electrical coil such as that depicted in FIG. 56, each of which whose open center volume can been fitted with a core of ferromagnetic material, arranged in contact positions and example orientations on the outer surface of an example stator housing of a ring stage.

FIG. 50 depicts an example union arrangement between four copies of the component shown in FIG. 49, stacked in such a way to show three complete stators. Each stator comprises a cavity for enclosing the associated rotor ring in such a way that the enclosed rotor ring can freely rotate within the cavity. The cavity envelopes steam traveling through channels in the ring, and is configured for steam to enter the cavity through directionalized nozzles, pumps or injectors and exit the stator through directionalized outgoing orifices to travel between stages via connecting channels that conduct steam exiting from the outgoing orifices of one stage to the directionalized nozzles, pumps or injectors of a subsequent stage (as shown in FIG. 50).

In order that the pressure drop of outgoing steam is smaller going from the stator cavity into inter-stage coupler, the orifice that feeds the coupler can be larger or more numerous than the nozzles, pumps or injectors that feed steam from the coupler to a subsequent cavity of the next subsequent stage in the cascade of stages.

FIG. 58 depicts a representative exploded view of an example embodiment of several adjacent ring stages, showing stator, rotor, bearings, nozzles, pumps or injectors, coils and heat recycling.

Steam Circuits

Figure 59:
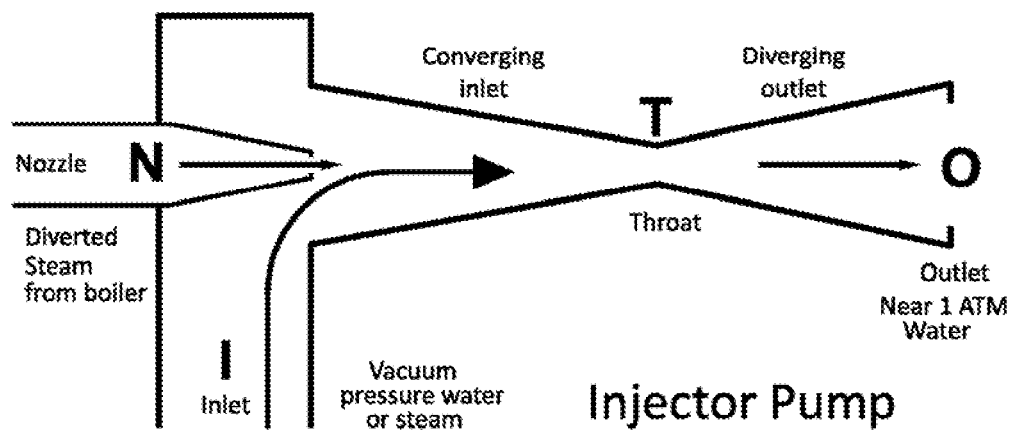
FIG. 59 depicts an example steam injector pump arrangement that can be employed for various functions to further supplement and enhance aspects of the present invention.

FIG. 59 depicts a steam injector, prior art from the 19$^{th}$ century. A steam injector is a passive pump, as it has no valves or controls, and is powered directly from steam from a boiler. Steam injectors can be designed with different dimensions to provide a wide range of pressure gradients and mass flow rates. It is through this mechanism that regions of steam can be made to have any desired pressure below the boiler pressure. Since wet steam is guaranteed to have a certain temperature given its pressure, arbitrary temperatures can be created as well. A steam injector can be used as a vacuum pump and can be used as such in some embodiments of the invention.

Extreme cold relative temperatures can be achieved by taking pressurized steam and cooling it (and recycling the resulting heat) and then allowing the steam to expand. This process could use multiple stages.

Other vaporized liquids can be used besides steam to achieve higher or lower temperatures. Temperature can be transmitted from one medium to another via radiation, and temperature can be controlled by using the equivalent of the wet steam region for that element. Small injectors with thermal radiation can be used to construct arbitrary regions of a desired temperature and pressure, without the use of valves, controllers, sensors, etc. With the advent of 3D printing, complex arrangements of nozzles, injectors and thermal coupling can be designed to enable targeted chemical reactions.

Extreme hot temperatures would require the cooperation between more than one element. Pressure can be coupled between two regions containing different elements using a flexible membrane, and temperatures can be coupled between two regions by thermal radiation. By switching between elements, embodiments of the invention can stairstep up to higher pressures and temperatures by using the pressure in one medium to create a higher temperature in the other, and then using the temperature in that medium to drive the pressure in another.

Heat-Induced/Heat-Releasing Pollutant Extraction and ZEEP

The burning of fossil fuels in general generates pollutants. It is undesirable to release pollutants into the atmosphere, and many of the pollutants are potentially fuel for chemical reactions which could produce more heat which could be recycled back into the ring stages.

Air comprises approximately 80% nitrogen, 20% oxygen, carbon dioxide, water vapor, and other elements. Gasses exiting the boiler comprise pollutants, for example in the following amounts and with the following properties and extraction methods:

| Element | g/GJ | Melting Point/Boiling | Extraction Method |
|---|---|---|---|
| Nitrogen | 29,000,000 | −196° C. | Not Discussed |
| Oxygen | 7,200,000 | −183° C. | Not Discussed |
| Sulfur Dioxide | 1300 | −72° C./−10° C. | Iron powder exothermic |
| Nitrogen Oxides NO2 | 200 | −11° C./21° C. | Hydrocarbons |
| Carbon Dioxide | 100,000 | −78° C./−57° C. | $Li_3$ at 360° C. exothermic |
| Water | Not Discussed | 0° C./100° C. | Not Discussed |

The key pollutants in the above table have a boiling point higher than that of air, and lower than that of water, so a chemical separation, extraction, and/or transformation process such as fractional distillation can be caused to occur by having the exhaust pass through relatively cold channels in appropriately controlled conditions. Liquids are relatively easy to separate from gasses using a Venturi steam trap to a lower pressure region that will receive the liquid. At room temperature the water can be extracted as a distillation fraction, and separate pollutants can be extracted ore separated out as distillation fractions at temperatures down to −80° C. Thus individual pollutants can be distilled off at specific temperatures differentiated by the boiling point of each pollutant.

There is prior art in extracting energy from most known pollutants, however these appear to not yet be used to produce heat and to convert the resulting heat into electricity efficiently.

FIG. 60 provides a table depicting example pollutant separation parameters. For example, a chemical reaction between carbon dioxide and $Li_3$ at 360° C. produces a large amount of heat, and a solid waste product. Additionally, the distillation of pollutants is well understood by those skilled in the art. Very low temperatures and pressures are used to convert some pollutant gasses into liquids, and nozzles can be used to separate them. Pollutants produced by boiler heating processes can then be used in an exothermic chemical reaction (usually at a high temperature and pressure) to produce additional heat that can be recycled. The byproducts of the chemical reaction can be converted to materials, for example a solid material, that can subsequently be easily disposed of.

In one aspect of the invention, at least one injector pump and radiator is used to generate cavities with arbitrary temperature and pressure that is powered by a high-pressure steam source.

In another aspect of the invention, at least one low temperature region within a volume enclosed by a plurality of stages is used to extract at least one pollutant created from boiler heating.

In another aspect of the invention, at least one nozzle is used in the above arrangement to extract at least one pollutant created from boiler heating.

In another aspect of the invention, at least one other region within a volume enclosed by a plurality of stages, that region comprising high pressure, is used to induce at least one pollutant created from boiler heating into at least one heat-producing chemical reaction.

In another aspect of the invention, at least one nozzle is used in the above arrangement to induce at least one pollutant into at least one heat-producing chemical reaction.

In another aspect of the invention, at least one other region within a volume enclosed by a plurality of stages, that region comprising high temperature, is used to induce at least one pollutant created from boiler heating into at least one heat-producing chemical reaction.

In another aspect of the invention, at least one nozzle, pump or injector is used in the above arrangement to induce at least one pollutant created from boiler heating into heat-producing chemical reaction.

In another aspect of the invention, at least one pollutant created from boiler heating is extracted from exhaust created from boiler heating.

In another aspect of the invention, at least one pollutant created from boiler heating is exposed to a heat-producing chemical reaction.

In another aspect of the invention, heat produced from the heat-producing chemical reaction is absorbed into at least one stage.

In another aspect of the invention, heat produced from the heat-producing chemical reaction is absorbed into the housing of the at least one stage.

In another aspect of the invention, at least one pollutant created from boiler heating is transformed in a manner that releases heat and solid waste products which can be easily disposed.

In another aspect of the invention, at least one pollutant created from boiler heating is transformed in a manner that produces heat and solid waste products which can be easily disposed.

In another aspect of the invention, at least one pollutant created from boiler heating is transformed in a manner that produces at last one solid waste product which can be easily disposed.

In another aspect of the invention, the at last one solid waste product that can be produced in the above arrangement can be easily disposed of.

In another aspect of the invention, nearly all pollutants created from boiler heating are transformed into heat that can be reused by the system and/or waste products which can be easily disposed of, resulting in Zero Emission Energy Production (ZEEP).

The conversion of pollutants generated by boiler heating to heat and disposable waste products is addressed by and provided for the invention using at least the techniques described above. Alternatively, pollutant distillation can be accomplished using electrical devices, such as pumps and heaters, which can be powered by electricity generated by the system. Inherent inefficiencies of electrical devices are manifested as excess heat normally be dissipated into the atmosphere. With the ring turbine system, this heat can be recycled back into one or more rings for efficient operation.

Due to the needed degree of thermo-coupling between one or more stages and various heat-generating electronic devices and pollutant-processing chemical reactions, in many embodiments it can be advantageous for processes providing recycled heat to be arranged so that the heat to be used is generated near the surface of the rings, to allow optimal thermal coupling between the heat source and the stator.

ADDITIONAL ALTERNATIVE EMBODIMENTS

Figure 61:
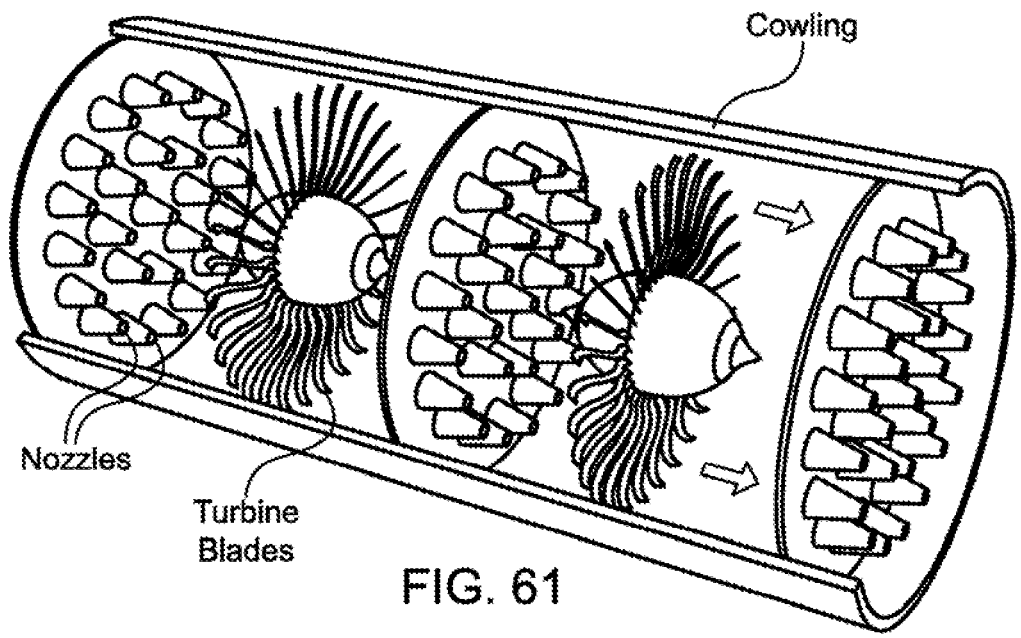
FIG. 61 depicts an example embodiment of the system using staged traditional turbine blades with nozzles, pumps or injectors instead of rings.

Embodiments of this invention are possible without using a toroidal shaped rotor. For example, many stages of traditional turbine blades can be implemented with similar results. FIG. 61 depicts an example embodiment of the system using staged traditional turbine blades with nozzles, pumps or injectors instead of rings. A key factor is that each stage is fully sealed, and that nozzles, pumps or injectors reaccelerate the steam between stages. Encased turbine blades are bulkier than rings, and the need for a shaft to transfer mechanical power to magnets provides unsealed areas where steam can travel.

Figure 62:
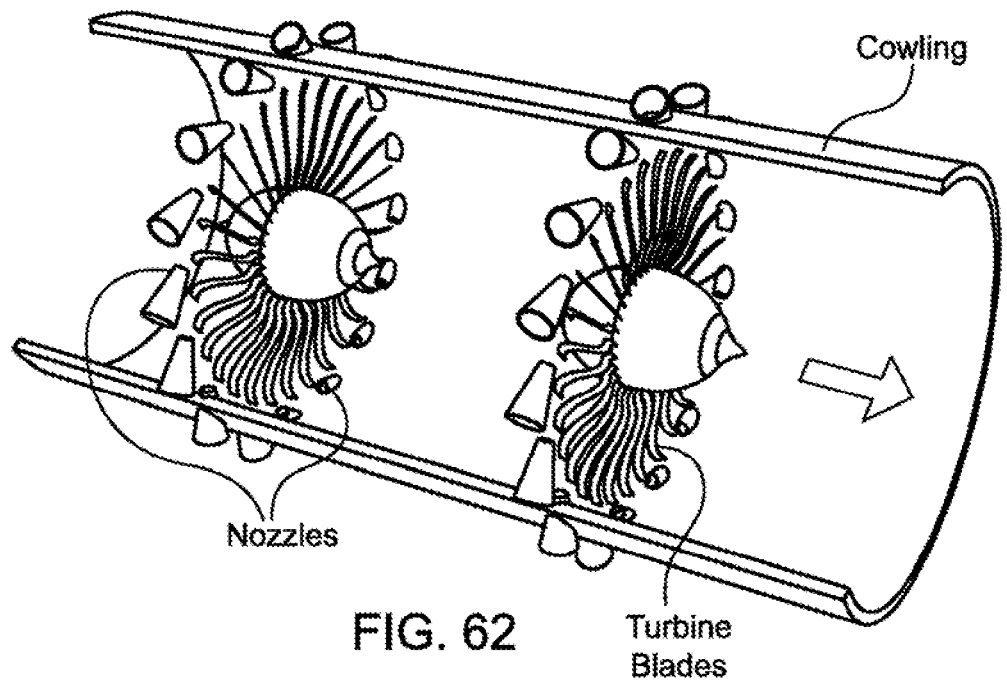
FIG. 62 depicts an example embodiment of the system using staged radial turbines with nozzles, pumps or injectors instead of rings.

Other forms of radial turbines could also be configured into sealed stages with nozzles, pumps or injectors as embodiments of this invention. For example, FIG. 62 depicts an example embodiment of the system using staged radial turbines with nozzles, pumps or injectors instead of rings.

Closing

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Therefore, the invention properly is to be construed with reference to the claims.

Although exemplary embodiments have been provided in detail, it should be understood that various changes, substitutions and alternations could be made thereto without departing from spirit and scope of the disclosed subject matter as defined by the appended claims. Variations described for exemplary embodiments may be realized in any combination desirable for each particular application. Thus, particular limitations, and/or embodiment enhancements described herein, which may have particular advantages to a particular application, need not be used for all applications. Also, not all limitations need be implemented in methods, systems, and/or apparatuses including one or more concepts described with relation to the provided exemplary embodiments.

I claim:

1. A system for electrical energy generation from steam, the system comprising at least one stage, each stage comprising:
   at least one steam-driven rotating toroidal ring, the toroidal ring comprising a major-radius and a minor-radius, the rotating toroidal ring for rotation within a plane coinciding with the major-radius of the rotating toroidal ring and comprising a least one steam channel for translating force components of steam pressure into rotational motion, the steam comprising enthalpy, the rotating toroidal ring further comprising at least one magnetic field source arranged to create a time-varying magnetic field occurring in at least one specific region adjacent to the rotating toroidal ring as the rotating toroidal ring rotates;
   at least one housing comprising a toroidal cavity for containing the rotating toroidal ring, the toroidal cavity comprising a major-radius and a minor-radius, the major-radius of the toroidal cavity accordingly slightly larger than the major-radius of the rotating toroidal ring and the minor-radius of the toroidal cavity slightly larger than the minor-radius of the rotating toroidal ring so that the rotating toroidal ring is free from contact with the housing and can freely rotate within the housing, the housing further comprising at least one steam inlet, the at least one steam inlet for providing incoming steam to a plurality of steam nozzles pointing into the toroidal cavity for directing pressurized steam into the channels for at least a first portion of rotation of the rotating toroidal ring, the housing further comprising a plurality of steam outlets for removing pressurized steam from the channels for at least a second portion of rotation of the rotating toroidal ring within the toroidal cavity;
   at least one bearing arrangement comprised by or attached to the housing within the toroidal cavity, the bearing arrangement for supporting the rotating toroidal ring within the toroidal cavity of the housing, and
   at least one pair of electrical coils, each electrical coil located on the outer surface of the housing at locations diagonally opposite from the other coil of each pair across the axis of the minor radius of the toroidal cavity and within the specific region where a time-varying magnetic field will occur as the rotating toroidal ring rotates, each pair of electrical coils oriented so that variations in the magnetic field produced by rotational motion of the magnetic field source comprised by the rotating toroidal ring can create an electrical current in the pair of electric coils,
   wherein the rotating toroidal ring lies within the toroidal cavity of the housing in a manner where it can freely rotate when driven by steam pressure as supported by the at least one bearing arrangement;
   wherein the rotating toroidal ring serves as a rotor and the housing serves as the stator housing of an electrical generator, and
   wherein steam entering the toroidal cavity through the steam nozzles and exiting through the steam outlets forces the rotating toroidal ring rotor to rotate within the stator housing, thus creating a time-varying magnetic field that creates an alternating current generated within the at least one pair of electrical coils, thus forming a steam-powered electrical alternating current generator.

2. The system of claim 1, wherein the at least one bearing arrangement comprises rotating balls.

3. The system of claim 1, wherein the at least one bearing arrangement moveably-contacts a supporting fin attached to the rotating toroidal ring.

4. The system of claim 1, wherein the at least one bearing arrangement comprises a magnetic bearing.

5. The system of claim 1, wherein the at least one bearing arrangement comprises a steam bearing.

6. The system of claim 1, wherein the alternating current generated within the at least one pair of electrical coils is converted into direct current.

7. The system of claim 6, wherein the direct current generated is converted into alternating current for providing outgoing electrical power.

8. The system of claim 1, wherein the at least one magnetic field source comprised by the rotating toroidal ring is arranged to provide a plurality of magnetic field polarity changes with each rotation of the rotating toroidal ring.

9. The system of claim 1, wherein the wherein the at least one magnetic field source comprised by the rotating toroidal ring is arranged to provide a plurality of magnetic field polarity changes along the circumference associated with the minor radius of the rotating toroidal ring.

10. The system of claim 1, wherein the system is arranged to vary the electrical load applied to the resulting electrical alternating current generator in order to control the rotation speed of the steam-driven rotation imparted to the rotating toroidal ring.

11. The system of claim 1, wherein the system comprises multiple stages, the stages arranged in a sequenced order, each stage interconnected with steam passages so that steam is provided by a steam source to a first stage via at least one steam inlet, the outlet of the last stage is provided to a path that removes any remaining steam and water from the system, and otherwise sequentially interconnecting the outlet of a specific stage to the steam inlet of the next stage in the sequenced order.

12. The system of claim 11, wherein the system is arranged so that the steam velocity in each sequentially interconnected steam passage has essentially the same value.

13. The system of claim 11, wherein at least one physical dimension of each stage varies according to the location of the stage in the sequential order.

14. The system of claim 13, wherein at least one physical dimension of each stage varies according to the location of the stage in the sequential order so as to maintain the steam velocity in each sequentially interconnected steam passage at essentially the same value.

15. The system of claim 11, wherein the AC current generated within the at least one pair of electrical coils is directed to power electronics can be used to convert the AC currents generated by each stage into AC power suitable for use in standard electrical power distribution.

16. The system of claim 11, wherein each stage further comprises a plurality of pairs of electrical coils, each electrical coil of each pair located on the outer surface of the housing at locations diagonally opposite from the other coil of each pair across the axis of the minor radius of the toroidal cavity and within the specific region where a time-varying magnetic field will occur as the rotating toroidal ring rotates, each pair of electrical coils oriented so that variations in the magnetic field produced by rotational motion of the magnetic field source comprised by the rotating toroidal ring can create an electrical current in the pair of electric coils.

17. The system of claim 11, wherein each stage is arranged so that there are a plurality of specific regions where a time-varying magnetic field will occur as the rotating toroidal ring rotates.

18. The system of claim 17, wherein there is at least one pair of electrical coils for each of the pluralities of specific regions where a time-varying magnetic field will occur as the rotating toroidal ring rotates, each pair of electrical coils oriented so that variations in the magnetic field produced by rotational motion of the magnetic field source comprised by the rotating toroidal ring can create an electrical current in the pair of electric coils.

19. The system of claim 1, wherein there are a plurality of pairs of electric coils, each pair of electrical coils oriented so that variations in the magnetic field produced by rotational motion of the magnetic field source comprised by the rotating toroidal ring, each pair of electrical coils oriented so that variations in the magnetic field produced by rotational motion of the magnetic field source comprised by the rotating toroidal ring can create an electrical current in the pair of electric coils, wherein at least two of the pairs electrical coils can create alternating electrical currents of the same phase as the rotating toroidal ring rotates.

20. The system of claim 1, wherein there are a plurality of pairs of electric coils, each pair of electrical coils oriented so that variations in the magnetic field produced by rotational motion of the magnetic field source comprised by the rotating toroidal ring, each pair of electrical coils oriented so that variations in the magnetic field produced by rotational motion of the magnetic field source comprised by the rotating toroidal ring can create an electrical current in the pair of electric coils, wherein at least two of the pairs electrical coils can create alternating electrical currents of different phases as the rotating toroidal ring rotates.

21. The system of claim 11, wherein some stages are arranged to operate at a vacuum relative to the atmosphere, which increases the amount of usable steam enthalpy, as the boiling temperature of water is lower in a vacuum.

22. The system of claim 21, wherein a pump is used to provide the additional pressure range to at least one of the ring stages.

23. The system of claim 11, wherein an injector is used in the aforementioned arrangement to provide the additional pressure range to at least one of the ring stages.

24. The system of claim 11, wherein each stage has a natural temperature based on the pressure within a cavity comprised by that stage.

25. The system of claim 11, wherein the temperature of a stage operating at a temperature of approximately 0.1 bar of pressure would be arranged to operate at a temperature of approximately 40° C.

26. The system of claim 11, wherein the housing of each stage is arranged to absorb provided heat and utilize that absorbed heat for energy generation.

27. The system of claim 11, wherein heat from bearing friction is cooled with thermal coupling with at least one stage housing, with the heat being transferred to steam enthalpy within that at least one stage.

28. The system of claim 1, wherein ohmic heat generated in electrical coils is cooled with thermal coupling with the at least one stage housing, with the heat being transferred to steam enthalpy within that at least one stage.

29. The system of claim 11, wherein exhaust heat from the boiler is cooled with thermal coupling with at least one stage housing, with the heat being transferred to steam enthalpy within that at least one stage.

30. The system of claim 1, wherein at least one injector pump and radiator is used to generate cavities with arbitrary temperature and pressure that is powered by a high-pressure steam source.

31. The system of claim 11, wherein at least one low temperature region within a volume enclosed by a plurality of stages is used to extract at least one pollutant created from boiler heating.

32. The system of claim 31, wherein at least one nozzle is used to extract at least one pollutant created from boiler heating.

33. The system of claim 11, wherein at least one other region within a volume enclosed by a plurality of stages, that region comprising high pressure, is used to induce at least one pollutant created from boiler heating into at least one heat-producing chemical reaction.

34. The system of claim 31, wherein at least one nozzle is used to induce at least one pollutant into at least one heat-producing chemical reaction.

35. The system of claim 1, wherein at least one other region within a volume enclosed by a plurality of stages, that region comprising high temperature, is used to induce at least one pollutant created from boiler heating into at least one heat-producing chemical reaction.

36. The system of claim 34, wherein at least one nozzle is used to induce at least one pollutant created from boiler heating into heat-producing chemical reaction.

37. The system of claim 1, wherein at least one pollutant created from boiler heating is extracted from exhaust created from boiler heating.

38. The system of claim 1, wherein at least one pollutant created from boiler heating is exposed to a heat-producing chemical reaction.

39. The system of claim 11, wherein heat produced from the heat-producing chemical reaction is absorbed into at least one stage.

40. The system of claim 11, wherein heat produced from the heat-producing chemical reaction is absorbed into the housing of the at least one stage.

41. The system of claim 1, wherein at least one pollutant created from boiler heating is transformed in a manner that releases heat that is reused by the system.

42. The system of claim 1, wherein at least one pollutant created from boiler heating is transformed in a manner that produces at least one solid waste product solid waste product.

43. The system of claim 41, wherein the at least one solid waste product that can be produced in the above arrangement can be easily disposed of.

44. The system of claim 1, wherein the majority of pollutants created from boiler heating are transformed into heat that can be reused by the system and/or waste products which can be easily disposed of, resulting in Zero Emission Energy Production (ZEEP).

45. The system of claim 1, wherein the rotating toroidal ring comprises at least one wing for engaging steam flow and deliver rotational energy to the rotating toroidal ring.

46. The system of claim 45, wherein the rotating toroidal ring creates a highly constrained path between the rotating toroidal ring and toroidal cavity for steam to engage with the wings of the rotating toroidal ring.

47. The system of claim 11, wherein the nozzle is arranged to convert some enthalpy of the steam into kinetic energy that can be transferred to the rotating toroidal ring.

48. The system of claim 47, wherein each stage converts a fraction of steam enthalpy into kinetic energy and passes remaining steam enthalpy to the next stage, continuing to a final stage wherein the last of the usable is consumed.

49. The system of claim 21, wherein the stages operating at the vacuum are used to further increases the amount of available enthalpy.

50. The system of claim 11, wherein each stage operates at a different temperature.

51. The system of claim 11, wherein any excess heat produced by the system, the excess heat capable of increasing the temperature a specific stage higher than its current operating temperature, is thermally directed to at least the specific stage.

52. The system of claim 11, wherein the system is arranged so that steam within a specific stage will absorb the higher temperature heat to provide additional enthalpy to at least the selected stage.

53. The system of claim 52, wherein at least some of the additional enthalpy is provided to at least one subsequent stage.

54. The system of claim 51 wherein the source of the excess heat comprises ohmic losses produced by the electrical coils.

55. The system of claim 51 wherein the source of the excess heat comprises heat from exhaust of the heat source used to heat the boiler.

56. The system of claim 51 wherein the source of the excess heat is at least one electrical pump.

57. The system of claim 1, wherein the system is arranged so that at least one pollutant material produced by the heat source used to heat the boiler can be extracted using low temperature distillation.

58. The system of claim 1, wherein the system is arranged so that at least one pollutant material produced by the heat source used to heat the boiler can be extracted through a chemical reaction.

59. The system of claim 58, wherein the system is arranged so that at least one pollutant material produced by the heat source used to heat the boiler can be converted to at least one solid.

60. The system of claim 58, wherein the chemical reaction is an exothermic reaction.

61. The system of claim 60, wherein the heat from the exothermic reaction is thermally directed to at least one stage.

62. The system of claim 60, wherein heat created by at least one pump used in distilling pollutants is thermally directed to at least one stage.

63. The system of claim 60, wherein heat created by at least one radiator used in distilling pollutants is thermally directed to at least one stage.

64. The system of claim 60, wherein heat created by at least one heater used in distilling pollutants is thermally directed to at least one stage.

65. The system of claim 60, wherein heat created by at least one pump used to create the chemical reaction is thermally directed to at least one stage.

66. The system of claim 60, wherein heat created by at least one radiator used to create the chemical reaction is thermally directed to at least one stage.

67. The system of claim 60, wherein heat created by at least one heater used to create the chemical reaction is thermally directed to at least one stage.

* * * * *